US006568591B2

(12) United States Patent
Modi

(10) Patent No.: US 6,568,591 B2
(45) Date of Patent: May 27, 2003

(54) DOCUMENT SENSOR FOR CURRENCY RECYCLING AUTOMATED BANKING MACHINE

(75) Inventor: Al Modi, Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

(21) Appl. No.: 09/799,867

(22) Filed: Mar. 5, 2001

(65) Prior Publication Data

US 2001/0013541 A1 Aug. 16, 2001

Related U.S. Application Data

(62) Division of application No. 09/193,857, filed on Nov. 17, 1999, now Pat. No. 6,241,244.
(60) Provisional application No. 60/067,291, filed on Nov. 28, 1997.

(51) Int. Cl.[7] .................................... G06F 17/60
(52) U.S. Cl. ...................... 235/379; 235/439; 209/588; 271/262; 271/265.04; 902/16
(58) Field of Search ............................ 235/379, 381, 235/435, 439, 454, 455, 470; 902/16; 271/262, 265.04, 4.03; 209/588, 534; 705/43, 16; 356/435; 250/223 R; 221/7; 73/570; 194/206

(56) References Cited

U.S. PATENT DOCUMENTS

| | | | | |
|---|---|---|---|---|
| 3,278,754 A | | 10/1966 | Wallace | |
| 3,578,315 A | * | 5/1971 | Milford | 106/8 |
| 3,593,989 A | | 7/1971 | Crittenden et al. | |
| 3,614,419 A | | 10/1971 | Daughton et al. | |
| 3,731,916 A | * | 5/1973 | Pettet | 902/16 X |
| 3,748,482 A | | 7/1973 | De Cock | |
| 3,756,404 A | | 9/1973 | King et al. | |
| 3,778,051 A | | 12/1973 | Allen et al. | |
| 3,782,543 A | | 1/1974 | Martelli et al. | |
| 3,937,453 A | * | 2/1976 | Hickey et al. | 902/16 X |

(List continued on next page.)

FOREIGN PATENT DOCUMENTS

| | | | | |
|---|---|---|---|---|
| DE | 361093 | | | 9/1987 |
| DE | 4233854 | | | 4/1994 |
| JP | 58-212539 | | | 12/1983 |
| JP | 59-36051 | | | 2/1984 |
| JP | 59-36052 | | | 2/1984 |
| JP | 62-255338 | | | 11/1987 |
| JP | 3-23139 | | | 1/1991 |
| JP | 4-323146 | A | * | 11/1992 |
| JP | 6-183603 | | | 7/1994 |
| JP | 6-191680 | | | 7/1994 |
| JP | 7-172629 | | | 7/1995 |
| JP | 7-206222 | A | * | 8/1995 |
| JP | 8-055255 | | | 2/1996 |

*Primary Examiner*—Michael G. Lee
*Assistant Examiner*—Jared J. Fureman
(74) *Attorney, Agent, or Firm*—Ralph E. Jocke; Daniel D. Wasil; Walker & Jocke

(57) ABSTRACT

An automated banking machine (10) identifies and stores documents such as currency bills deposited by a user. The machine then selectively recovers such documents from storage areas and dispenses them to other users. The machine includes a sheet thickness detector (810) used for distinguishing single sheets from double sheets which pass through the machine. The thickness detector includes a radiation source (822). Radiation from the radiation source is directed by radiation guide (824) to a generally linear elongated radiation outlet (826) which extends transversely to the sheet path. A receiver (814) includes a radiation sensitive element (830) which is also transversely elongated relative to the sheet path. Sheets passing between the emitter and the receiver cause variations in the amount of radiation reaching the receiver. The transversely elongated surface of the sheet through which the transmission of radiation is sensed enables accurately distinguishing single sheets from double sheets.

9 Claims, 68 Drawing Sheets

U.S. PATENT DOCUMENTS 4,019,819 A 4/1977 Lodzinski
4,113,105 A 9/1978 DeHart et al.
4,154,437 A * 5/1979 Butcheck et al. ......... 902/16 X
4,188,962 A * 2/1980 Onoe et al. .................... 221/7
4,201,378 A 5/1980 Hams
4,255,057 A * 3/1981 Williams .................... 356/435
4,310,885 A * 1/1982 Azcua et al. ................. 705/16
4,435,834 A * 3/1984 Pauli et al. ................. 235/454
4,447,714 A * 5/1984 Lundbland .................. 235/379
4,465,925 A 8/1984 Goi
4,491,929 A * 1/1985 Ikoma et al. ............. 902/16 X
4,542,829 A * 9/1985 Emery et al. ............... 209/534
4,608,704 A 8/1986 Sherman, III et al.
4,664,369 A * 5/1987 Graef et al. .............. 902/16 X
4,707,598 A 11/1987 Croset et al.
4,730,116 A 3/1988 Ida et al.
4,731,523 A * 3/1988 Kozima ...................... 235/379
4,922,110 A 5/1990 Melcher
5,067,704 A 11/1991 Tsuihiji et al.
5,104,523 A 4/1992 Masaharu et al.
5,115,144 A 5/1992 Konishi et al.
5,185,520 A * 2/1993 Kurata ................... 250/223 R
5,222,729 A 6/1993 Wallaschkowski
5,341,408 A 8/1994 Melcher et al.
5,447,240 A 9/1995 Makino
5,462,150 A * 10/1995 Chang ........................ 194/206
5,502,312 A 3/1996 Lorenzo
5,581,354 A 12/1996 Hassbjer
5,655,668 A 8/1997 Drenth
5,704,246 A 1/1998 Kruger
5,945,602 A * 8/1999 Ross ........................... 73/570
5,965,865 A * 10/1999 Milne ......................... 235/487
6,481,705 B1 * 11/2002 Okada ....................... 271/4.03
6,486,464 B1 * 11/2002 Ma et al. ................ 250/223 R

* cited by examiner

DOCUMENT SENSOR FOR CURRENCY RECYCLING AUTOMATED BANKING MACHINE

This application is a divisional of application Ser. No. 09/193,857 filed on Nov. 17, 1999 now U.S. Pat. No. 6,241,244. The nonprovisional application designated above, namely Ser. No. 09/193,857 filed on Nov. 17, 1999 claims the benefit of U.S. Provisional Application No. 60/067,291 filed on Nov. 28, 1997.

TECHNICAL FIELD

This invention relates to automated banking machines. Specifically this invention relates to an automated banking machine that enables currency bills, notes or other documents deposited by one customer to be identified and stored in the machine, and later selectively dispensed to another customer.

BACKGROUND ART

Automated banking machines are known in the prior art. A popular type of automated banking machine is an automated teller machine (ATM). Other types of automated banking machines are used to count and dispense cash. These machines are often used by tellers or customer service representatives in banking and other transaction environments.

ATM machines commonly in use accept deposits from customers and process the deposits using devices which are separate from the devices which dispense currency and other items to customers. Most common ATM depositories require customers to place their deposits in an envelope. The envelope is accepted into the machine for storage. Although the customer indicates the value of the contents of the envelope, the customer's account is often not credited for the amount of deposit until the envelope is removed from the ATM by bank personnel and the contents verified.

Other ATM machines have the capability of receiving checks and other negotiable instruments. Such machines may include a device such as is shown in U.S. Pat. No. 5,422,467. Devices of this type can be used to cancel and produce electronic images of checks which are deposited into an ATM machine. The cancelled checks are stored in the machine for later removal by bank personnel.

Currency notes, travelers checks and other documents and sheet materials that are commonly dispensed by ATMs, are generally housed in the machine in removable canisters. Sheets are dispensed from the canisters and delivered by the machine to customers. Periodically these canisters must be removed from the machine and the supply of sheets therein replenished. This is a labor intensive activity. To replace the canisters the secure portion of the ATM must be opened. The canisters in the machine must be removed and new canisters, which include a new supply of sheets, placed in the machine. Alternatively the canisters in the machine may be opened, money or other sheets added, and then replaced. After the canisters are replaced the secure portion of the machine must be closed.

The replacement or resupply of canisters often requires transporting filled canisters to the machine and returning partially depleted canisters to a remote location. While efforts have been made in the design of canisters to minimize opportunities for pilferage, there is always some risk. Therefore such activities are normally carried out by armed couriers. More than one person is often assigned to any task where there is access to the cash or other valuables in the machine. Because numerous individuals may be involved in loading replacement canisters, transporting replacement canisters to ATM machines, replacing the canisters, returning the removed canisters and auditing the contents of returned canisters, it is often difficult to identify the cause of any losses.

The need to periodically replace currency canisters is an inconvenience because the ATM must be shut down. Customers are not able to use the ATM while the supply of currency is being replenished, and lost opportunities to conduct transactions and customer dissatisfaction may result. Customers will also be disappointed if replenishment operations are not performed frequently enough and the machine runs out of currency or other documents.

Other types of automated banking machines, such as those that dispense cash to customer service representatives, have the same drawbacks as ATM machines. Periodic replenishment of the currency or other valuable documents that are dispensed by the machine must be done to keep the machine in operation. While such machines speed the cash dispensing service to the customer, there is a significant cost associated with segregating, preparing and transporting the currency before it is placed within the machine.

Other banking machines have been developed for identifying and counting currency. Such machines may be used in banking and vending environments. Machines which count currency generally require that the currency be pre-oriented a particular way to obtain proper identification. This is time consuming for the person operating the machine. Many currency counting machines also tend to reject valid notes due to natural deterioration which occurs in U.S. currency. The speed associated with such currency counting and accepting machines is also less than desirable in many cases.

Automated banking machines which are capable of receiving currency, identifying the particular type and denomination of currency, storing the currency and later dispensing it to a customer have been used in countries outside the United States. Such recycling machines are feasible in countries such as Japan where currency notes include special features which facilitate their identification by machines. However, such recycling machines have not generally been feasible with U.S. currency notes which generally do not include special features that facilitate identification by machine. U.S. currency notes also are subject to a wide range of conditions such as wear, soiling and bleaching which do not render a note unfit for use, but which render it very difficult for a machine to properly identify.

The currency recycling type banking machines that have been developed also generally suffer from slow operating speeds. This is particularly true when the machines are used to process a large number of notes. Often such machines require that the notes be oriented in a particular way and considerable time is associated with the rejection of notes due to improper orientation. The handling of the sheets to facilitate identification and storage is also a time consuming process. Once a sheet has been initially identified as proper and stored in the machine, there is generally no check to be sure that the original determination of the type and character of the note was correct. As a result, a customer may receive a misidentified note. This can reduce customer satisfaction.

Dispensers in automated banking machines generally pick one note at a time. Occasionally malfunctions occur and double or even triple notes are picked. The picking of double notes is particularly a concern in a currency recycling automated banking machine where notes must be separated to be identified. Various types of doubles detector devices have been developed. Some such devices rely on physical contact with passing notes to determine thickness. Other sensors determine note thickness inferentially from the optical or other properties of passing notes.

Prior note sensing devices which sense optical properties have sought to detect doubles by sensing the transmissivity of light through a small area of a note. This approach has some inherent unreliability due to the different optical properties which exist in various areas of a note. Conditions such as marking, staining or bleaching of notes can also make conventional optical sensing for double notes unreliable.

Thus there exists a need for a currency recycling automated banking machine that is more reliable, operates more quickly and which can be used with U.S. and other currencies as well as other documents which have a wide range of properties. There further exists a need for a device which senses document thicknesses more reliably in such an automated banking machine.

DISCLOSURE OF INVENTION

It is an object of the present invention to provide a currency recycling automated banking machine.

It is a further object of the present invention to provide a currency recycling automated banking machine that is reliable and that operates more rapidly.

It is a further object of the present invention to provide a currency recycling automated banking machine that works with currency notes and other documents that have a wide variety of properties.

It is a further object of the present invention to provide a currency recycling automated banking machine that is capable of unstacking and separating documents input in a stack.

It is a further object of the present invention to provide an automated banking machine that orients documents relative to a sheet path while moving such documents at a high rate of speed.

It is a further object of the present invention to provide a currency recycling automated banking machine that can transport a plurality of documents in a sheet path concurrently and at a high rate of speed.

It is a further object of the present invention to provide a currency recycling automated banking machine that identifies documents and which returns unidentifiable documents to a customer.

It is a further object of the present invention to provide a currency recycling automated banking machine that enables a customer to deposit documents into the banking machine, and after the documents have been identified, to elect whether to deposit the documents or to have them returned.

It is a further object of the present invention to provide a currency recycling automated banking machine that can identify deposited documents regardless of orientation.

It is a further object of the present invention to provide a currency recycling automated banking machine that enables selectively storing deposited documents in storage areas in the machine.

It is a further object of the present invention to provide a currency recycling automated banking machine that enables selectively storing deposited documents in removable canisters.

It is a further object of the present invention to provide a currency recycling automated banking machine that enables recovery of documents stored in storage areas and dispensing the documents to customers.

It is a further object of the present invention to provide an automated banking machine in which documents may concurrently be transported, oriented, stored in storage areas and dispensed from other storage areas within the machine.

It is a further object of the present invention to provide an automated banking machine that includes a device which is more reliable in sensing the thickness of documents which is more reliable.

Further objects of the present invention will be made apparent in the following Best Modes for Carrying Out the Invention and the appended claims.

The foregoing objects are accomplished in a preferred embodiment of the present invention by a currency recycling automated banking machine. The machine includes an input/output area in which a customer may insert documents that are to be deposited and from which a customer withdrawing documents may receive documents.

A customer deposits documents in a stack. The documents are moved from the input/output area into a central transport. In an unstack area documents are removed from the stack one by one and separated into a stream of single separate documents. The documents move along a document path in the central transport. The documents moving in the central transport are each deskewed to properly orient them relative to the direction of travel along the document path. The documents are further moved to align them into a proper centered relation in the document path.

Each document is then moved past a document type identifier device which operates to identify the type and/or denomination of each document. Identifiable documents are directed into an escrow area while unidentifiable documents are directed into a reject area of the input/output area of the machine.

A customer is informed of any unidentifiable documents through input and output devices on the machine. Any unidentifiable documents may then be delivered to the customer from the reject area. Alternatively, depending on the programming of the machine such rejected documents may be stored in the machine for later analysis.

Properly identified documents are initially held in the escrow area. The output devices on the machine indicate to the customer the type and/or value of the identifiable documents. The customer preferably is enabled to select whether to have such documents returned or to deposit such documents. If the customer elects to have the documents returned, the documents are passed out of the input/output area and the customer's account is not credited for the value of the documents.

If the customer elects to deposit the documents the documents are again moved through the central transport in a stream of rapidly moving separated documents. The documents are again identified by the identification device. However, rather than being routed to the reject and escrow areas, the identified documents are now preferably routed by the control system of the machine to selected storage locations. The storage locations are locations in which documents of the particular types are stored in the machine. The storage areas in the machine of the preferred embodiment are areas in a plurality of removable canisters. The customer's account is then credited for the value of the deposited documents.

The same customer who deposited documents or a subsequent customer wishing to make a withdrawal from the machine may receive documents that have been previously stored in the storage areas. Document dispensing mechanisms associated with the storage areas selectively remove documents from the storage areas and route them to the central transport of the machine. As the documents move through the central transport they pass the identification device. The type and denomination of each document being dispensed is verified. This assures that the initial identification of the documents made when they were deposited in the machine is correct. This third verification assures that a customer withdrawing documents from the machine is not given an improper document. The documents are removed from the storage areas concurrently so as to facilitate rapid operation of the machine and are controlled in movement through the remote transport segments and the central transport to assure that they move as a stream of separated documents as they pass the identification device.

The identified documents to be dispensed to the customer are moved by the central transport to an escrow area. From the escrow area they are presented to the customer. The customer's account is then charged or debited for the documents that have been withdrawn.

Suitable mechanisms are used for picking and separating documents so that they may be transported in a stream through the machine. Sheet thickness sensing devices are used to assure that double or overlapped notes are not added to the stream. The document thickness sensing device includes an emitter and a receiver on opposed sides of a sheet path. Documents moving in the sheet path pass between the emitter and the receiver.

The emitter includes a radiation source. A radiation guide accepts light from the radiation source and delivers it to a linearly elongated radiation outlet. The radiation outlet extends generally transversely to the direction of document travel through the sheet path. In the preferred embodiment the radiation outlet extends transversely a distance which is greater than ten percent of the width of the documents in the transverse direction.

The receiver includes a radiation sensitive element which is aligned with the radiation outlet. The radiation sensitive element extends the width of the radiation outlet. The radiation sensitive element produces signals which are responsive to the amount of radiation which reaches the radiation sensitive element from the radiation outlet.

When documents pass between the emitter and the receiver the radiation passes through the documents. The amount of radiation which reaches the radiation sensitive element varies with the thickness of the passing documents. The transmissivity of the radiation through the areas of document also varies due to patterns of printing and other markings on the document. The relatively large width of the radiation outlet and radiation sensitive element cause the output signals generally not to be affected by local conditions on the note. If the radiation which passes through the note is below a threshold which is indicative of double documents the documents may be retrieved and separated. Once the documents are separated they can be handled by the machine.

BEST MODES FOR CARRYING OUT INVENTION

Figure 1:
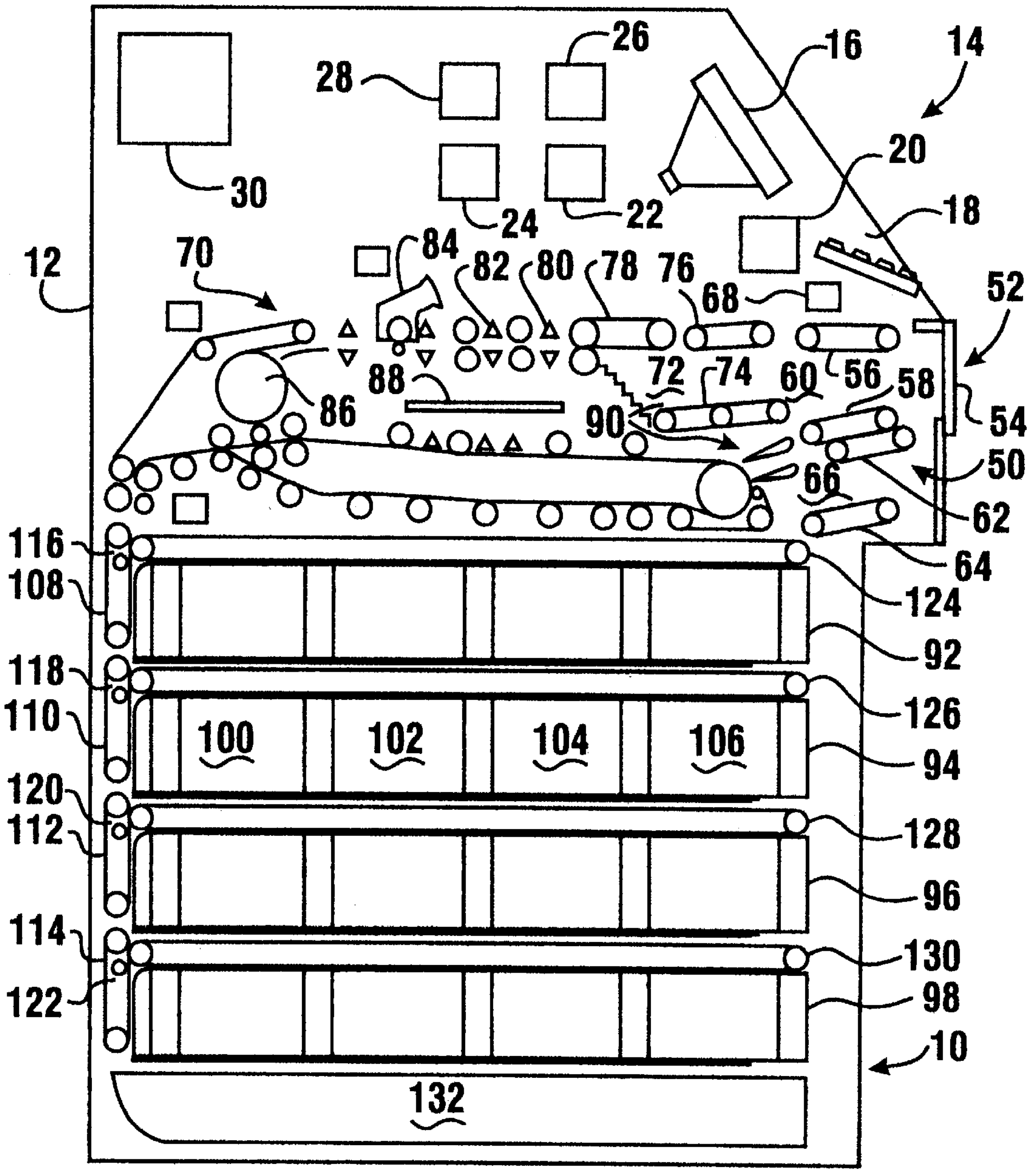
FIG. 1 is a schematic cross sectional view of currency recycling automated banking machine of a preferred embodiment of the present invention.

Referring now to the drawings and particularly to FIG. 1 there is shown therein a currency recycling automated banking machine of the present invention generally indicated 10. The machine includes a housing 12. Housing 12 includes a customer interface area generally indicated 14. Interface area 14 includes components used for communicating with a user of the machine. These components may include a display 16 which serves as an output device. The interface area may also include a keypad 18 and/or a card reader 20 which serve as manually actuatable input devices through which a user may input information or instructions into the machine. It should be understood that these devices are exemplary and other input and output devices such as a touch screen, display, audio speakers, iris scan devices, fingerprint reading devices, infrared transmitters and receivers and other devices which are capable of receiving or providing information may be used.

The machine also includes other devices which are indicated schematically. Such devices may include a receipt printer 22 which provides receipts to customers concerning activities related to their transactions. Other devices indicated schematically include a journal printer 24 for making a paper record of transactions. A passbook printer 26 indicated schematically may also be included within the housing of the machine. A check imaging device 28 may also be included for purposes of producing electronic images of checks deposited into the machine as well as for cancelling such checks. Such a check imaging device may be of the type shown in U.S. Pat. No. 5,422,467 or other similar mechanism.

Devices 22, 24, 26 and 28 are exemplary and other devices may also be included in the machine such as video cameras for connecting to a remote location, an envelope deposit accepting mechanism, ticket printing devices, devices for printing statements and other devices. It should further be understood that while the embodiment described herein is in the form of an automated teller machine (ATM) the present invention may be used in connection with other types of automated banking machines.

The machine 10 includes a control system generally indicated 30. The control system is in operative connection with the components of the machine and controls the operation thereof in accordance with programmed instructions. Control system 30 also provides communications with other computers concerning transactions conducted at the machine. Such communications may be provided by any suitable means, such as through telephone lines, wireless radio link or through a connection through a proprietary transaction network.

The preferred embodiment of the invention has the capability of recycling currency or other sheets or documents representative of value received from a customer. For purposes of this description except where indicated, the words documents, sheets, notes and currency are used interchangeably to refer to the sheet materials processed by the invention. The process of recycling involves receiving the documents in bulk from a customer, identifying the type of documents deposited and storing the documents in appropriate locations within the machine. The stored documents may then be selectively retrieved and provided to customers who wish to withdraw funds from the machine.

Figure 2:
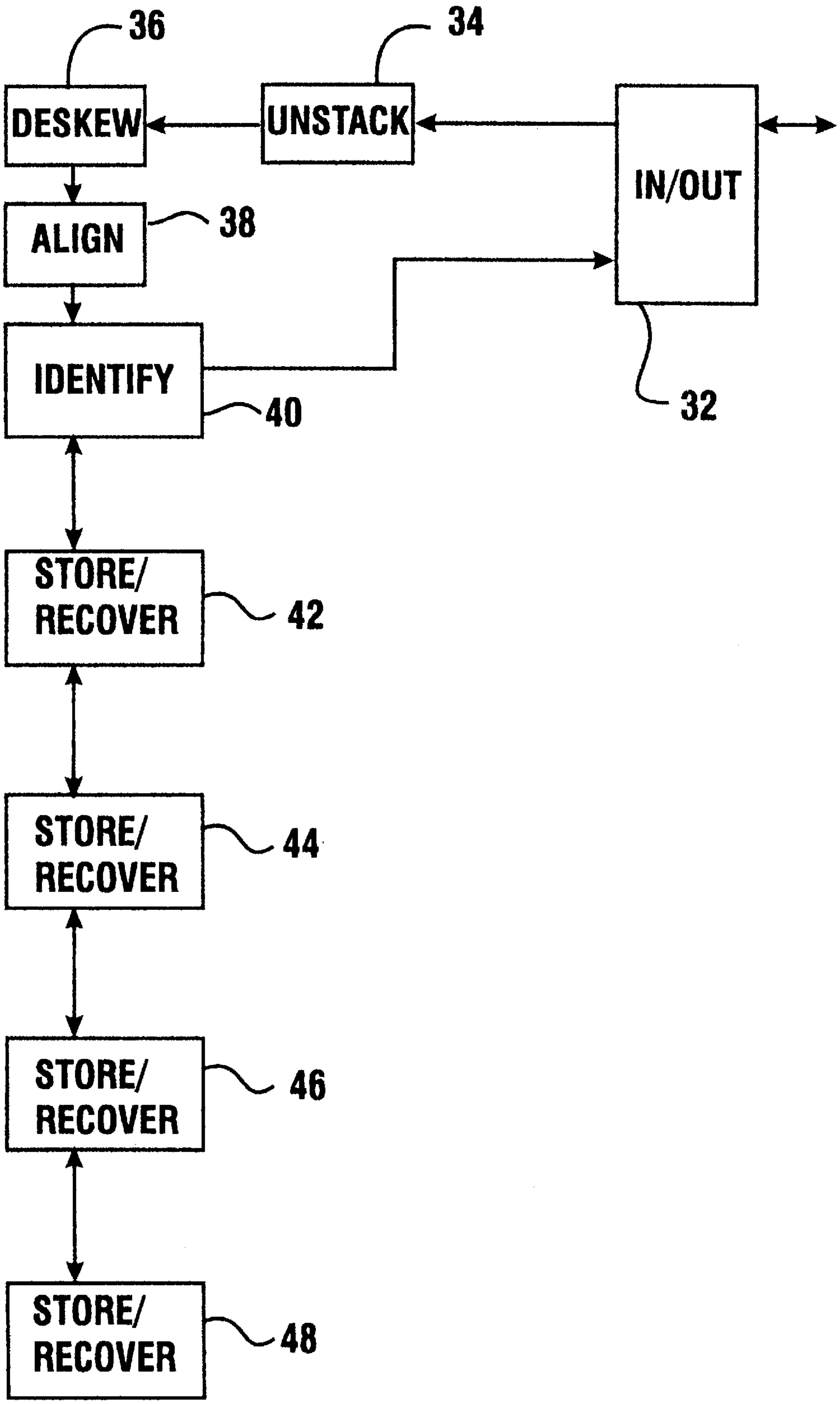
FIG. 2 is a schematic diagram of the functions performed by the machine shown in FIG. 1.

The preferred embodiment of the invention includes the functional components schematically indicated in FIG. 2. These functional components include an input/output function which receives documents from and delivers documents to users of the machine. An unstack function 34 receives documents from the input/output function 32. The unstack function serves to separate the documents from the stack and deliver them into a sheet path in separate, spaced relation.

The functional components of the machine further include a deskew function 36. As later discussed in detail, the deskew function operates to orient the documents so that they are properly transversely aligned with a sheet path. An alignment function 38 further orients the moving documents by centering them with regard to the sheet path. After the documents have been aligned they are passed to an identify function 40. The identify function operates to determine the type of document passing through the sheet path. In the preferred embodiment the identify function includes determining the type and denomination of a currency bill or other document. Also the identify function determines if a document appears suspect or is simply not identifiable.

The identify function is linked to the input/output function so that customers may have any suspect documents or identifiable documents returned to them, rather than be deposited in the machine. The identify function is also linked to document store and recover functions 42, 44, 46 and 48. The store and recover functions operate to store documents in selected locations, and to recover those documents for purposes of dispensing the documents to a customer.

Referring again to FIG. 1 the apparatus which performs the previously described functions is shown schematically. The input/output function is performed in an input/output area generally indicated 50. The input/output area is adjacent to an opening 52 in the housing of the machine. Access through opening 52 is controlled by a movable gate 54 which is shown in the closed position in FIG. 1.

Input/output area 50 includes four belt type transports. These belt type transports are devices suitable for moving a stack of sheets, and preferably each comprise a plurality of belts such as is shown in U.S. Pat. No. 5,507,481. First belts 56 and second belts 58 bound a delivery/reject area 60 which extends vertically between the belts. As later explained, belts 56 and 58 are movable vertically relative to one another and move in coordinated relation to transport a stack of sheets which are positioned therebetween.

Figure 3:
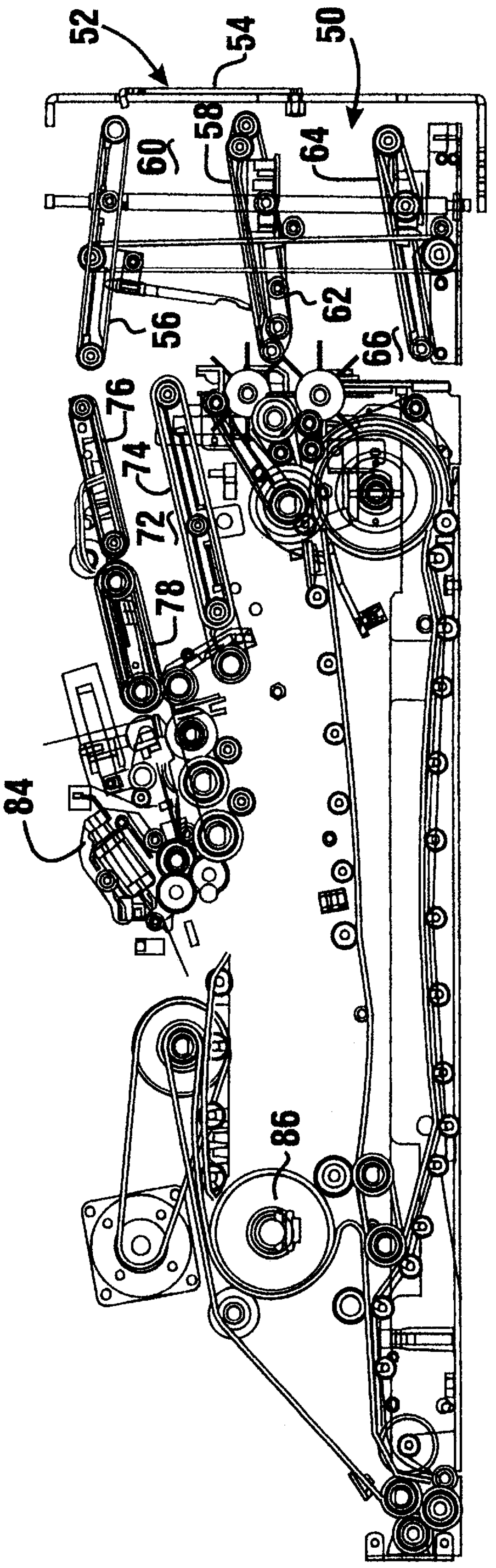
FIG. 3 is a cross sectional view of the components of the central transport and the input/output area of the machine.

Input/output area 50 also includes third belts 62 and fourth belts 64. Third belts 62 and fourth belts 64 vertically bound an escrow area generally indicated 66. Belts 62 and 64 are similar to belts 56 and 58 and are capable of moving a stack of documents therebetween. The belts in the input/output area, as well as gate 54, are driven by appropriate motors schematically indicated 68 which are operated by the control system 30. The input/output area can be operated in various modes, examples of which will be discussed hereafter. FIG. 3 shows the input/output area 50 in greater detail.

The input/output area communicates with a central transport generally indicated 70. Central transport 70 includes an unstack area generally indicated 72. The unstack area includes a tray 74 which is suitable for moving a stack of documents thereon. Unstack area 72 further includes transport belts 76 and pick belts 78. As later explained in detail, the unstack area operates to separate documents and deliver them in spaced relation into the document path of the central transport.

The deskew operation also includes doubles sensors 80 for use in detecting instances of double documents which have been removed from a stack in the unstack area. These documents can be separated in a manner later discussed. Pre-centering sensors are also provided in association with the unstack operation, which sensors operate to assure that the deskew and alignment operations can be performed properly.

From the unstack area sheets are transported to a deskew and centering device 84. Deskew and centering device 84 performs the functions of aligning sheets transversely to a sheet path. It also performs the function of moving the sheets so that they are centered relative to the sheet path through the central transport.

From the deskew and centering device, documents change direction by being turned on carriage rolls 86 and are moved past an identification device 88. Identification device 88 is preferably of the type shown in U.S. patent application Ser. No. 08/749,260 filed Nov. 15, 1996, now U.S. Pat. No. 5,923,413, which is owned by the Assignee of the present invention, and the disclosure of which is incorporated herein by reference. In alternative embodiments, other types of identification devices may be used. The identification devices preferably identify the type and character of passing notes. The identification device also preferably distinguishes genuine documents such as genuine currency bills from unidentifiable or suspect documents.

From the identification device, documents are moved selectively in response to the position of divert gates schematically indicated 90. The divert gates operate under the control of the control system to direct documents either to the delivery/reject area 60, the escrow area 66 or into the document storage and recovery areas of the machine.

The document storage and recovery areas include recycling canisters 92, 94, 96 and 98, which are later described in detail. The recycling canisters are preferably removable from the machine by authorized personnel. Each of the recycling canisters shown include four storage areas therein. These are represented by storage areas 100, 102, 104 and 106 in canister 94. The storage areas provide locations for storing documents that have satisfactorily passed through the central transport. Documents are preferably stored in the storage areas with documents of the same type. Documents stored in the storage areas can later be removed therefrom one at a time and delivered to other customers.

Documents are moved to the canisters through remote transport segments generally indicated 108, 110, 112 and 114. The remote transport segments are preferably arranged in aligned relation such that documents may be passed between the transport segments. Each remote transport segment has a media gate mechanism associated therewith. The media gates generally indicated 116, 118, 120 and 122 operate in a manner later explained to selectively direct documents from the remote document segments into connection with adjacent canister delivery transports indicated 124, 126, 128 and 130. The canister transports operate in a manner later explained, to move documents to and from the storage areas in the canisters.

It should be appreciated that the various components which comprise the gates, transports and storage areas have associated motors and sensors, all of which are in operative connection with the control system 30 for purposes of sensing and controlling the movement of documents therethrough.

It should also be noted that in the preferred embodiment of the invention a dump area generally indicated 132 is provided within the housing of the machine at the bottom of the remote transport segments. Dump area 132 functions as a receptacle for documents that are determined not to be suitable for handling or which are otherwise deemed not suitable for later recovery and dispensing to a customer. In the preferred embodiment dump area 132 comprises a tray which can be moved outward on the housing of the machine to facilitate cleaning and removal of documents when the interior of the machine is accessed.

The operation of the currency recycling automated banking machine will now be explained through an example of the operative steps and functions carried out in connection with a deposit transaction by a customer. It should be understood that this is only an example of one manner in which the machine may be operated. Other methods of operation and functions may be achieved based on the programming of the machine.

Figure 64:
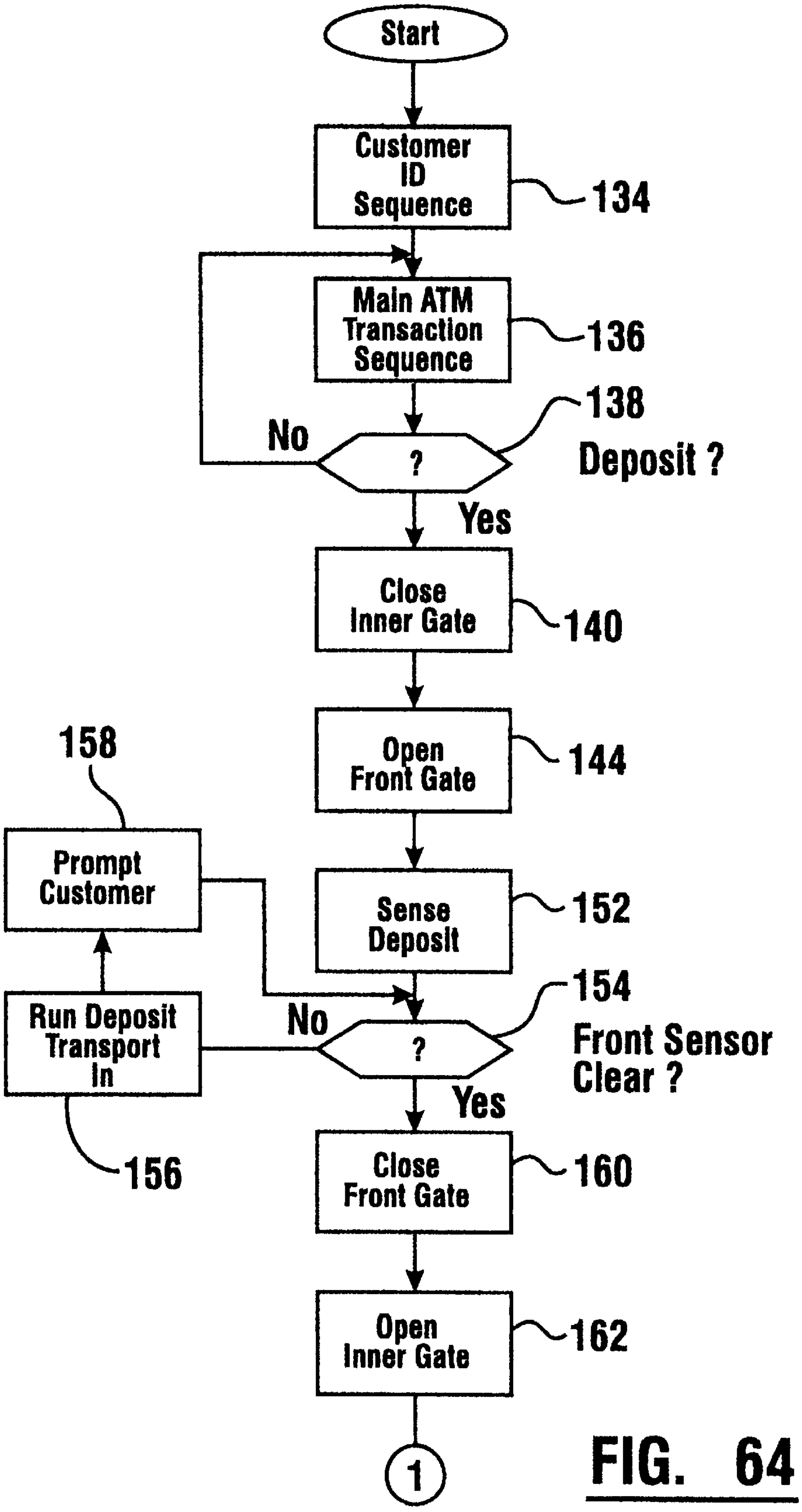
FIGS. 64–68 are a simplified flow chart showing an exemplary transaction flow for a deposit transaction conducted at a currency recycling automated banking machine of the present invention.

The transaction flow for the deposit transaction is shown in FIGS. 64–68. A customer approaching the machine 10 operates the components in the customer interface area 14 to this enable operation of the machine. This may include for example insertion of a credit or debit card and the input of a personal identification number (PIN). Of course other steps may be required by the customer to identify themselves to the machine. This may include other modes of operation such as finger print identification or biometric type devices. These steps which the customer goes through to identify themselves to the machine is represented in FIG. 64 by the customer ID sequence which is indicated 134.

After the customer identifies themselves to the machine, the machine is programmed to proceed through the main transaction sequence generally indicated 136. This main transaction sequence preferably provides the customer with a menu of the various transaction options that are available to be conducted at the machine 10. The transaction flow proceeds in FIG. 64 from a step 138 in which a customer chooses to conduct a deposit transaction which involves the input of documents, such as currency bills or notes.

Figure 4:
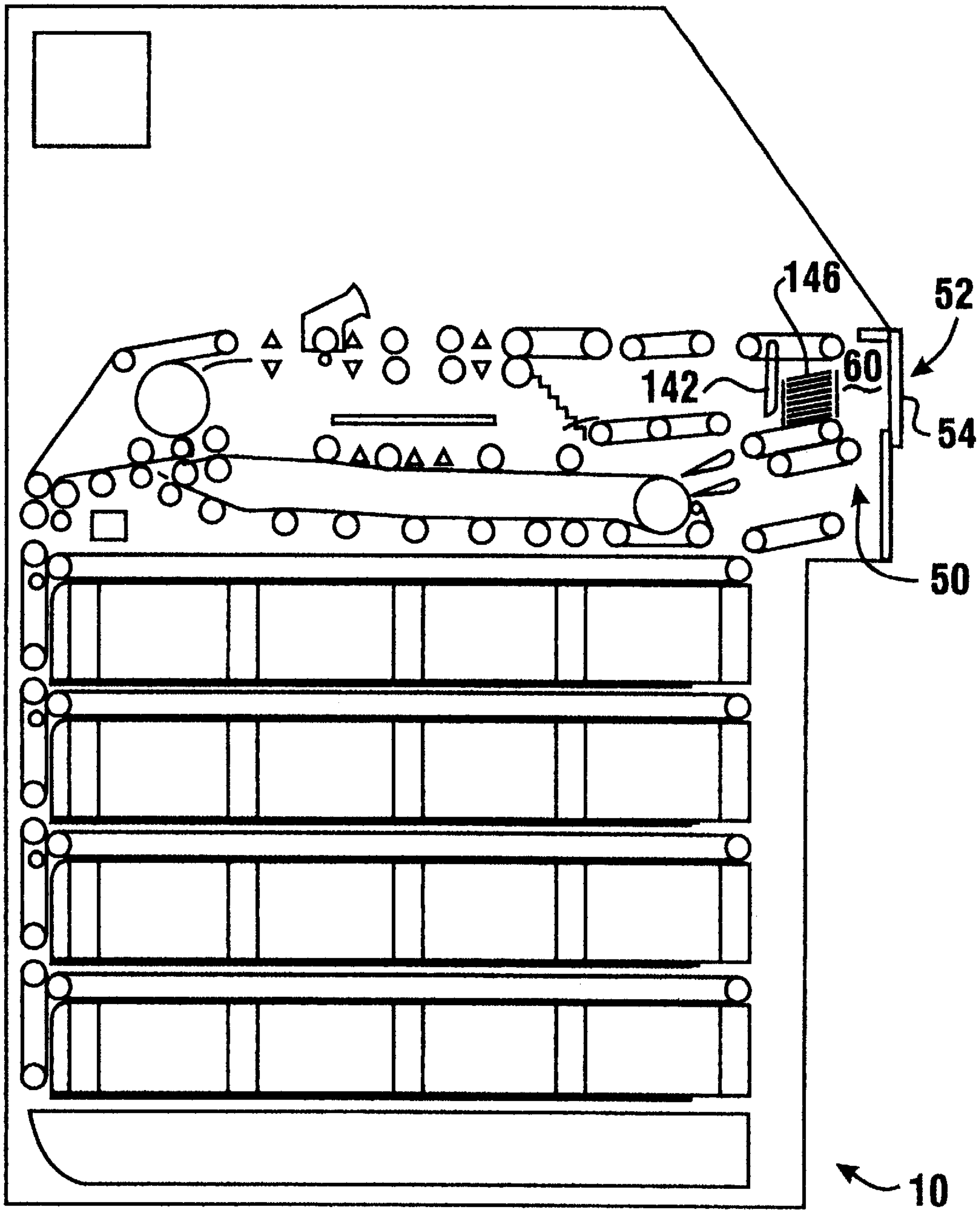
FIG. 4 is a view similar to FIG. 1 schematically representing input of a stack of documents by a customer.
Figure 5:
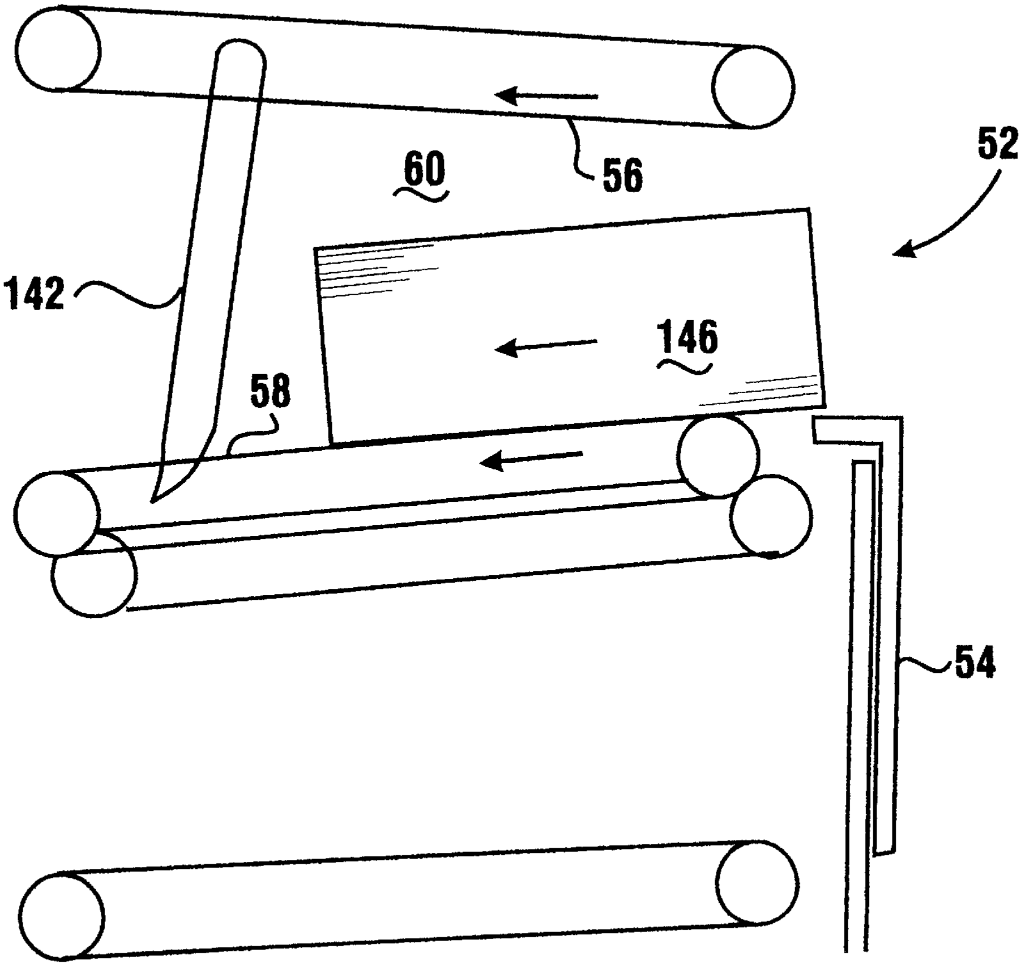
FIG. 5 is a schematic view of the input/output area shown receiving a stack of documents from a customer.

When the customer indicates that they intend to make a deposit the machine next executes a step 140. In step 140 an inner gate indicated 142 in FIGS. 4 and 5 moves to block further access to the interior of the machine from delivery/reject area 60. After the inner gate 142 is extended, the program next executes a step 144 in which the front gate 54 on the machine is moved to uncover opening 52. In this position a customer is enabled to insert a stack of documents indicated 146 in FIG. 5 into the delivery/reject area 60 between belts 58 and 56. As shown in FIG. 5, belts 58 and 56 may also be run inwardly to help to position the stack 146 against the inner gate 142.

Figure 6:
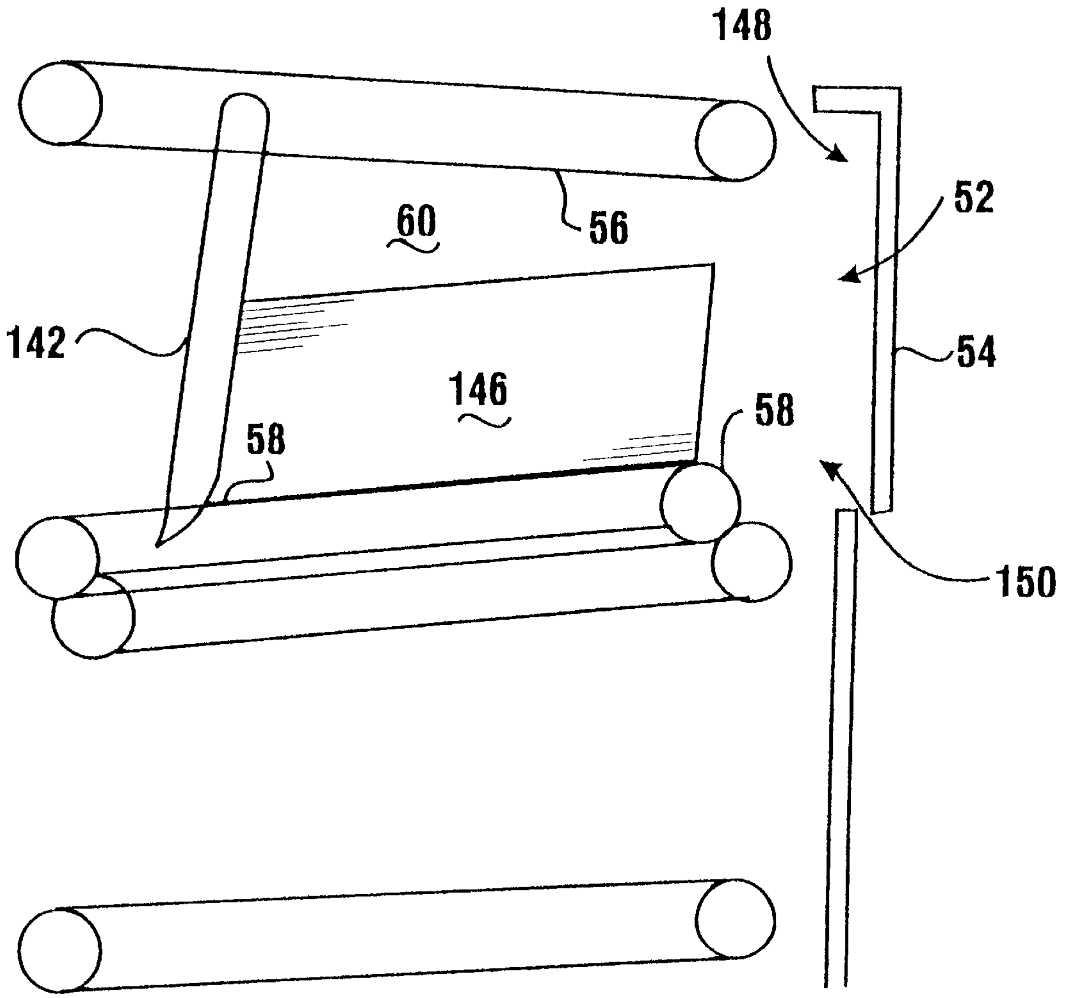
FIG. 6 is a view similar to FIG. 5 showing the document stack after it has been placed inside the machine.

As shown in FIG. 6, delivery/receipt sensors 148, 150 are positioned inside the housing of the machine adjacent to opening 52. In the transaction flow, as shown in FIG. 64, a step 152 is executed to determine if the deposit stack 146 has been moved past the sensors. A determination is made at a step 154 as to whether the sensors are clear. If sensors 148 and 150 are not clear, a step 154 is carried out. In step 154 efforts are made to clear the sensors. This is done by running the transport belts 56 and 58 inward at a step 156 and prompting the customer at step 158 to input their deposit. A check is then made again to see if the sensors have cleared. Provisions are made in the transaction flow so that after a number of tries to clear the sensors, the transport belts 56 and 58 are run in reverse to remove anything that has been input into the machine, and the gate 54 is closed.

If however the sensors 148 and 150 are clear indicating that a stack of documents has been properly inserted, the transaction flow moves to a step 160 in which the front gate 54 is again closed as shown in FIG. 6. The transaction flow then moves on to a step 162 in which the inner gate 142 is retracted so that the stack 146 can be further processed in the manner hereafter described.

Figure 7:
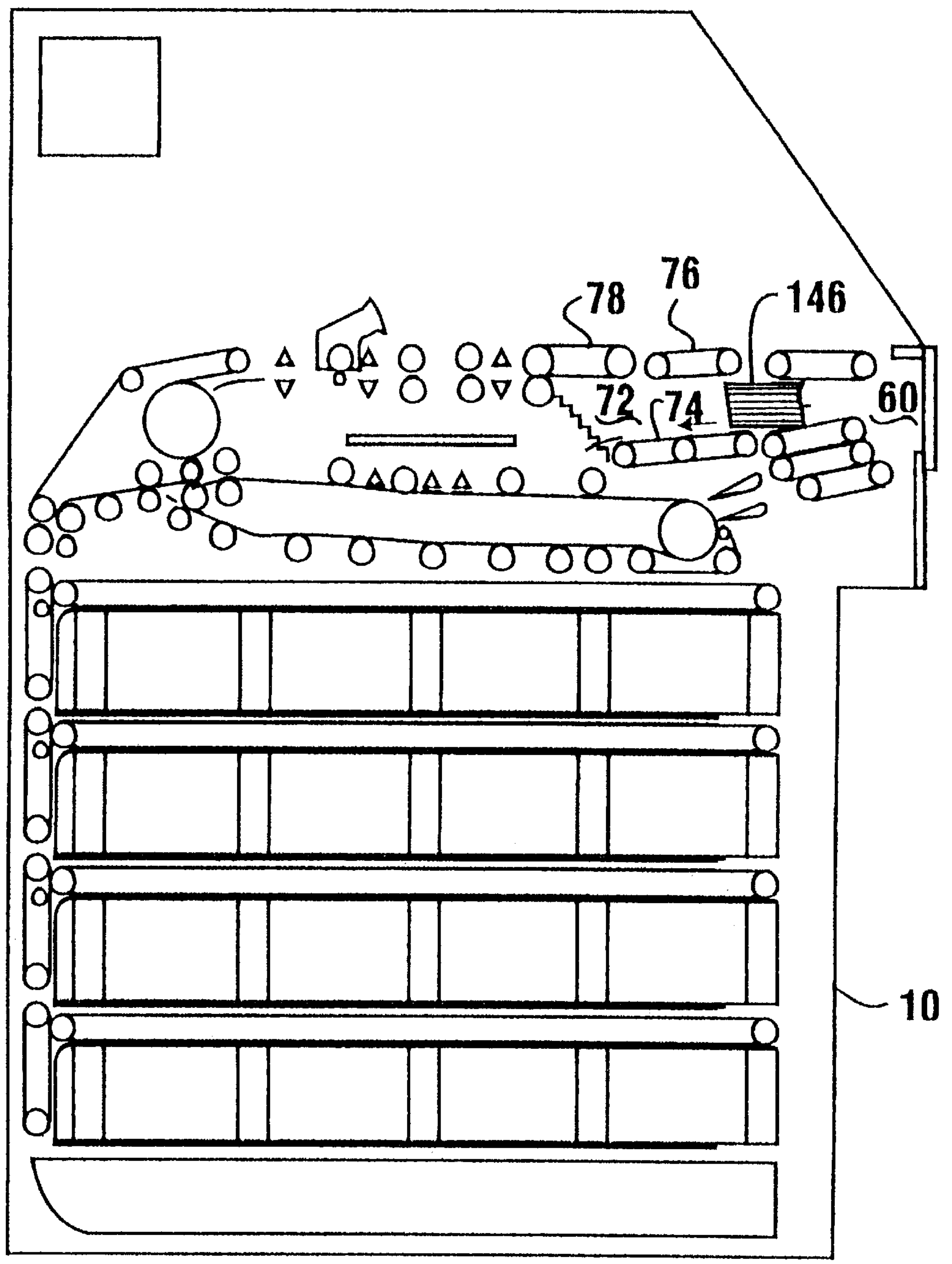
FIG. 7 is a schematic view similar to FIG. 1 showing an inserted document stack being moved from the input/output area of the machine to the document unstack area of the machine.
Figure 8:
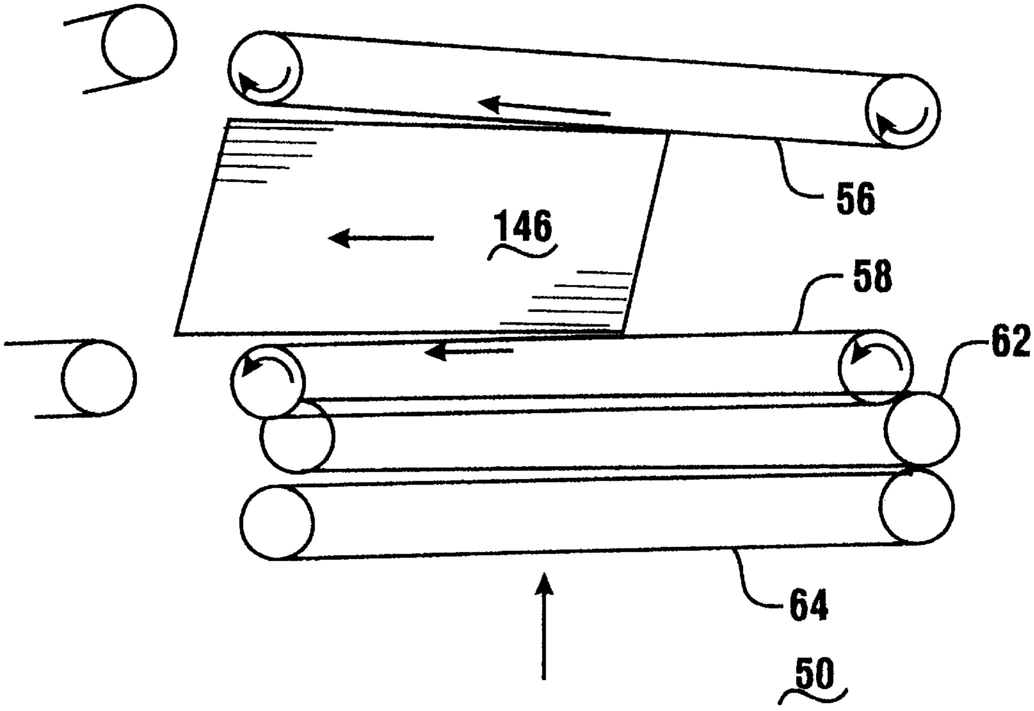
FIG. 8 is a schematic view showing the stack moving from the input/output area to the unstack area.
Figure 65:
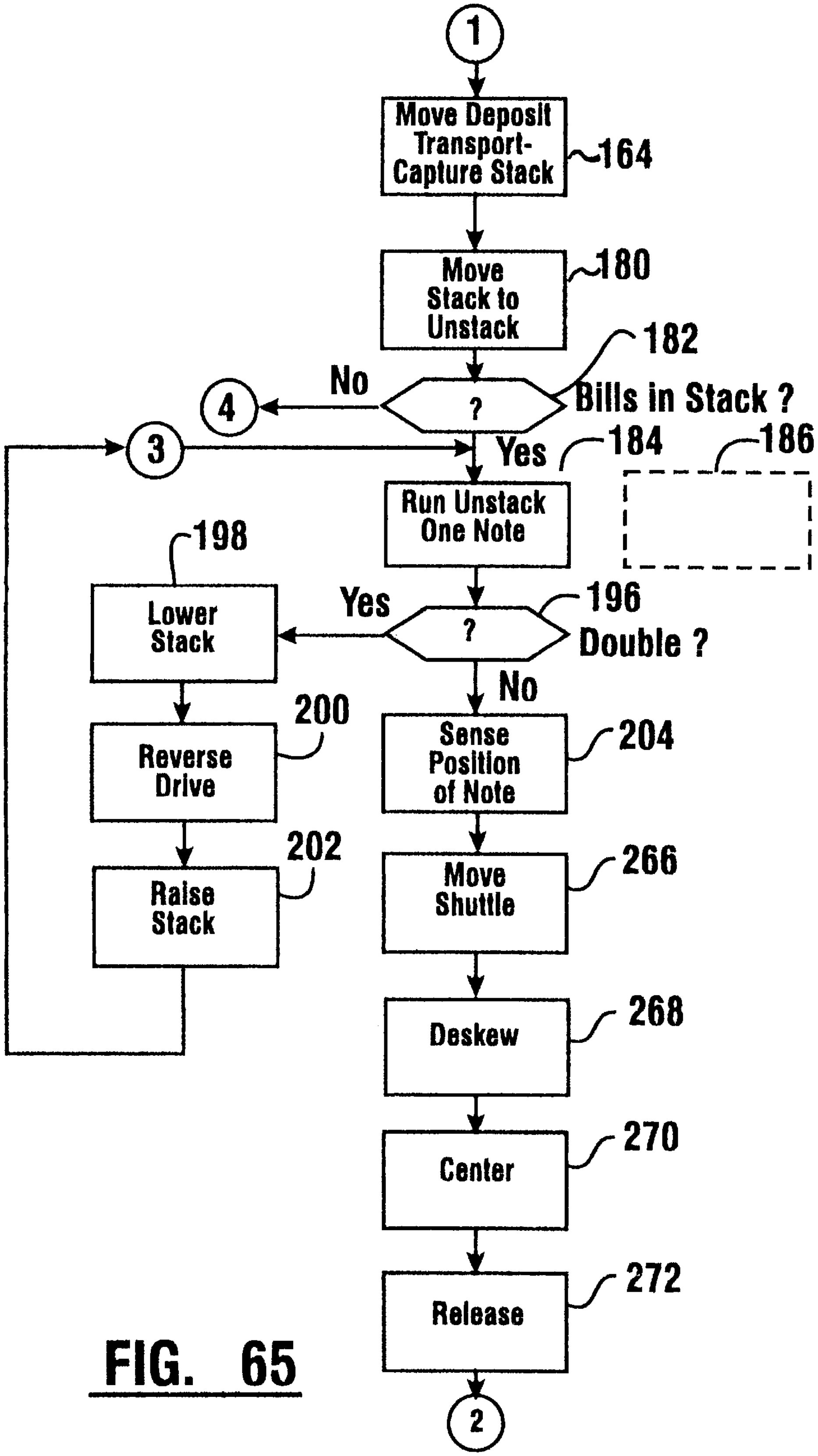

The stack is next moved as schematically shown in FIG. 7 from the delivery/reject area 60 to the unstack area 72. This is accomplished as shown in FIG. 65 by moving a carriage which supports fourth belts 64 upwards in the input/output area 50 as shown in FIG. 8. The carriage for belts 64 is moved upward to engage a carriage supporting belts 62 and 58 and to move it upward as well. The carriages move upward until stack 146 is sandwiched between belts 56 and 58. This is represented by step 164 in FIG. 65. Belts 58 and 56 are then driven to move the stack inwardly toward the unstack area 72.

Figure 9:
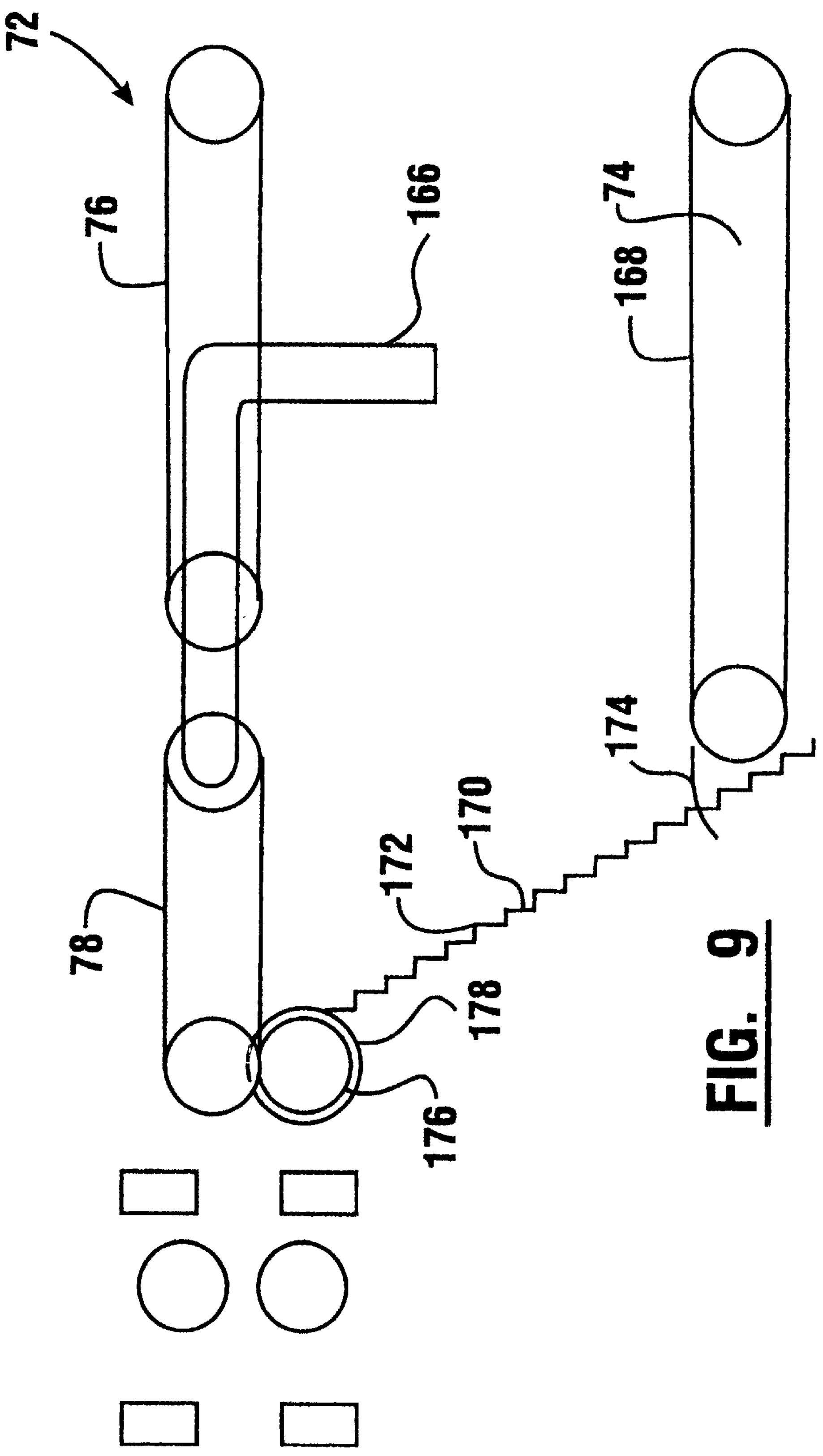
FIG. 9 is a schematic view of the unstack area of the machine prior to arrival of the stack.

The unstack area 72 is shown in greater detail in FIG. 9. It includes transport belts 76 and pick belts 78, which are independently operable by motors or other suitable driving devices. A strip back stop 166 is movably positioned in the area between transport belts 76 and belts 168 on tray 74. It should be understood that belts 76, 78 and 168 are arranged to be in intermediate relation when the tray 74 is moved adjacent thereto in a manner described in U.S. Pat. No. 5,507,481 the disclosure of which is incorporated herein by reference.

Unstack area 72 includes an unstack wall 170. Unstack wall 170 includes a plurality of steps 172 thereon, the purpose of which is later explained. Unstack wall 170 includes therein a plurality of generally vertically extending slots (not shown). Tray 74 includes a plurality of tray projections 174 which extend from an upper surface of the tray and into the slots. Adjacent to pick belt 78 are contact stripper wheels indicated 176 and non-contact stripper wheels 178, the function of which is later explained.

Figure 10:
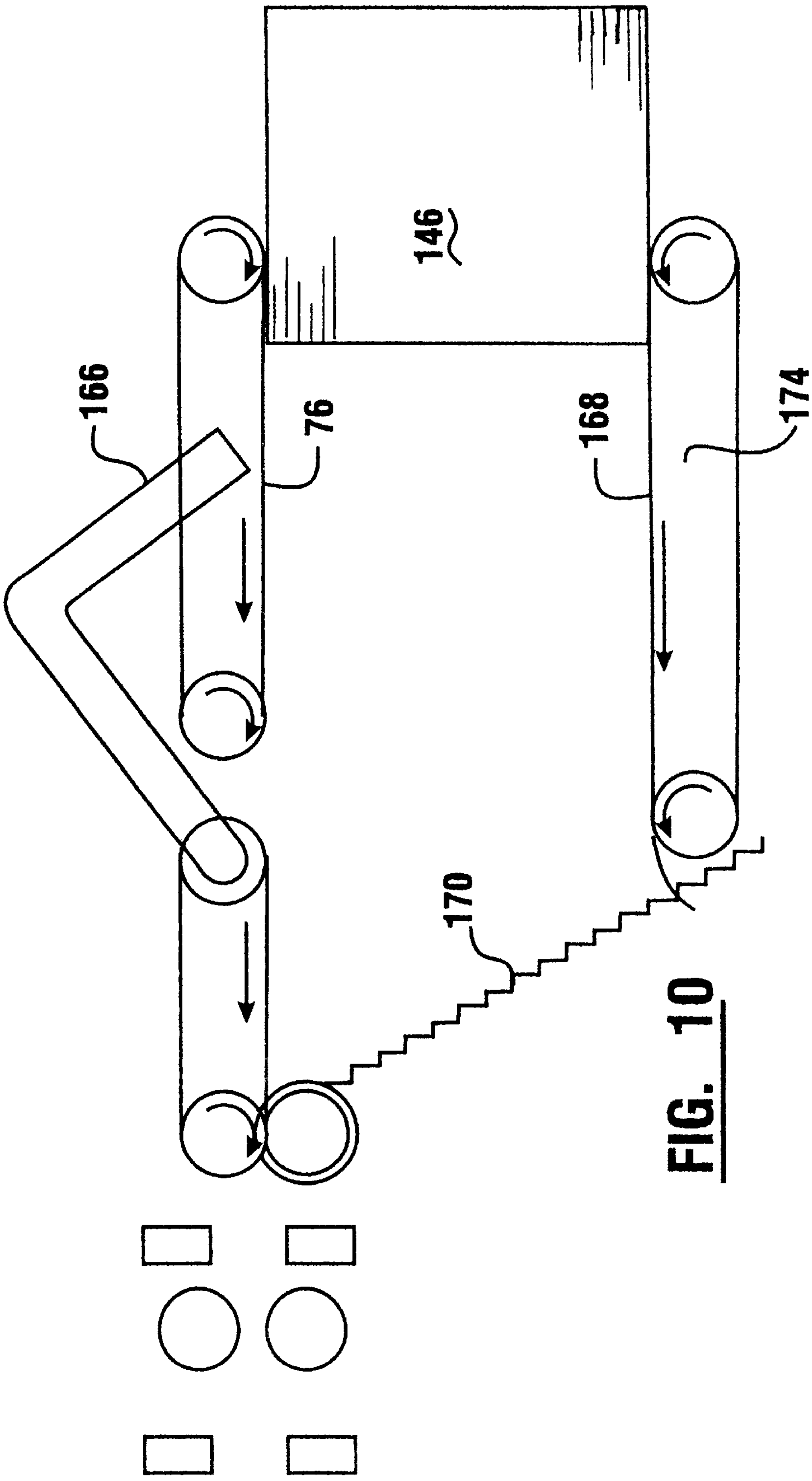
FIG. 10 is a schematic view of the unstack area showing a stack of documents being transported into the unstack area.

In operation of the machine the stack 146 is moved into the unstack area for unstacking. This is represented by a step 180 in FIG. 65. As shown in FIG. 10, in the step of moving the stack 146 into the unstack area, the tray 174 is moved sufficiently away from the transport belts 76 so that stack 146 may be moved therebetween. The backstop 166 is raised to allow entry of the stack. Transport belts 76 and tray belts 168 move forward so that stack 146 moves towards unstack wall 170. In the preferred form of the invention tray 74 is spring biased upwards and once stack 146 is moved therebetween the stack is held between belts 168 on tray 74 and transport belts 76 and pick belts 78 by the biasing force acting on the tray.

Figure 11:
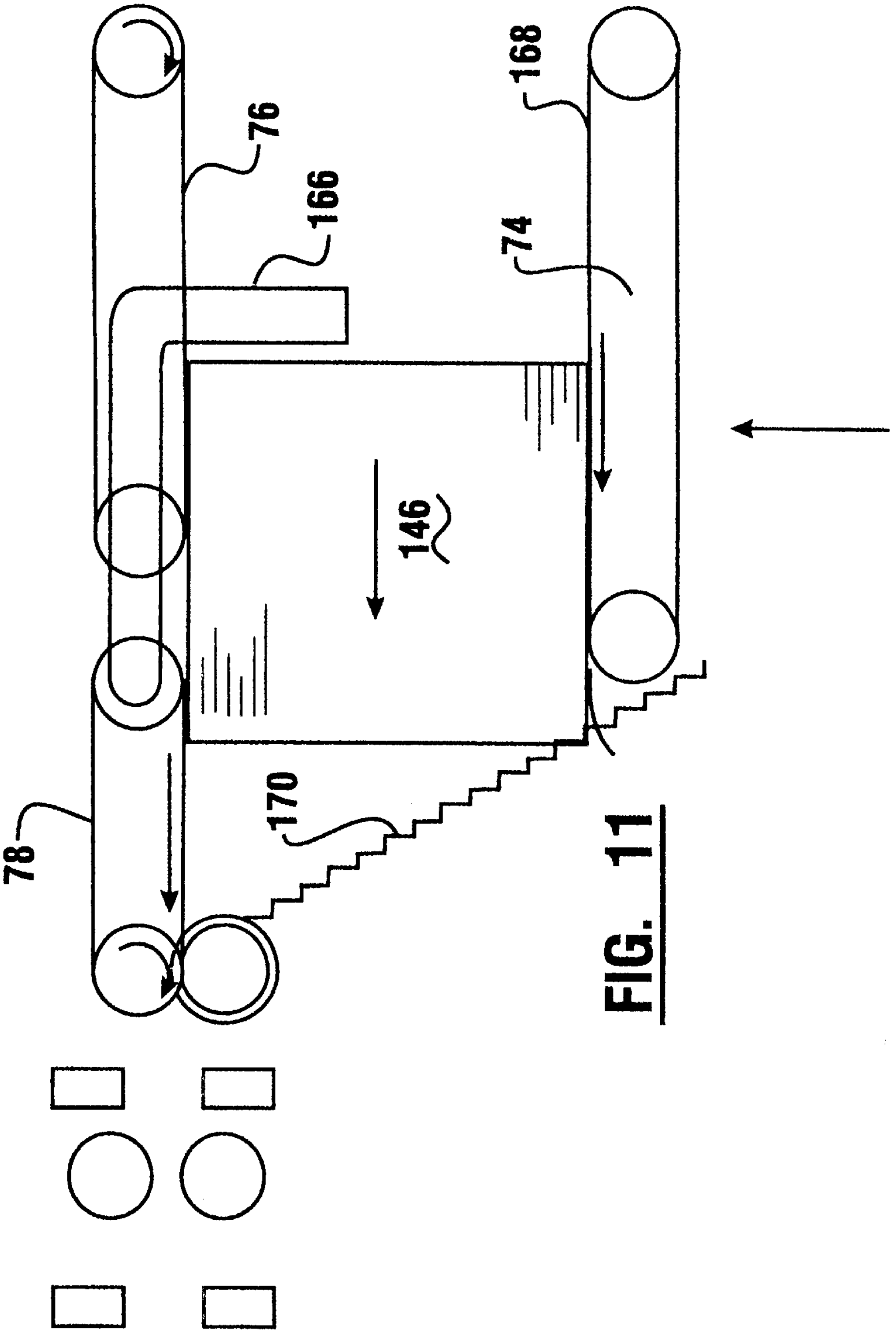
FIG. 11 is a view similar to FIG. 10 showing the stack of documents moving into position for unstacking.
Figure 12:
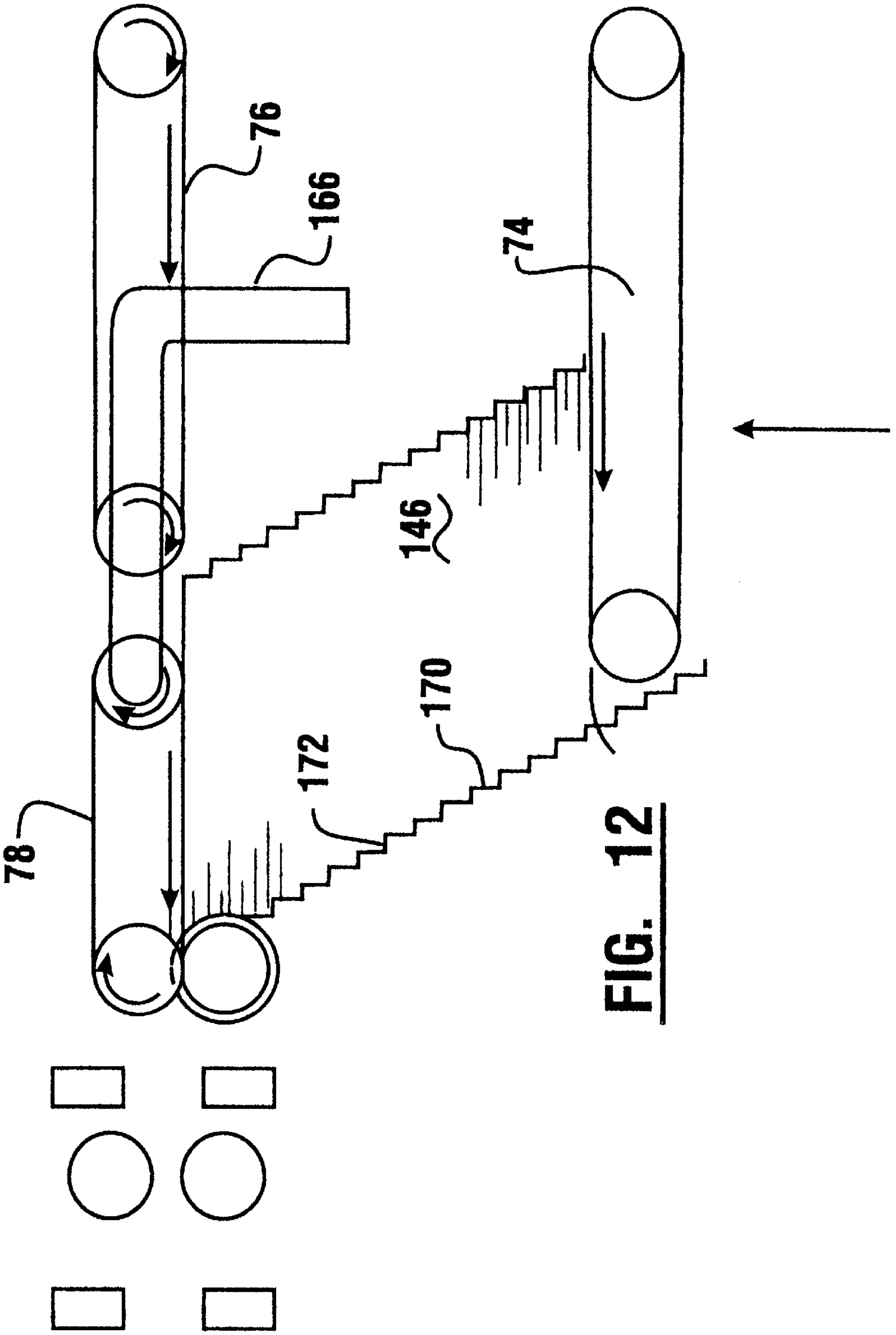
FIG. 12 is a view similar to FIG. 11 with the documents in position for unstacking in the unstack area.

As shown in FIG. 11, once the stack 146 moves past the backstop 166, the backstop is lowered to be in position behind the stack. As later discussed, the backstop is particularly useful when stripping double notes which may be picked during the unstack operation. As shown in FIG. 11 belts 78 are further run in the forward direction to move stack 146 towards wall 170. As shown in FIG. 12 when the stack is fully moved against the wall 170, the steps 172 on the wall tend to splay the sheets in the stack. This splaying of the sheets tends to break the surface tension between the adjacent sheets and facilitates the separation of each adjacent sheet from one another. It should be noted that the steps 172 are configured in a progression so that the engagement of the sheets in the stack 146 with the steps 172 do not interfere with the movement of tray 74 upward as sheets are removed from the stack. This enables tray 74 to apply a continuous upward biasing force such that the upper most sheet in the stack engages pick belts 78.

Referring again to the transaction flow in FIG. 65, once the stack has been moved to the unstack position a check is made at a step 182 to verify the presence of bills in the unstack area. Assuming that bills are properly in position the flow then moves to an unstack routine at a step 184. As later explained in detail, the control system 30 of the present invention is a novel type control system which facilitates the rapid operation of the machine. As represented by phantom step 186 the control system operates to perform tasks concurrently. As a result, rather than unstacking a single note in the manner hereafter described and then waiting for it to be processed, the preferred embodiment of the control system 30 unstacks a note and as soon as that note has left the unstack area, proceeds to unstack another note. This enables providing a stream of separated sheets which are concurrently moving in the central transport under control of the control system. This greatly speeds the operation of the machine.

Figure 13:
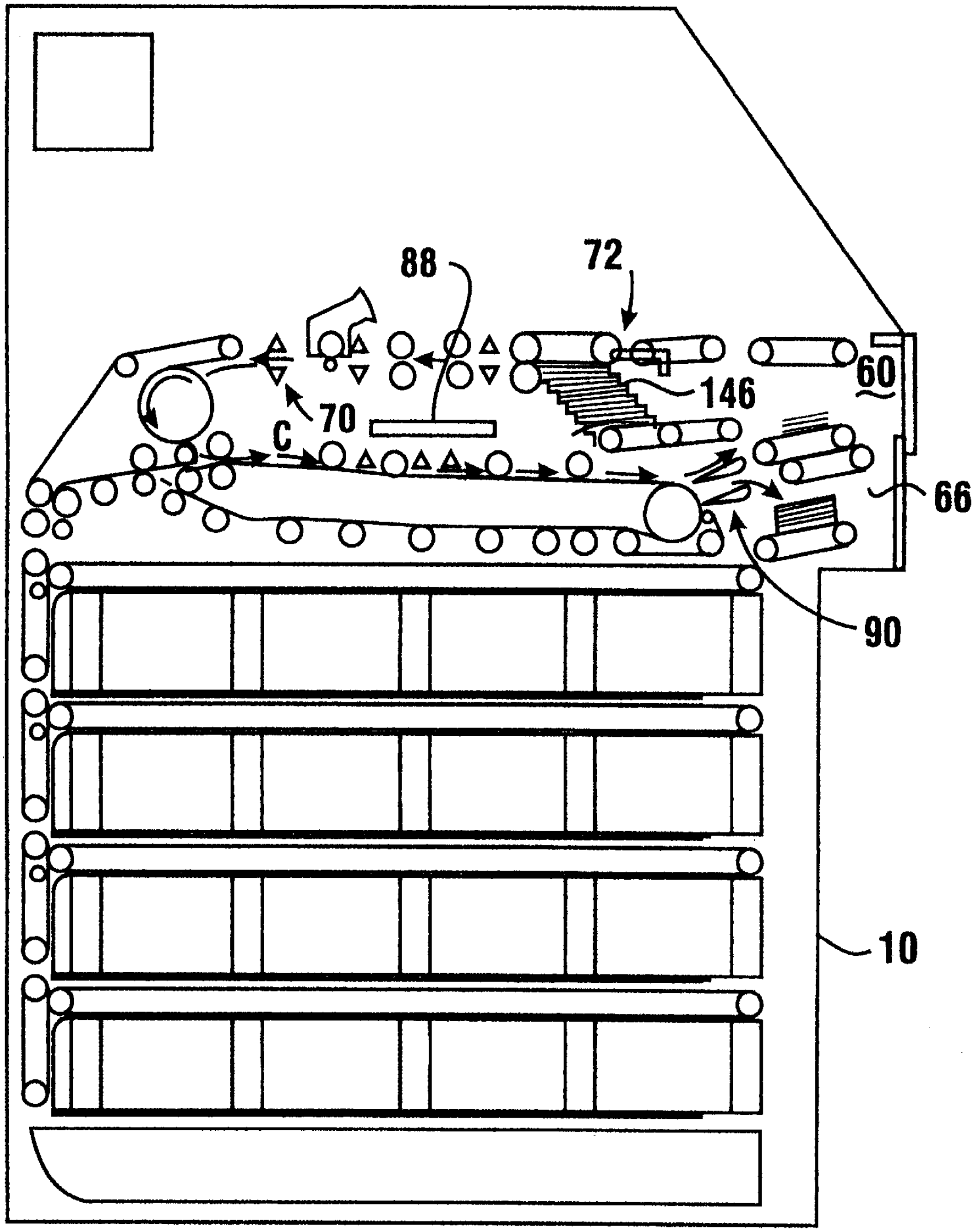
FIG. 13 is a view similar to FIG. 1 showing documents passing from the unstack area through the central transport to the reject and escrow areas of the machine.

The operation of the machine in the unstack operation is schematically represented in FIG. 13. As shown therein, the stack 146 in the unstack area 72 is separated into single sheets which are moved through the central transport 70 in the direction of Arrows C. The notes are then selectively directed for reasons later explained by divert gates 90 into either the delivery/reject area 60 or the escrow area 66.

Figure 14:
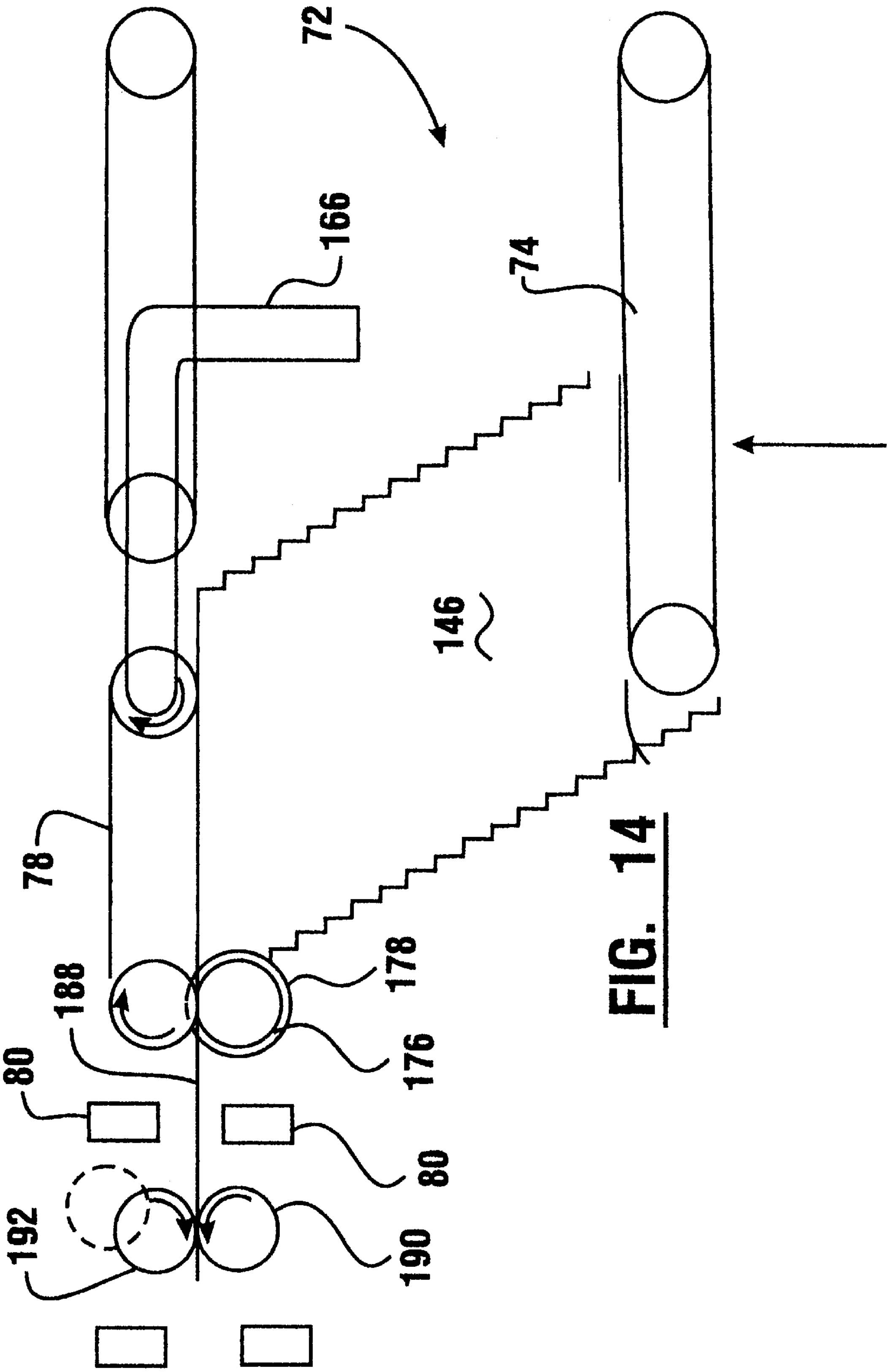
FIG. 14 is a view similar to FIG. 12 showing a document being unstacked in the unstack area.
Figure 16:
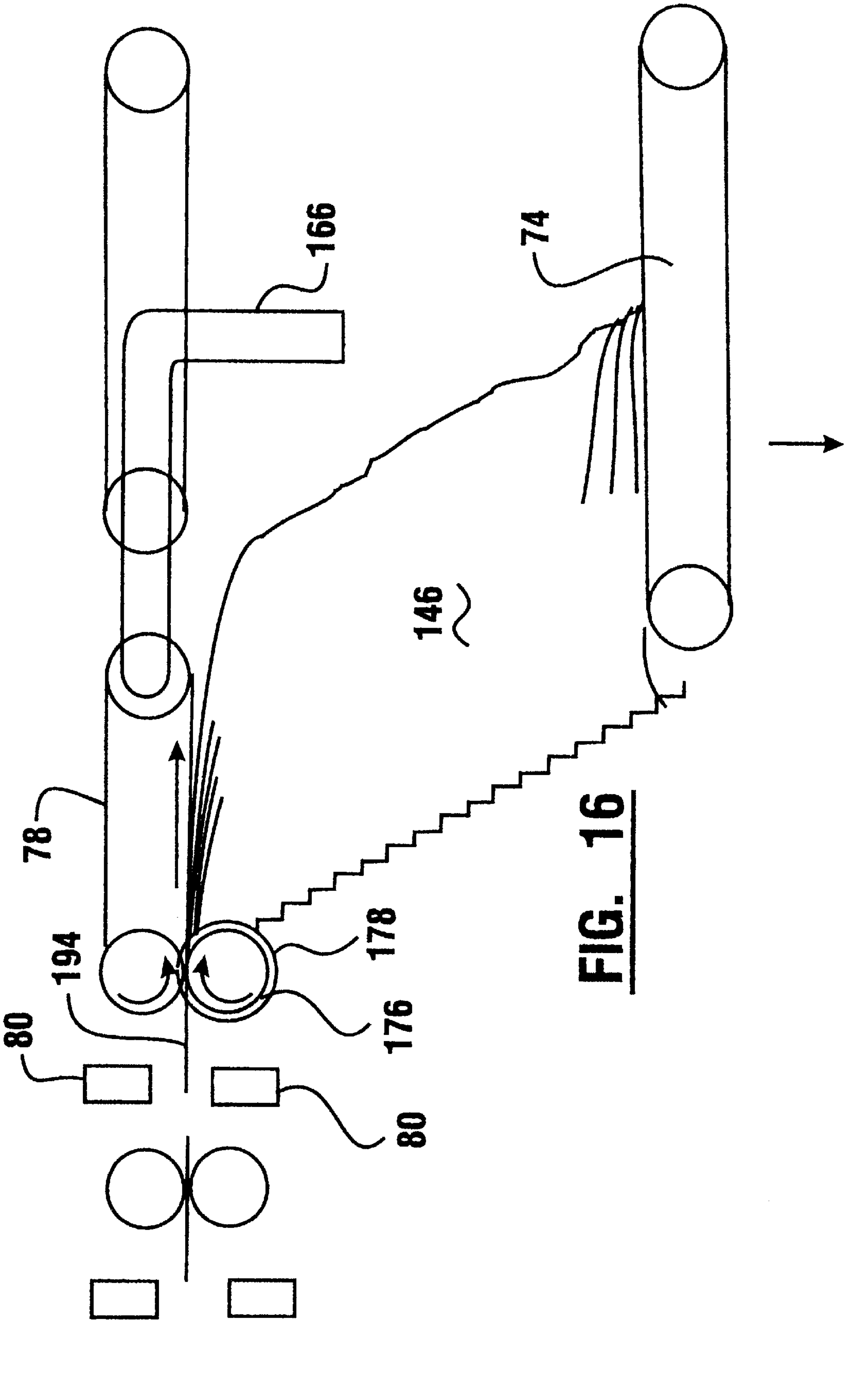
FIG. 16 is a schematic view showing a double note being retracted into the stack.
Figure 17:
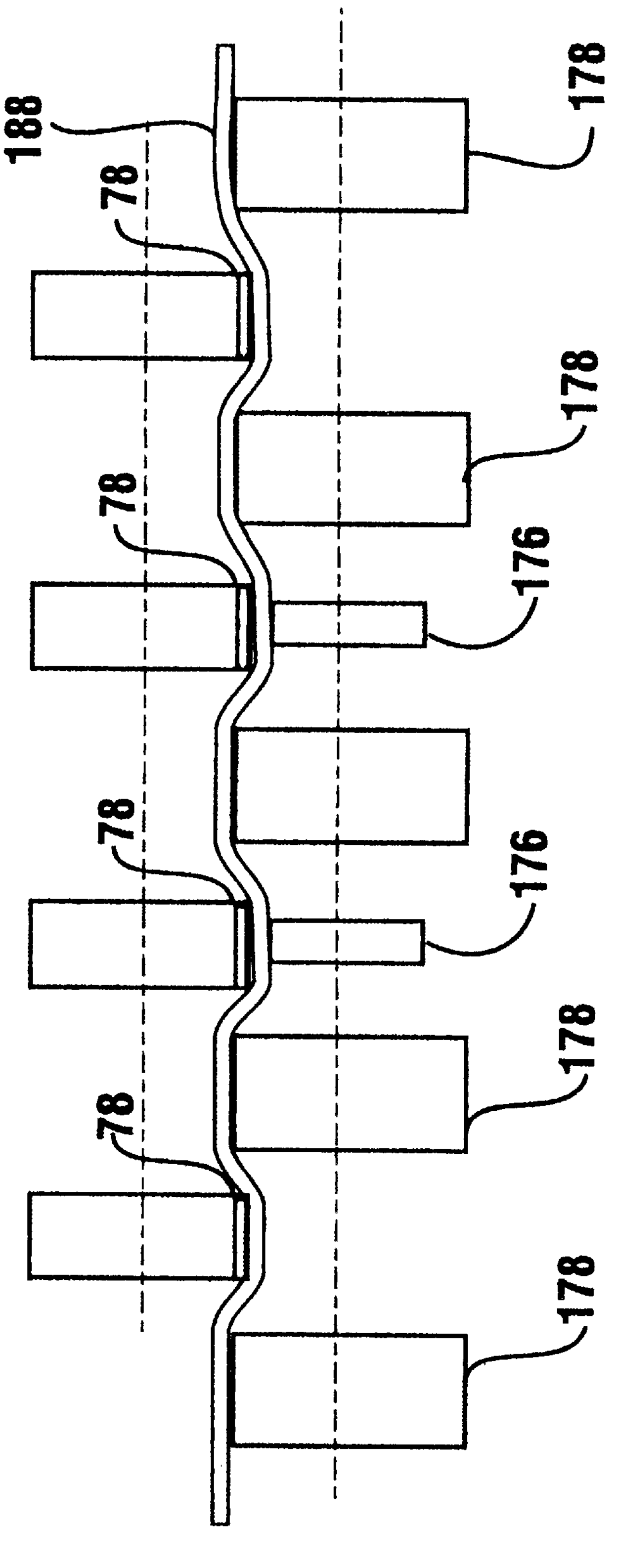
FIG. 17 is a cross sectional view of a mechanism used for unstacking notes in the unstack area.

The operation of the machine to unstack sheets in the unstack area 72 is explained with reference to FIGS. 14–17. The stack 146 is biased upwards against the pick belts 78 by the tray 74. The lower flight of belts 78, which is engaged with the top sheet in the stack, is moved towards the left in FIG. 14 to pick a sheet 188. As shown in FIG. 17 the pick belts 78 are supported on rollers and extend beyond the outer circumference of abutting non-contract stripper wheels 178. Contact stripper wheels 176 are arranged in generally abutting relation opposite the inner two strip belts 78. As the strip belts move to the left, as shown in FIG. 14, the contact stripper wheels and non-contact stripper wheels 176 and 178 do not move. This serves to keep sheets other than the top sheet in the stack.

Referring again to FIG. 14, if the sheet 188 that is moved from the stack is a single sheet, this condition is sensed by the doubles sensors 80. This means that the sheet is suitable for movement in the central transport. The sheet then moves past the doubles sensors 80 into the vicinity of take away rolls 190, 192. In response to the sheet being sensed as a single sheet, take away roll 192 moves from the position shown in phantom to the position shown in solid lines in which wherein it is in engagement with the sheet 188. The take away rolls 192, 190 are driven in the directions indicated to move the sheet away from the stack. The driving of the take away rolls is timed by the control system 30 to assure that sheet 188 is properly spaced a distance from the proceeding unstacked sheet moving through the central transport.

Figure 15:
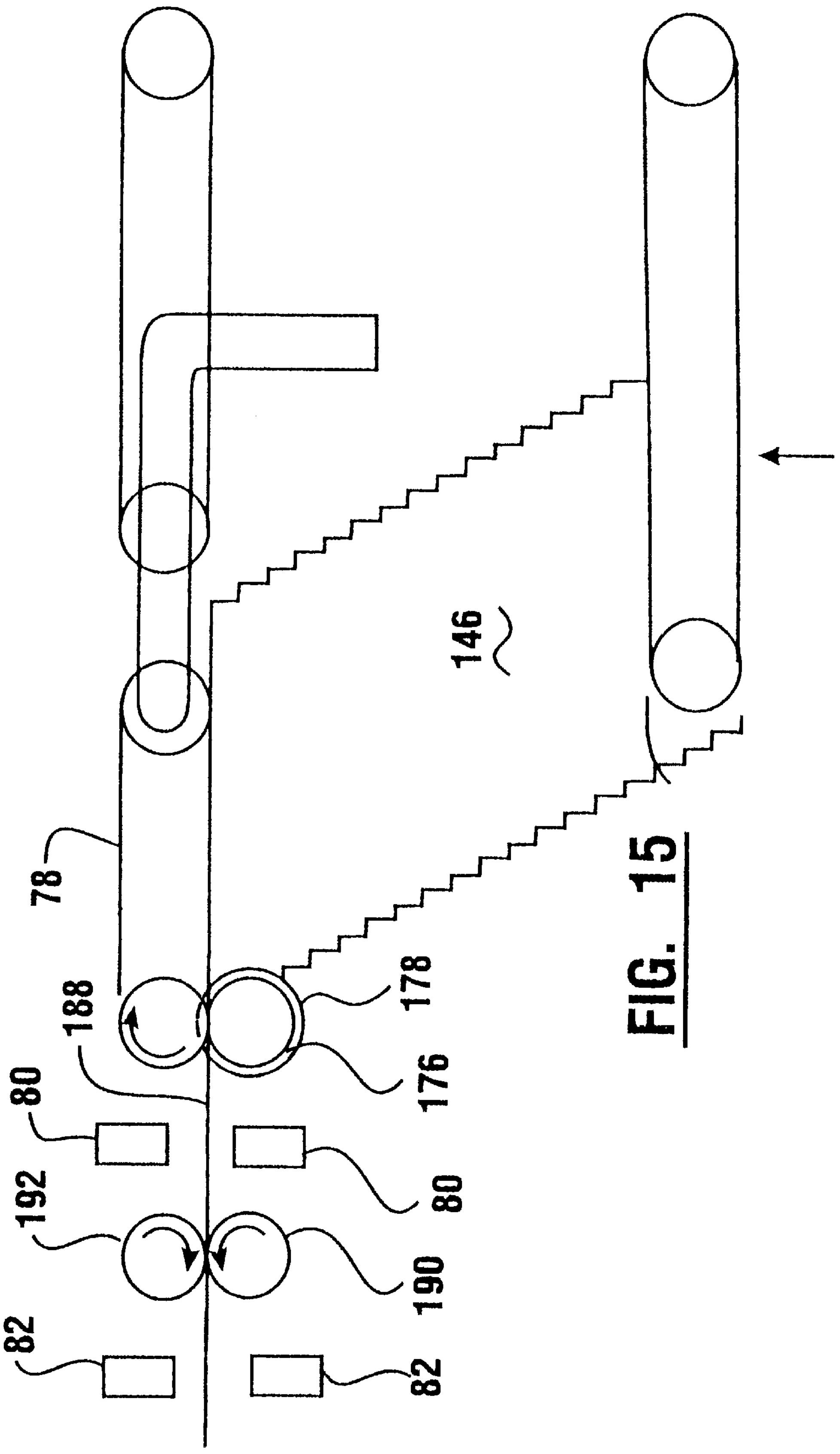
FIG. 15 is a view similar to FIG. 14 showing a document being removed from the stack and moving past the sensors for sensing doubles and pre-centering.

As shown in FIG. 15 sheet 188 is moved by take away rolls 190 and 192 past pre-centering sensors 82. The pre-centering sensors operate in a manner later described to sense the position of the edges of the sheet. The signals from the pre-centering sensors 82 are used by the control system 30 to move a shuttle which is associated with deskewing and centering operations for the sheet. The control system moves the shuttle transversely in the transport path to a position in which it is enabled to catch the moving sheet in the manner that will enable the sheet to be aligned. This is particularly valuable when the sheets which are removed from the stack are of different sizes.

It should be understood that while the U.S. has currency which is the same size for all denominations, other countries use different sized documents for various currency types. It is a fundamental advantage of the present invention that the documents inserted by a user need not be arranged so that the documents are all of the same size, nor do the documents need to be oriented in any particular direction in order to be handled by the preferred embodiment of the invention. The unstacking mechanism of the preferred embodiment is particularly well adapted to unstacking the sheets having various sizes and which may not necessarily be positioned so as to be in alignment with the wall 170, particularly for the sheets in the middle of the stack 146.

In the event that a double bill is sensed by doubles sensors 80, the bills can be separated. A double bill is indicated in FIG. 16 by sheets 194 which for purposes of this example, are considered to be two overlapped sheets. To separate these sheets pick belts 78 are stopped and tray 74 is moved downward so that the stack 146 is no longer biased against the lower flights of pick belts 78.

Pick belts 78 are then run backwards such that the lower flight thereof is moved to the right as shown. This pulls sheets 194 back into the stack. The contact stripper wheels 176 and the non-contact stripper wheels also rotate to facilitate pulling the sheets back into the stack. This is accomplished in the preferred embodiment by having the stripper wheels operated by a one way clutch. The stripper wheels may rotate freely in the direction shown in FIG. 16, but may not rotate in the opposed direction. The movement of belts 78 pulls the sheets 194 back into the stack. The strip backstop operates to prevent the sheets from moving too far and falling out of the stack.

Once the sheets 194 are returned to the top of the stack the tray 74 is again raised and a picking operation is attempted. Generally one or more repeated attempts to strip the sheets will be successful such that sheets are continuously removed from the stack 146 one by one.

The transaction flow associated with the sensing of doubles and efforts to strip the top sheet are represented in FIG. 65. In a step 196 a determination is made as to whether a double has been sensed during the unstack routine. If so, the step associated with lowering the stack 198 is executed. The pick belts are moved in reverse in a step 200 to pull the doubles back into the stack and the stack is then raised at a step 202. As previously discussed, the unstack routine is then started again. Of course if doubles are not sensed when a sheet is picked, the sheet moves past the pre-centering sensors 82 and the transverse position of the note in the transport is sensed at a step 204.

After a document passes the pre-centering sensors, it then moves to the deskew and aligning device 84. This device is adapted to catch a moving sheet and align its leading edge transversely to the direction of travel of the sheet in the sheet path. Once the leading edge of the sheet has been transversely aligned the device 84 operates to move the sheet so that its center line is in alignment with the center line of the transport path. Doing this enables the document to be more rapidly identified for reasons which are later explained.

Figure 20:
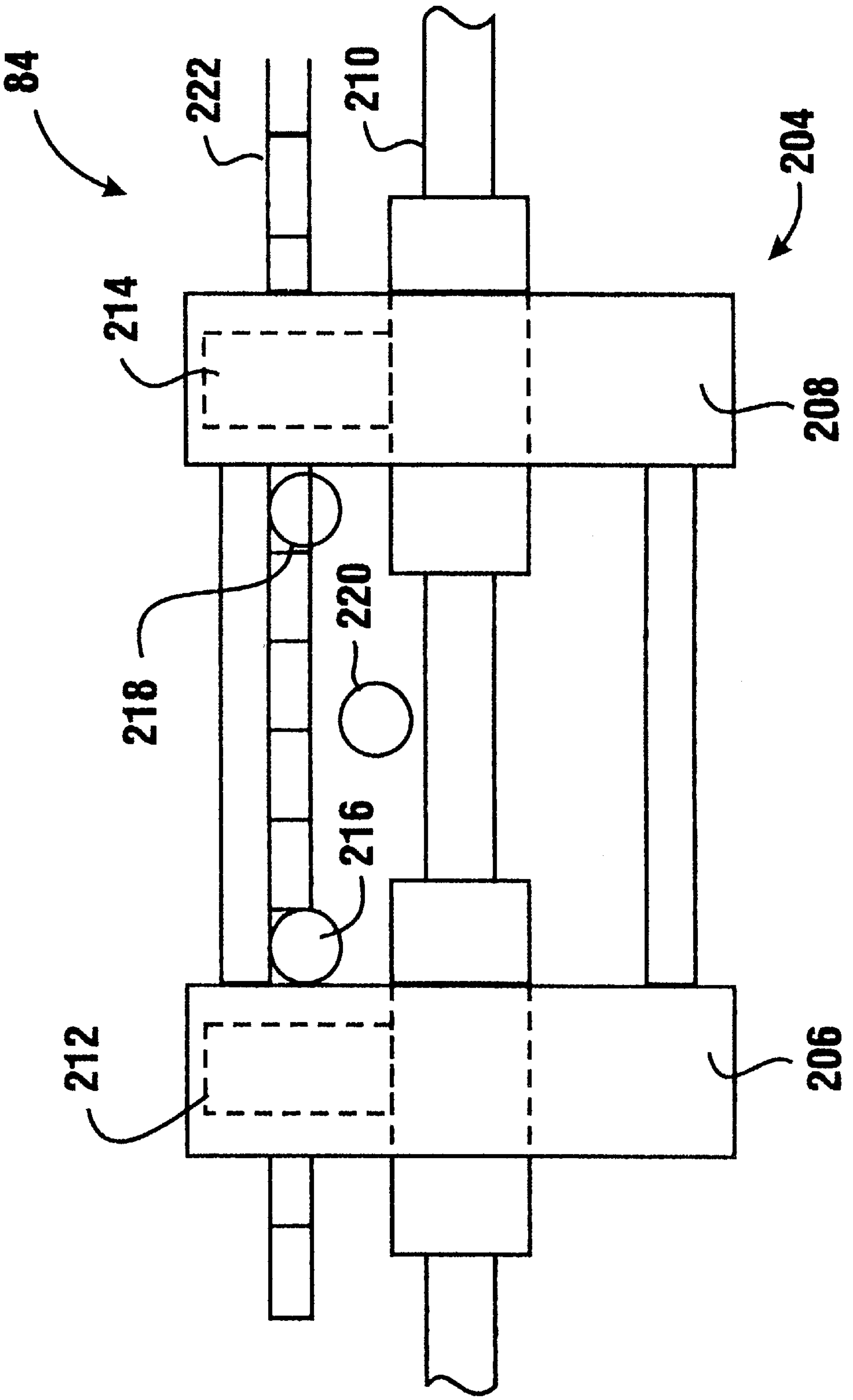
FIG. 20 is a top plan view of a shuttle used for deskewing and centering documents in the central transport.

As shown in FIG. 20 the deskew and alignment device includes a shuttle indicated 204. The shuttle is comprised of a pair of shuttle halves 206 and 208. Each shuttle half is connected to a drive shaft 210 which operates to move pinch wheels 212 and 214 on the shuttle halves in the manner hereafter explained. The shuttle 204 is also movable transversely on drive shaft 210. The shuttle also includes a first sensor 216 adjacent to shuttle half 206 and a second sensor 218 adjacent to shuttle half 208. The shuttle also includes a middle sensor 220. The pinch rolls engage a segmented idler shaft 222.

Figure 18:
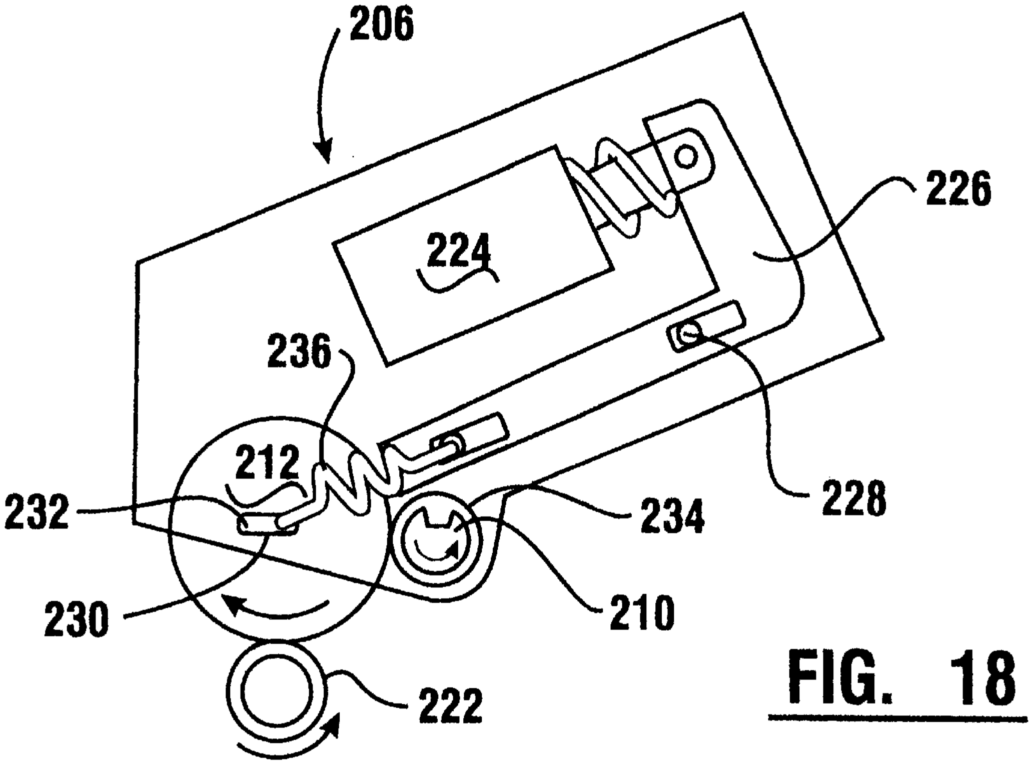
FIG. 18 is a schematic view of a shuttle half which is part of a deskewing mechanism, the shuttle half being shown in a note passing position.

Referring to FIG. 18, shuttle half 206 is schematically shown therein. The shuttle half includes a solenoid 224. Solenoid 224 is connected to a movable brake rod 226 which is movable on pins 228. The pinch wheel 212 revolves around a center pin 230. The center pin 230 is movably mounted in a slot 232 on the body of the shuttle half 206.

The drive shaft 210 is a splined type shaft as shown. The shaft 210 extends through a drive wheel 234 which is mounted for rotation on the body of the shuttle half 206.

As shown in FIG. 18 when the solenoid 224 is not energized the pinch wheel 212 is biased into engagement with the drive wheel 234 by a spring schematically indicated 236. The pinch wheel 212 rotates in response to rotation of the drive shaft 210. The rotation of the pinch wheel 212 also engages the independently rotatable segments of the segmented shaft 222. Documents are enabled to pass through the nip between pinch wheels 212 and 222 in response to rotation of pinch roll 212 by the drive wheel 234.

Figure 19:
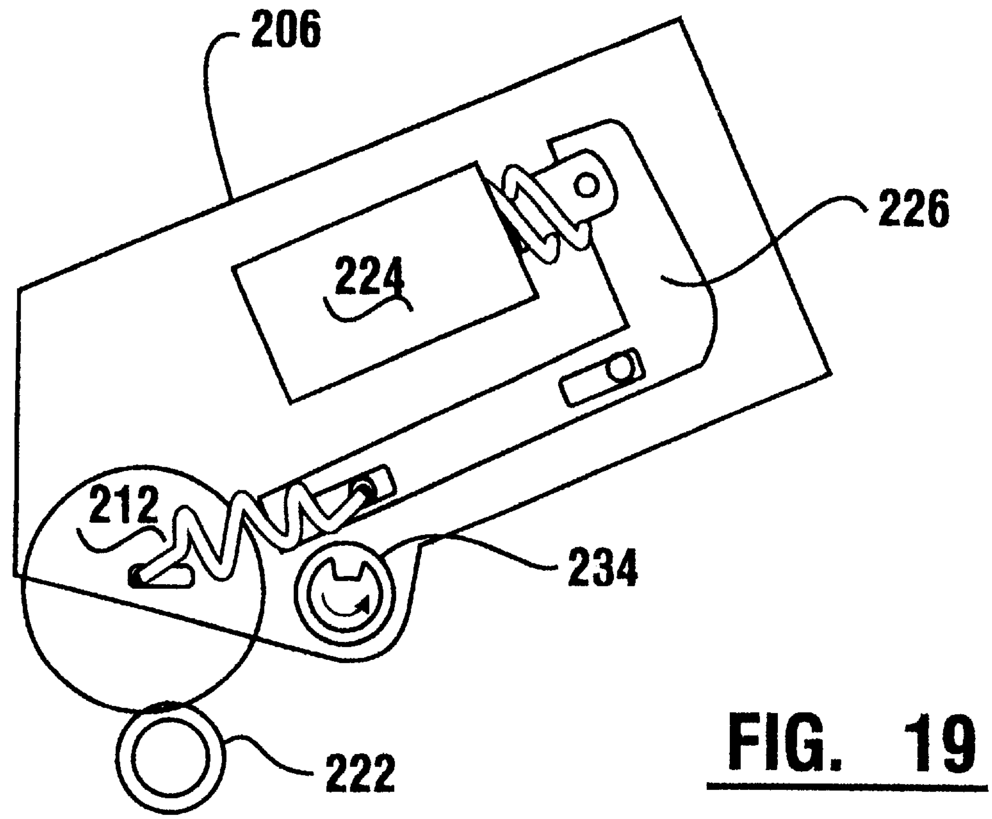
FIG. 19 is a view similar to FIG. 18 showing the shuttle half in a note stopping position.

As shown in FIG. 19, when the solenoid 224 is energized the brake rod 226 moves. The movement of the brake rod causes the brake rod to engage pinch wheel 212. As the brake rod engages the pinch wheel, the pinch wheel is displaced from the drive wheel 234 and is prevented from moving until the solenoid is again de-energized and the brake rod is retracted. As a result, any document that is positioned in the nip between pinch roll 212 and segmented shaft 222 when the solenoid is energized, will be stopped in this position. The documents is prevented from moving in the area of the nip until the solenoid is de-energized.

Figure 21:
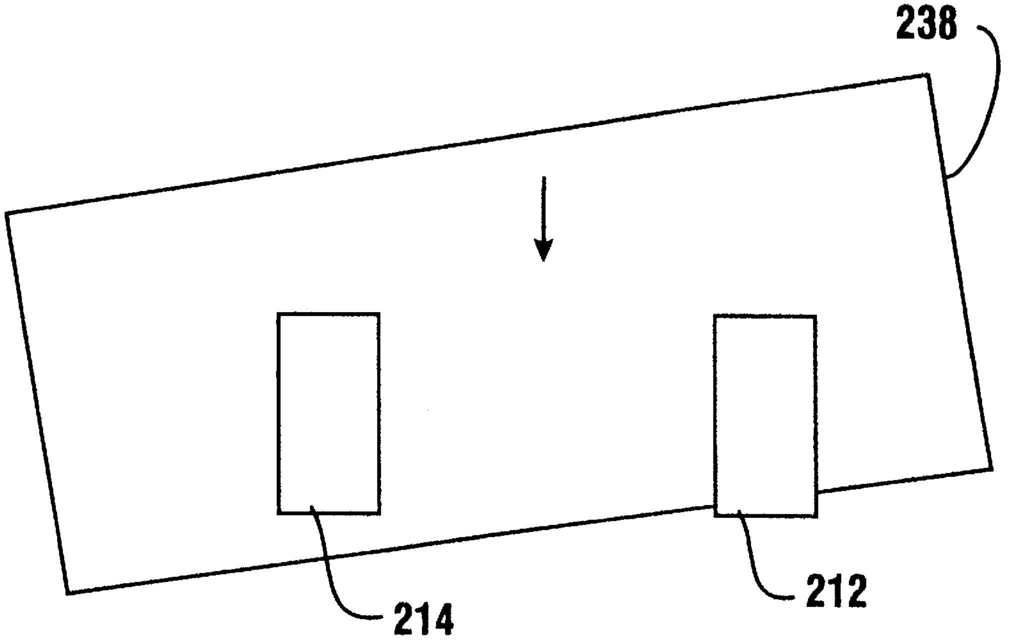
FIG. 21 is a schematic view of a skewed note.
Figure 22:
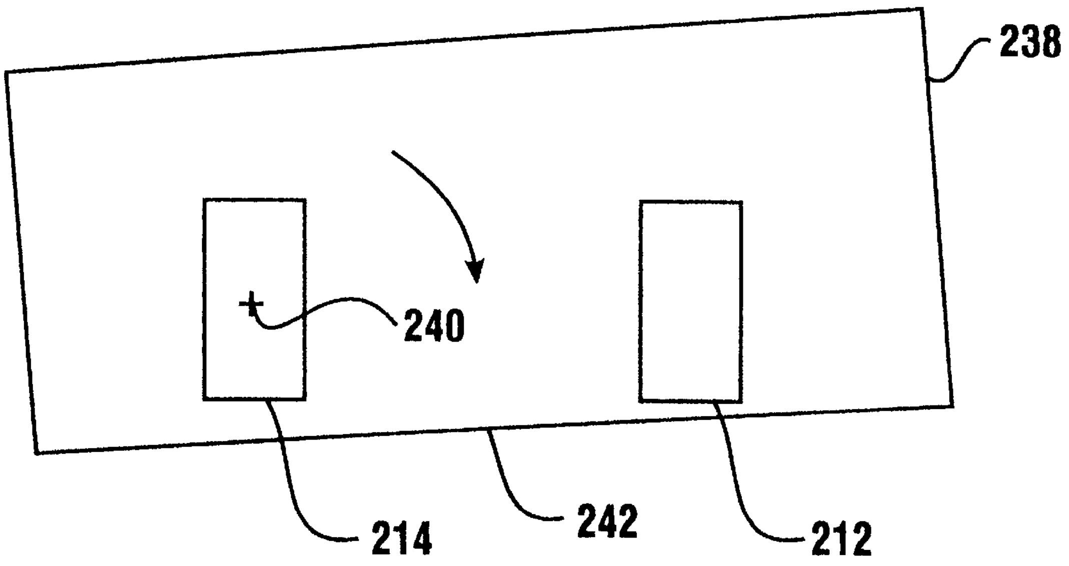
FIG. 22 is a schematic view similar to FIG. 21 showing the note being deskewed by the operation of the shuttle.

The operation of the shuttle is schematically indicated in FIGS. 21–24. As shown in FIG. 21 a sheet or document 238 is shown moving in the direction of the arrow in the sheet path. The shuttle is moved prior to arrival of the sheet in a transverse direction on the drive shaft 210 so that pinch rolls 212 and 214 will both engage the sheet. This is done by the control system 30 based on the signals from the pre-centering sensors 82 which are upstream of the shuttle 204. The shuttle is moved transversely in the sheet path by a fast acting motor or other suitable device.

In response to the sheet 238 moving into the area adjacent to the pinch rolls, the sensors 216, 218 and 220 sense the sheet. Because the sample sheet 238 is skewed, the sensor adjacent to pinch roll 214 which is sensor 218, will sense the leading edge of the sheet first. When this occurs, the solenoid associated with the shuttle half 208 energizes, stopping movement of pinch roll 214, while roll 212 continues to rotate in response to rotation of shaft 210. As a result, sheet 238 begins to rotate about the pinch point 240 created between the stationary roll 214 and segmented shaft 222. Sheet 238 moves such that its leading edge 242 begins to move into an aligned condition in a direction transverse to the direction of sheet movement.

Figure 23:
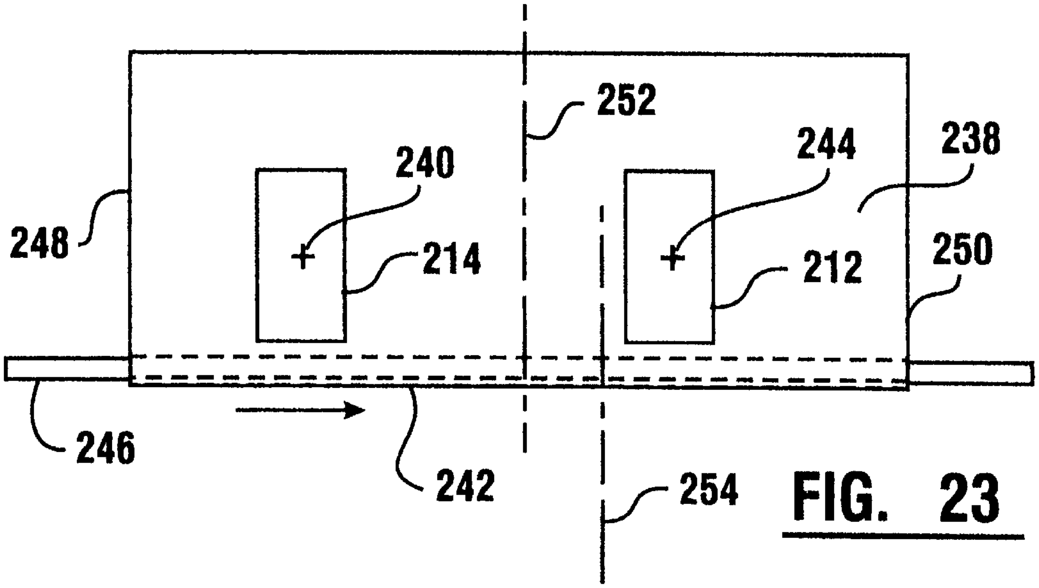
FIG. 23 is a view similar to FIG. 22 showing the note aligned transversely to the direction of travel in the central transport but in an off center condition.

As shown in FIG. 23, sheet 238 rotates about pinch point 240 until leading edge 242 is transversely aligned with the sheet path. When an aligned condition is reached, the solenoid 224 is energized to stop movement of pinch roll 212. This produces a second pinch point 244 between the note 238 and the idler shaft 222.

Figure 24:
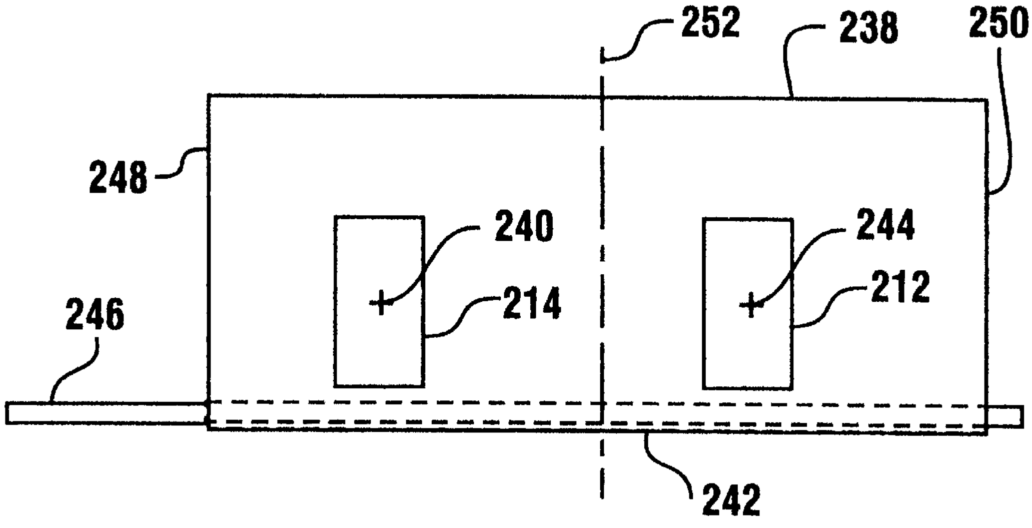
FIG. 24 is a schematic view of the note shown in FIG. 23 having been moved by the shuttle to a centered position in the central transport.
Figure 25:
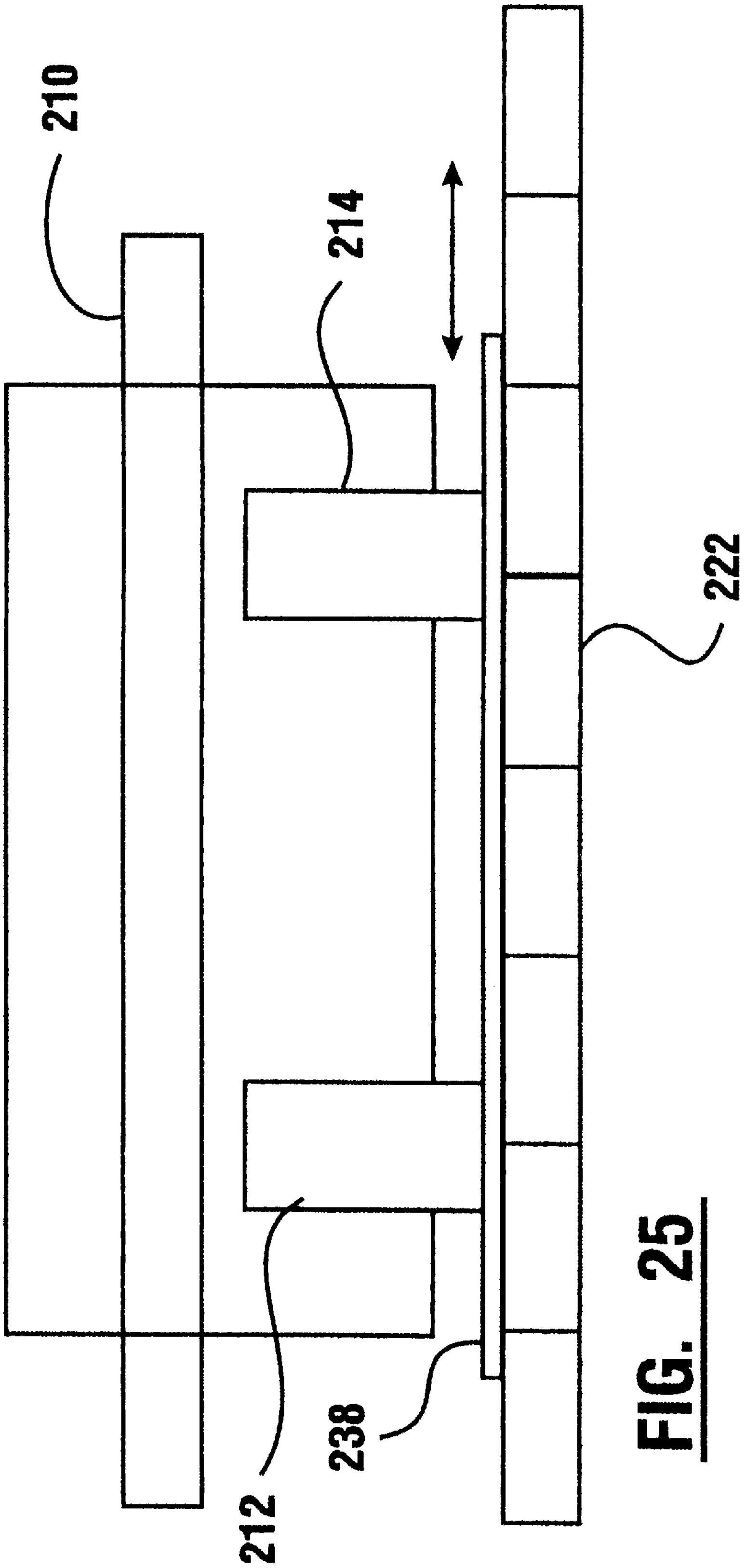
FIG. 25 is a schematic view showing the shuttle moving a document transversely to the direction of travel in the central transport.

In the stopped condition of the note shown in FIG. 23, the leading edge 242 of the sheet extends in the sheet path beyond centering sensors, generally indicated 246. The centering sensors are operative to sense the side edges of the sheet indicated 248 and 250 in FIG. 23, in a manner hereinafter described. Upon sensing the side edges the control system 30 determines the position of a center line of the sheet 238. This center line is indicated schematically in FIG. 23 as 252. The shuttle then moves the sheet transversely in the manner indicated in FIG. 25. The sheet is moved in engaged relation between the pinch rolls 212 and 214 and the segmented idler shaft 222. As shown in FIG. 24, sheet 238 is moved to the right such that the sheet center line 252 is in alignment with a center line of the transport path 254.

Once the sheet has been deskewed in this manner and has been moved into a centered relation in the transport path, the solenoids operating the pinch rolls 212 and 214 are released simultaneously to discharge the sheet 238 from the shuttle. This is done in the manner which assures that sheet 238 is properly spaced from a preceding sheet. Optimally the sheet is not delayed any longer than is absolutely necessary to assure that the sheet is properly oriented.

Figure 26:
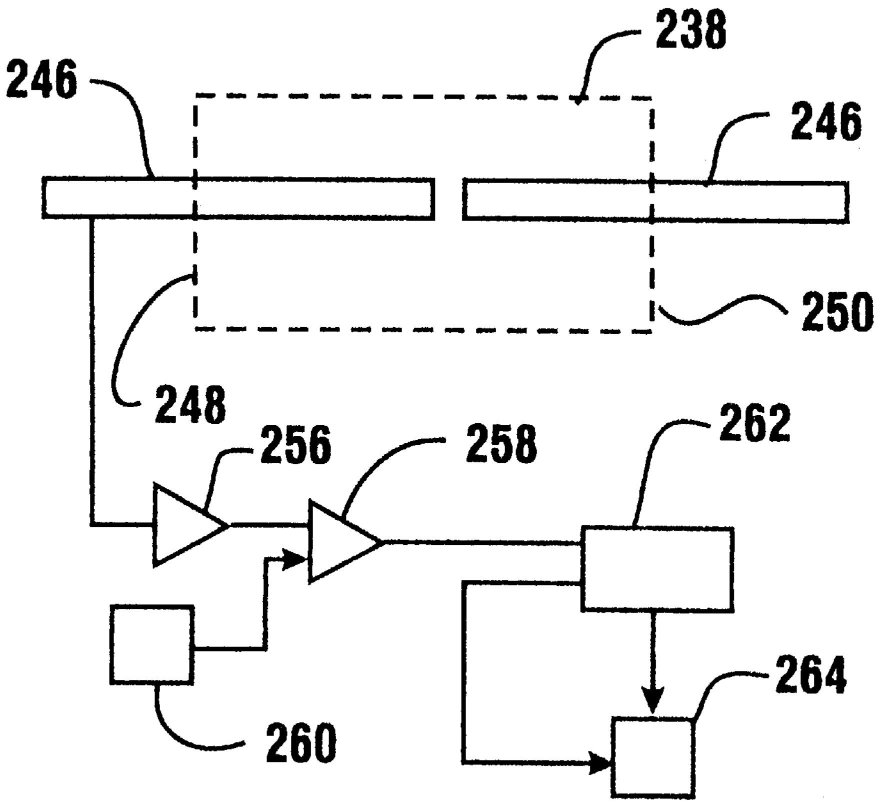
FIG. 26 is a schematic view of the pre-centering and centering circuitry used in connection with a preferred embodiment of the present invention.

The schematic view of the components of the centering circuit which is used in connection with the centering sensors 246 and the pre-centering sensors 82 is schematically indicated in FIG. 26. In the preferred embodiment of the invention the sensors 246 are charged coupled devices (CCDs) which are used for sensing edges of the sheet. An emitter is provided on an opposed side of devices for providing a radiation source for sensing the edges of the sheet. Signals from the sensors 246 are transmitter to an amplifier 256. Signals from the amplifier are forwarded to a digitizing comparator 258. The digitizing comparator is provided with a threshold input from an interface 260.

A trip point output from the interface 260 is determined by a software routine that adjust the threshold input for the presence of a note based on the radiation received by the sensors when no note is present. This enables adjusting the sensors for changes during the operation of the device, such as changes in the intensity of the emitters or accumulation of dirt on the emitters or sensors.

The output from the digitizing comparator is transmitted to a programmable logic device 262. The programmable logic device determines the position of the edge of the note and transmits output signals along with timer signals to a processor 264. The processor generates signals in accordance with its programming to move the shuttle to the desired position. In the case of the pre-centering sensors, the shuttle is moved to a position to ensure that it encounters the note. In the case of the centering and deskew operation sensors the shuttle is moved to assure that the note is moved to align it with the center of the transport. The timing signals also track when the leading and trailing edges of the note encounter the sensors to enable the control system to maintain proper separation of the notes within the central transport. The signals from the sensors 246, as well as those from sensors 216, 218 and 220 on the shuttle, are used to assure that a note which has been released from the shuttle moves away in the proper coordinated fashion.

The logic flow associated with the deskew and alignment operations is shown with reference to the steps shown in FIG. 65. As indicated by a step 266, the signals from the pre-center sensors 82 are used to move the shuttle to assure that it engages the note. A deskewing step 268 operates in the manner already described to align a leading edge of the note so that it extends transversely to the direction of sheet movement in the transport. At a step 270 the center line of the sheet is moved into alignment with the center line of the sheet transport. The sheet having been deskewed and aligned, it is released at a step 272 in a timed manner and continues on its way in the sheet path.

As shown in FIG. 13, after a document leaves the deskew and alignment device the document moves through the area of the central transport where it is sensed by various sensors associated with the identification device 88. In the preferred form of the invention the identification device is of a type shown in U.S. Pat. No. 5,923,413 filed Nov. 15, 1996 which is incorporated herein. This identification device is suitable for identifying the type and denomination of a passing document. It also is suitable for distinguishing genuine documents from suspect documents. An advantage of the device used in the preferred embodiment is its ability to identify a document despite the failure of the document to be in alignment with the sheet path. It should be understood that because of variable conditions, despite efforts made to orient the sheet, sheets may still be somewhat out of alignment at the time of analysis by the identification device. Of course in other embodiments, other devices for identifying sheets may be used.

Figure 27:
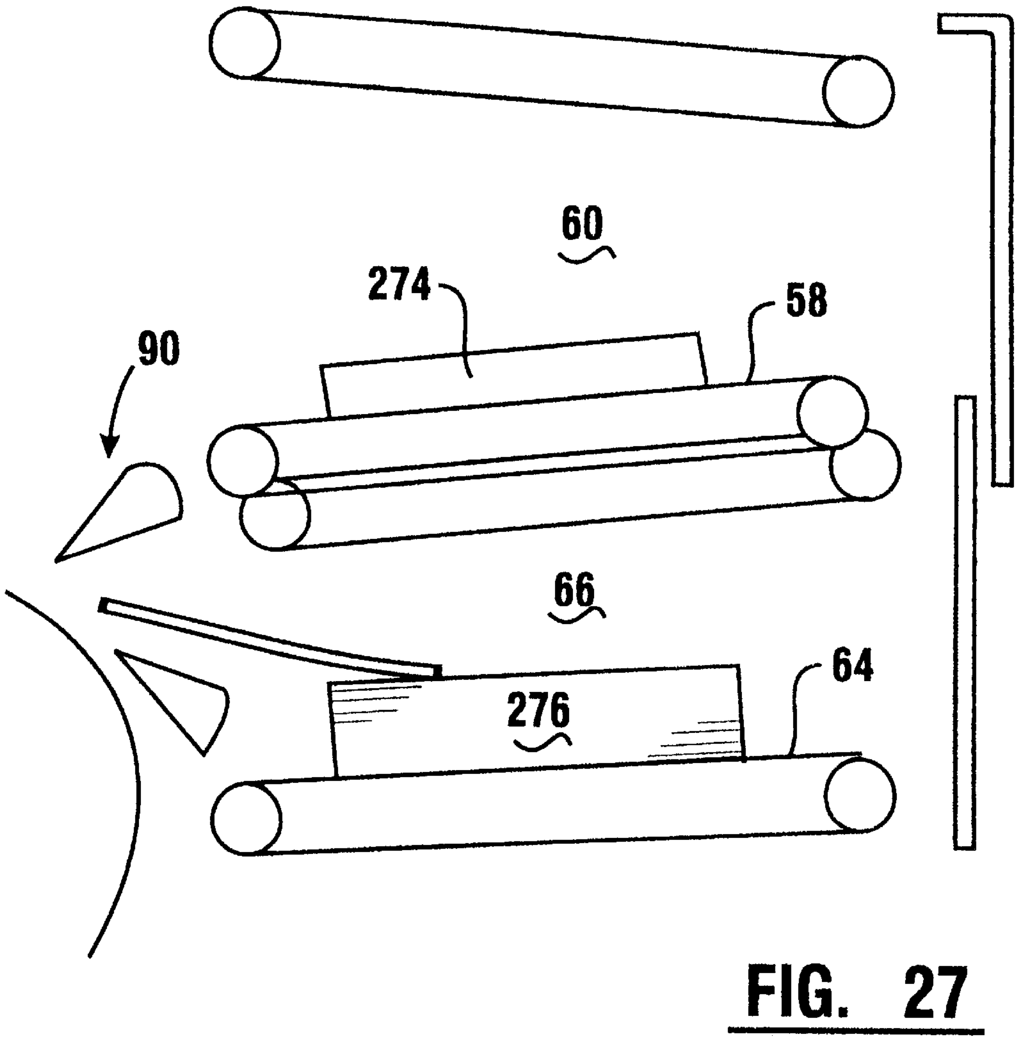
FIG. 27 is a schematic view of the input/output area of the machine as documents are delivered from the central transport.

The analysis of the note by the identification device 88 produces signals. These signals may be indicative of the note type and denomination. Alternatively, the signals may be indicative that the note cannot be satisfactorily identified or are invalid. These signals are transmitted to the control system 30 which operates the divert gates 90 adjacent to the central transport. As shown in FIG. 27, in a preferred embodiment of the invention, documents which cannot be identified with a high degree of confidence are routed by gates 90 to the delivery/reject area 60 and are supported on second belts 58. Such rejected notes are represented in FIG. 27 by a stack 274.

Identified documents suitable for deposit are routed by divert gate 90 into the escrow area 66 where such notes are supported on belts 64. Such identified documents are represented in FIG. 27 by stack 276. It should be understood that the routing of identified sheets to the escrow position 266 is optional depending on the programming of the control system 30 of the machine. Identifiable notes may be directly routed to appropriate storage areas for recovery.

Figure 66:
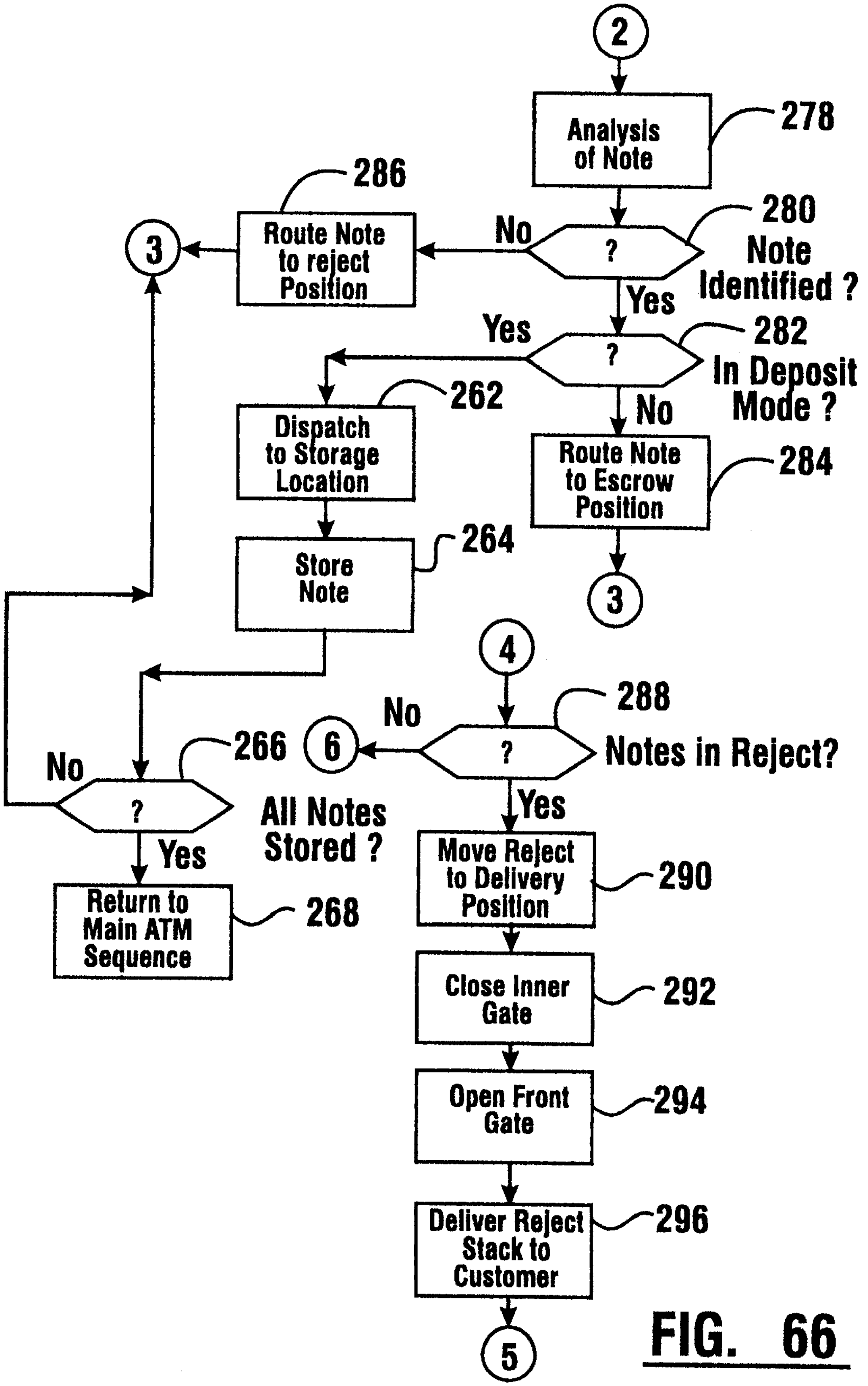

The transaction flow associated with the analysis of the documents and routing to the reject/delivery and escrow areas is represented in FIG. 66. The analysis of the moving documents is represented by a step 278. If the note is properly identified in a step 280, a check is next made at a step 282 to determine if the machine is in a deposit mode. If so properly identified notes are routed to storage locations in the recycling canisters. If the machine is not currently in a deposit mode, which is the case with the example described, properly identified notes are routed to the escrow position in a step 284.

If in step 280 a note is not identifiable or is identified as unacceptable the note is routed to the reject position in a step 286. Of course it should be understood that the unstacking, pre-centering, deskewing, aligning and note identifying steps are all ongoing concurrently as each document passes through the central transport. The notes are continuously being directed to the escrow or reject positions until the stack of notes has been completely unstacked.

Figure 28:
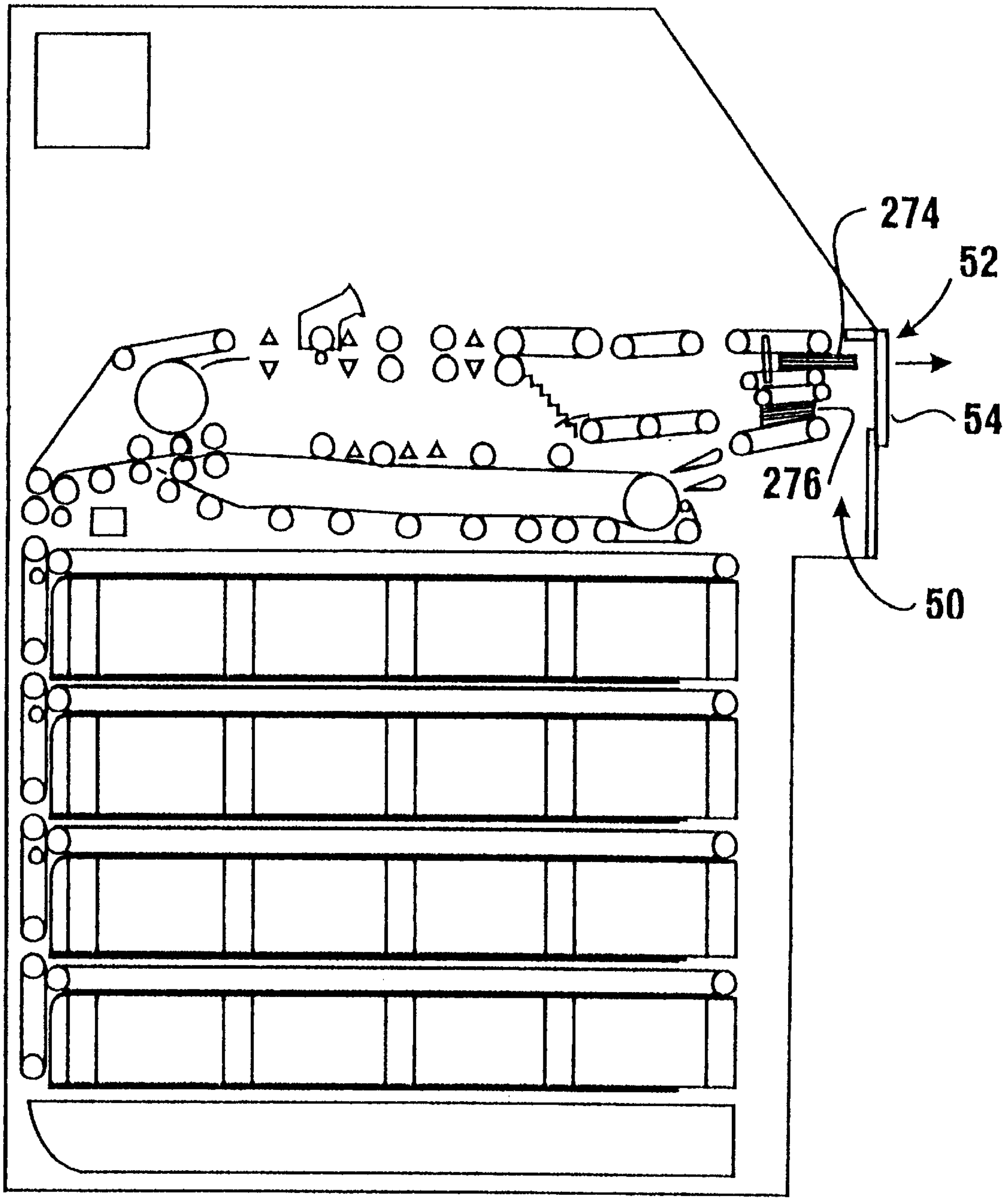
FIG. 28 is a schematic view similar to FIG. 1 showing unidentifiable documents being delivered out of the machine to a customer.

In the operation of the invention of the preferred embodiment, unidentifiable sheets, sheets which are unacceptable and sheets which appear suspect are returned to the customer from the input/output area 50. This is schematically represented in FIG. 28 which shows the reject stack 274 being delivered to the customer through the opening 52. This is normally done by the machine after displaying to the customer, through the interface 14, information on the number of documents which were unidentifiable or unacceptable in the deposit stack that they submitted. The customer would also be advised of the value of the documents that have been properly identified. In alternative embodiments the customer may be given the option through an input to the customer interface to retry the rejected sheets to determine if they can be identified. If this occurs, the machine may be programmed to run the reject stack 274 back through the central transport in the manner previously done with the deposited stack. This is a matter of choice in the programming of the machine and depends on the preferences of the operator of the machine.

Figure 29:
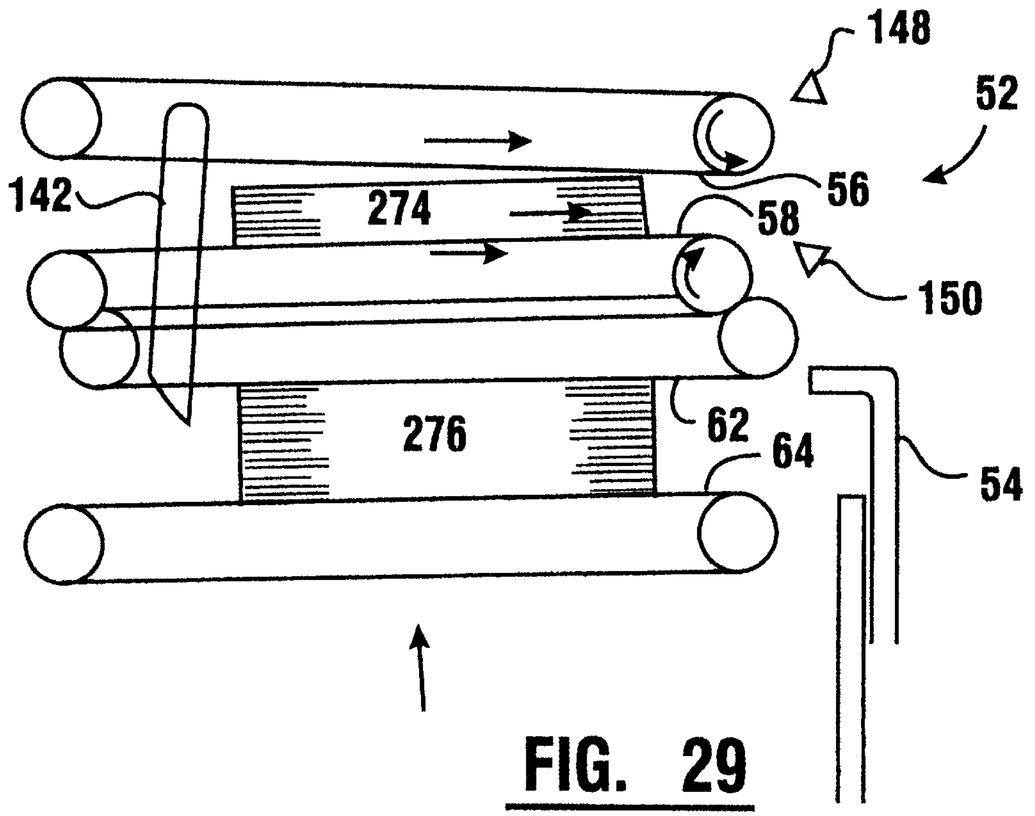
FIG. 29 is a schematic view of the input/output area showing unidentifiable documents being moved out of the machine.

Assuming that the reject stack 274 is to be returned to the customer, the reject stack is delivered to the customer in the manner indicated in FIG. 29. The inner gate 142 is extended while the carriage supporting belts 64 are raised so that stack 276 engages the carriage supporting belts 62 and 58. Belts 58 are raised such that the reject stack engages belts 56. As reject stack 274 is sandwiched between belts 56 and 58 the gate 54 is opened. The reject stack 274 is moved by belts 56 and 58 out through opening 52 in the housing of the machine. The delivery and receipt sensors 148, 150 adjacent to opening 52 are operative to sense movement of the stack.

The transaction flow associated with the delivery of the reject stack to the customer is represented in FIG. 66. In a step 288, a determination is made as to whether notes are present in a reject stack after all the sheets have been unstacked and passed through the central transport. If so, the reject stack is moved to the delivery position in step 290. The inner gate is closed in a step 292, as shown in FIG. 29. The front gate is then opened at a step 294 and the belts are driven to deliver the reject stack to the customer at a step 296.

Figure 67:
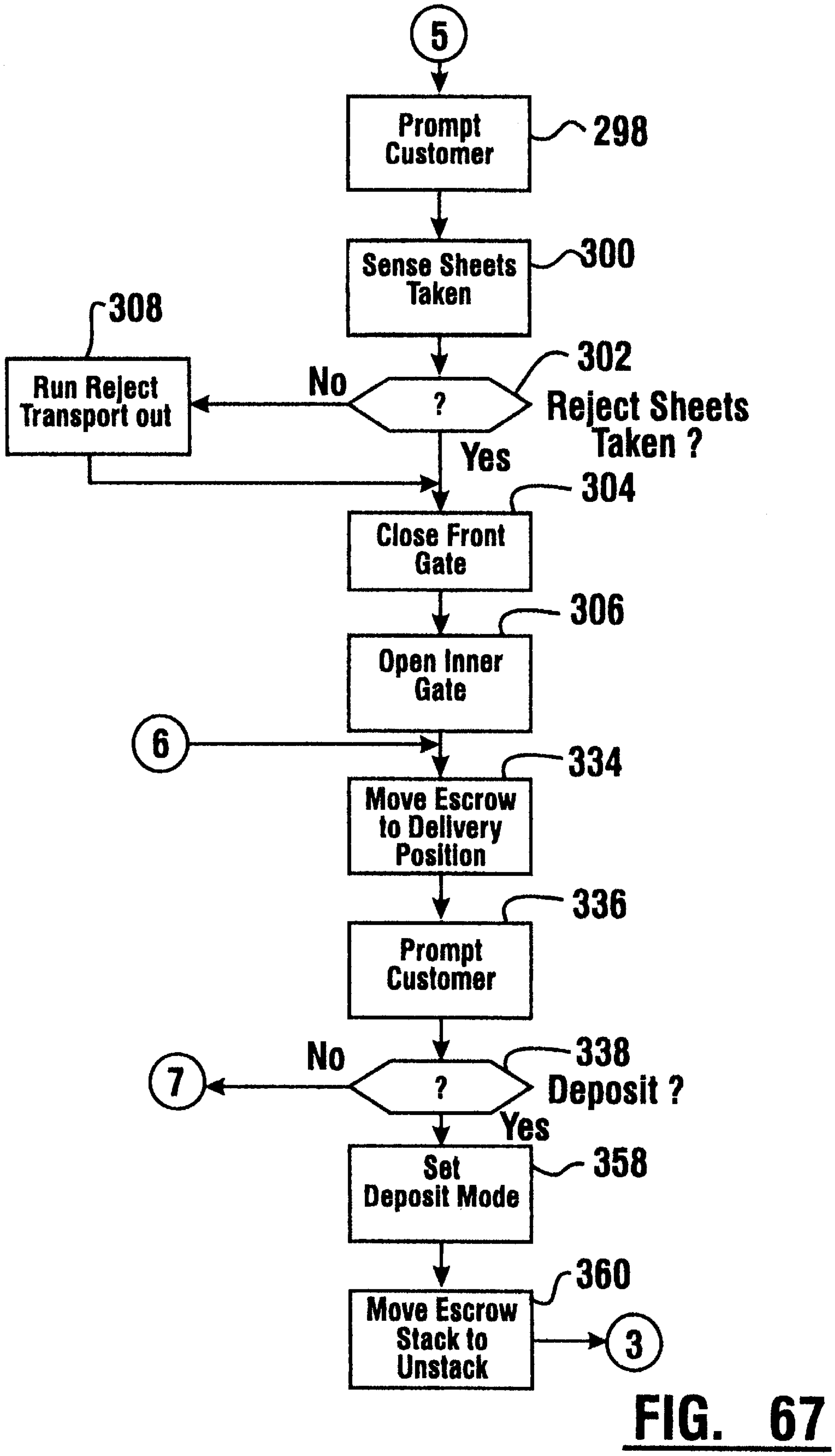

As shown in FIG. 67, the customer may then be prompted to take the reject stack at a step 298. This is done through the customer interface. The sensors 148 and 150 are then monitored at a step 300 and a decision is made at a step 302 as to whether the reject sheets have been taken. If the sheets have been taken the front gate 54 of the machine is closed at a step 304 and the inner gate is retracted at a step 306.

As previously discussed, in the described embodiment of the invention the customer is required to take the reject sheets. Therefore if at step 302 the customer has not taken the sheets, the transport is operated to push the sheets out the opening 52 in a step 308. After the transport has been run sufficiently to push the sheets out, the front gate is closed.

Figure 30:
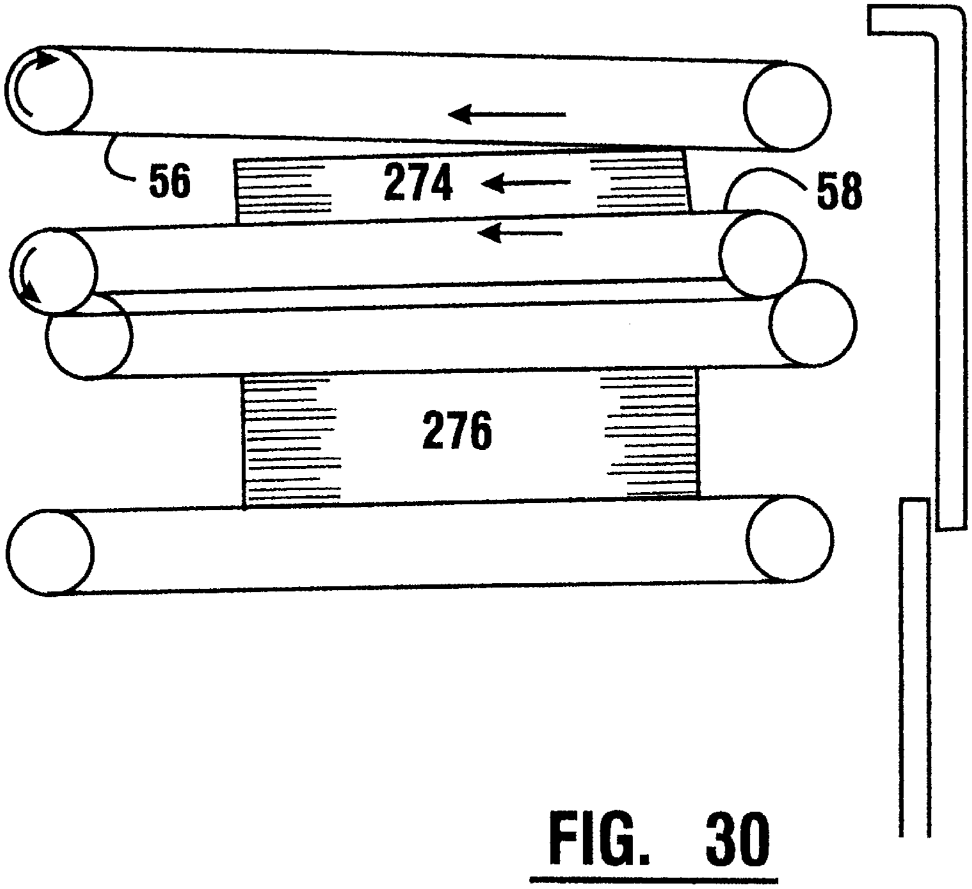
FIG. 30 is a schematic view similar to FIG. 29 showing unidentifiable documents being routed into the machine for storage.

In alternative embodiments of the invention the customer may have the option of having the reject stack retried to determine if the documents can be identified. In other alternative embodiments the machine may be programmed not to return unidentifiable or rejected sheets to the customer. This may be done for purposes such as to prevent potentially counterfeit sheets from being placed back in circulation. If the machine is programmed in this manner the reject stack 274 may be moved in the manner shown in FIG. 30 back into the unstack area of the machine for a further pass through the central transport. In this second pass the sheets may either be again returned to the reject area if they cannot be identified; placed in the escrow area if they may be identified; or alternatively, passed into a storage location in the recycling canisters or dump area 132 for later analysis. Because the preferred embodiment of the present invention is capable of tracking individual sheets which are passed through the machine, it is possible for the machine to track where particular sheets originated based on their storage location and position within a storage location.

Figure 31:
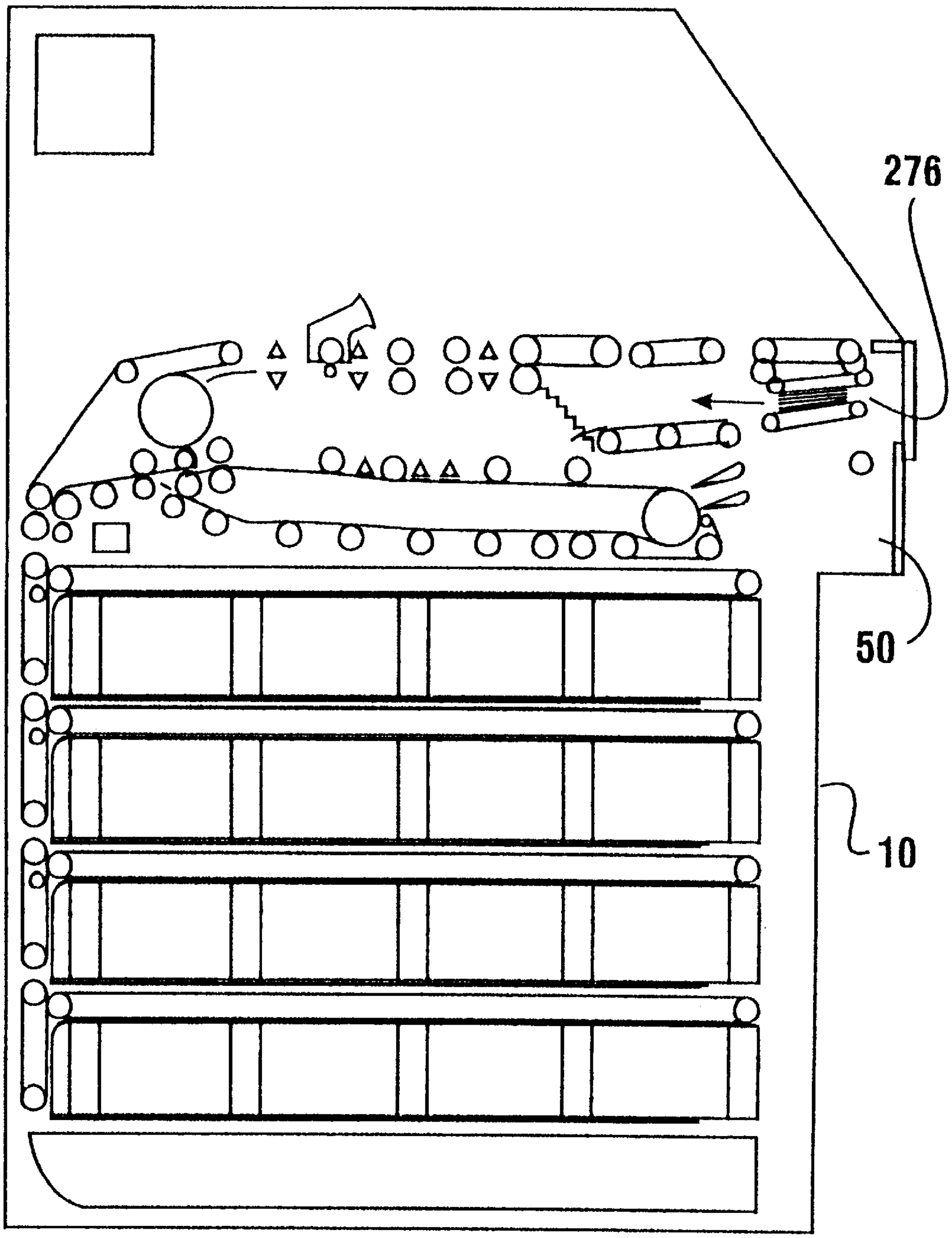
FIG. 31 is a schematic view similar to FIG. 1 showing documents held in escrow being routed into the central transport for storage in the machine.

Returning to the operation of the described embodiment, the stack 276 held in the escrow position is now moved upward in the input/output area as indicated in FIG. 31. At this point the customer may have the option of receiving the identifiable sheets that they have deposited back. This may be done for example if the customer does not agree with the count of the sheets by the machine. This may be accomplished by programming the machine so that the customer can obtain return of the documents in escrow by an appropriate input to the interface.

If the machine is programmed to deposit the identified documents held in escrow, the machine moves the document stack 276 in a manner shown in FIG. 31. Alternatively, the escrow stack will be moved in the manner shown in FIG. 31 if the machine requires a customer input to deposit the escrow documents and such an input is given through the customer interface.

Figure 32:
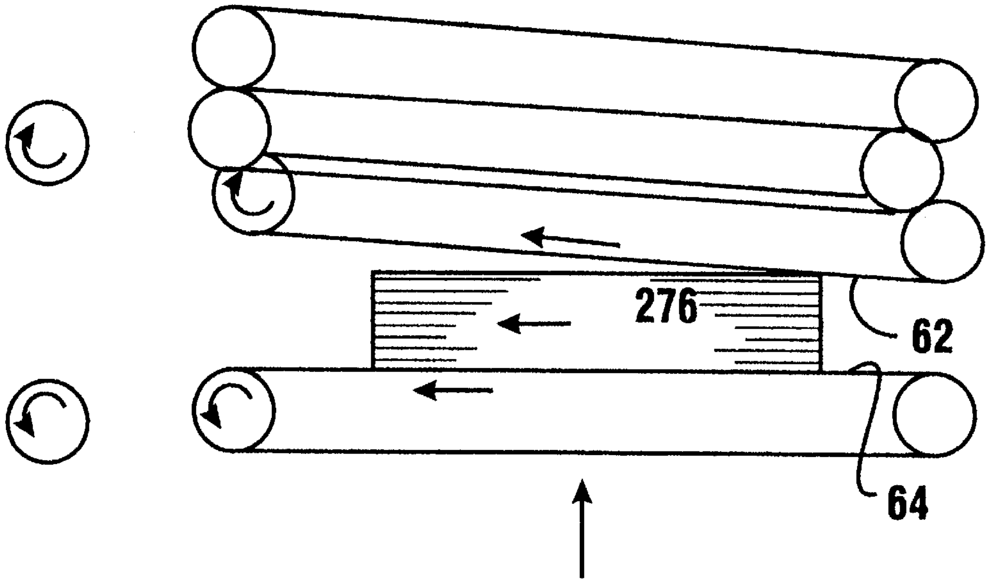
FIG. 32 is a schematic view of the input/output area moving the documents held in the escrow area.

When the escrow stack 276 is to be deposited in the machine, belt 64 is raised to the position shown in FIG. 32 and the escrow stack 276 is sandwiched between belts 62 and 64. The belts are then driven to move the escrow stack 276 into the unstack area of the machine in the manner previously described.

Figure 33:
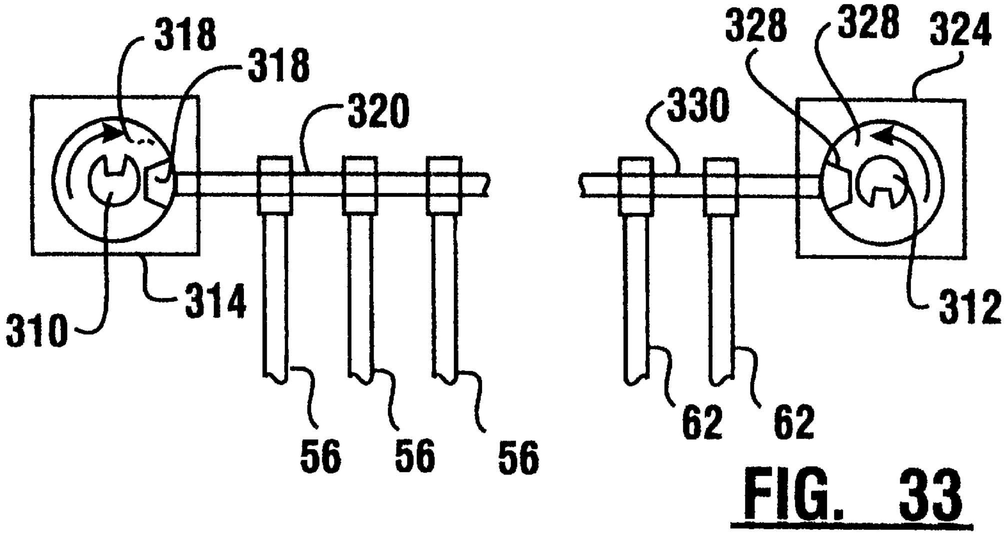
FIG. 33 is a schematic view showing a portion of the drive mechanism for the drive belts in the input/output area.
Figure 34:
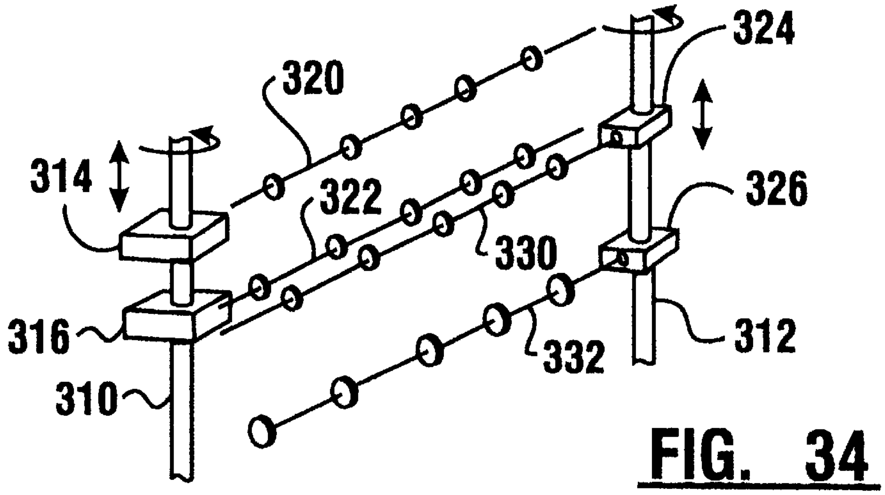
FIG. 34 is an isometric schematic view of the input/output area drive mechanism.

The operation of the drive rolls and movable belt carriages of the input/output area 50 are described in greater detail in FIGS. 33 and 34. The carriage associated with belts 64 is moved upward and downward by a driving mechanism. The carriage supporting belts 62 and 58 is free floating but is restricted in the degree to which it may move downward. The carriage supporting belts 56 may rotatably conform to the position of an adjacent stack but is generally prevented from moving downward. This configuration minimizes the complexity of the input/output mechanism.

In a preferred embodiment of the invention, the carriage supporting belts 64, 62 and 68 are guided to move vertically by a first guide/drive shaft 310 and a second guide/drive shaft 312. The guide/drive shafts not only extend generally vertically, but also are splined shafts that are rotatable by suitable transmission mechanisms in the directions shown. Movable journal guide blocks 314 and 316 are movable vertically on shaft 310. Each journal guide block represented by guide block 314 in FIG. 33 includes bevel gears 318. The bevel gears operate to transmit rotational motion from the guide/drive shaft 310 to shafts 320 and 322. Shafts 320, 322 include rollers upon which belts 56 and 58 are supported respectively.

Journal guide blocks 324 and 326 are movable on shaft 312. As indicated in FIG. 33 by journal guide block 324, the journal guide block includes bevel gears 328 which operate to transmit rotational motion of the drive/guide shaft 312 to shafts 330 and 332. Belts 62 and 64 are supported on rolls which are driven by shafts 330 and 332 respectively.

As should be appreciated, this arrangement for driving the belts in the input/output area reduces complexity compared to other arrangements. This arrangement also increases flexibility for selectively positioning stacks of documents.

Returning to the sample transaction flow with the escrow stack 276 in the position shown in FIG. 31, the transaction flow proceeds in the manner indicated in FIG. 67. As indicated in a step 334, the escrow stack is moved upwards so that it is in a position to either be delivered to the customer or to be moved back into the unstack position. The customer operating the machine is then prompted at a step 336 to indicate whether they wish to have the escrow stack returned to them or to deposit the amount in the escrow stack into the machine. As indicated by a step 338, if the customer chooses to have the stack returned rather than deposited, the machine proceeds to return the stack to the customer.

Figure 68:
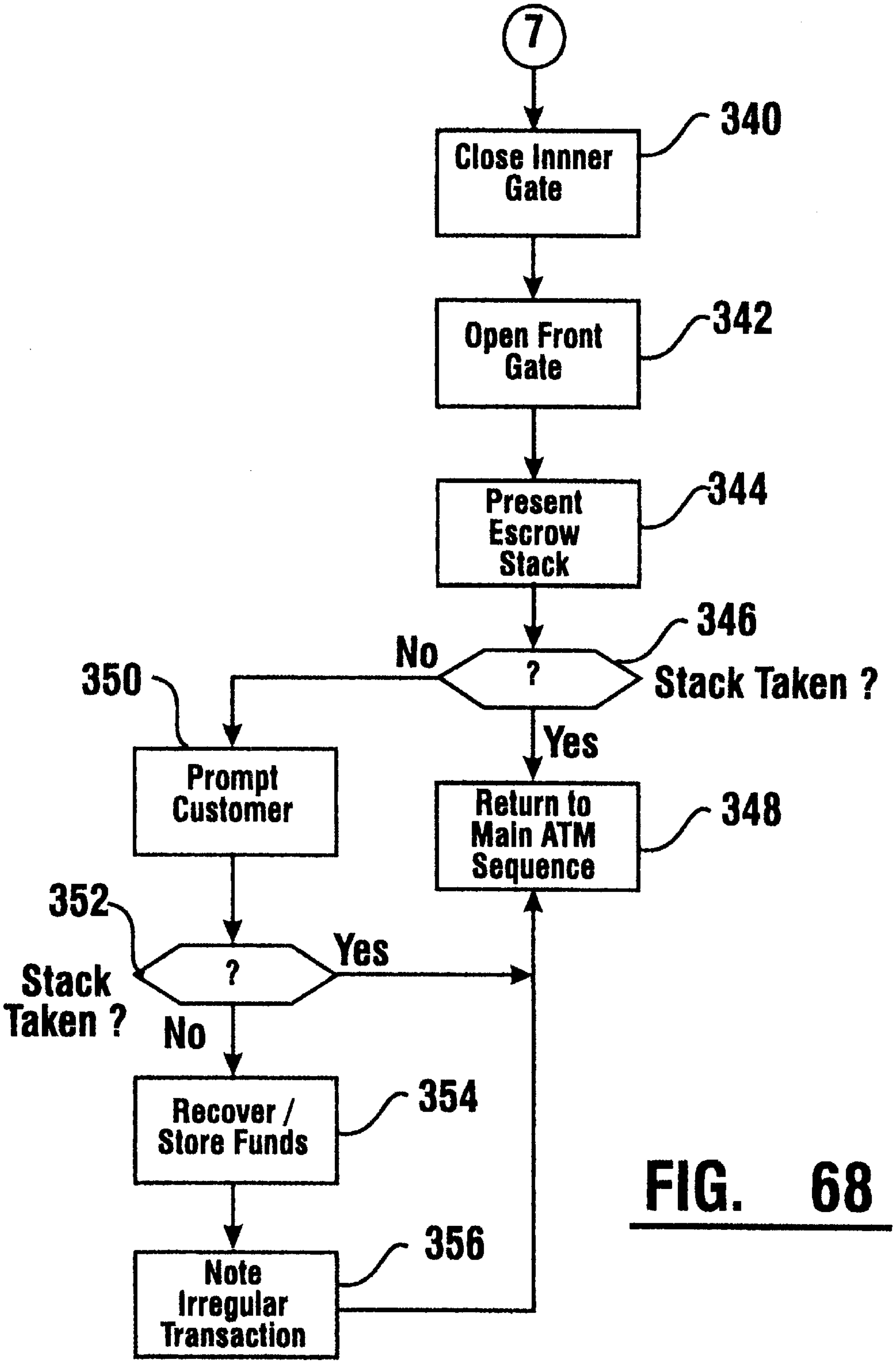

The process of returning the stack is indicated through the transaction flow represented in FIG. 68. At this point in the transaction flow the escrow stack 276 is adjacent to opening 52, and may be readily delivered to the customer. The inner gate is closed at a step 340 and the front gate is opened at a step 342. Belts 62 and 64 are then driven to move the escrow stack outward to present it to the customer at a step 344. A determination is made at a step 346 whether the customer has taken the stack. This is based on signals from the sensors 148 and 150. If the escrow stack is sensed as taken the machine returns to the main ATM transaction sequence at a step 348.

If the customer does not take the stack, steps are executed to encourage the customer to take the stack, or to retract it into the machine. If the stack is not sensed as taken in step 346, the customer is prompted through the interface of the machine at a step 350 to take the stack. If the stack is now sensed as taken, a step 352 returns the machine to the main sequence. If however the stack is still not taken, the transaction flow proceeds through steps 354 and 356 in which the stack is recovered and stored, and an irregular transaction is noted. This may occur for example by retracting the stack into the machine, closing the gate, and then passing the stack through the central transport to one of the storage areas.

Alternative forms of the invention may provide for crediting the customer's account for amounts which they indicated they wished to have returned but did not take. If the machine is programmed to operate in this manner the documents in the escrow stack will be stored according to their type and denomination in the various storage areas in the recycling canisters. Alternatively, the documents in the escrow stack may be stored separately in one of the storage areas. The machine may be programmed to allow the customer to return at a later time and obtain the documents in the escrow stack. This may be valuable for example if the customer forgets to take the stack or is distracted while performing their transaction.

In most cases when a customer has deposited documents in the machine, they will choose to have the funds credited to their account. As a result, in the transaction flow at step 338 they will indicate through the customer interface that they wish to make a deposit. The transaction flow moves through a step 358 in which the machine is set to deposit mode. Thereafter the escrow stack 276 is moved to the unstack area at a step 360. This is done in the manner previously described for the deposited stack.

Figure 35:
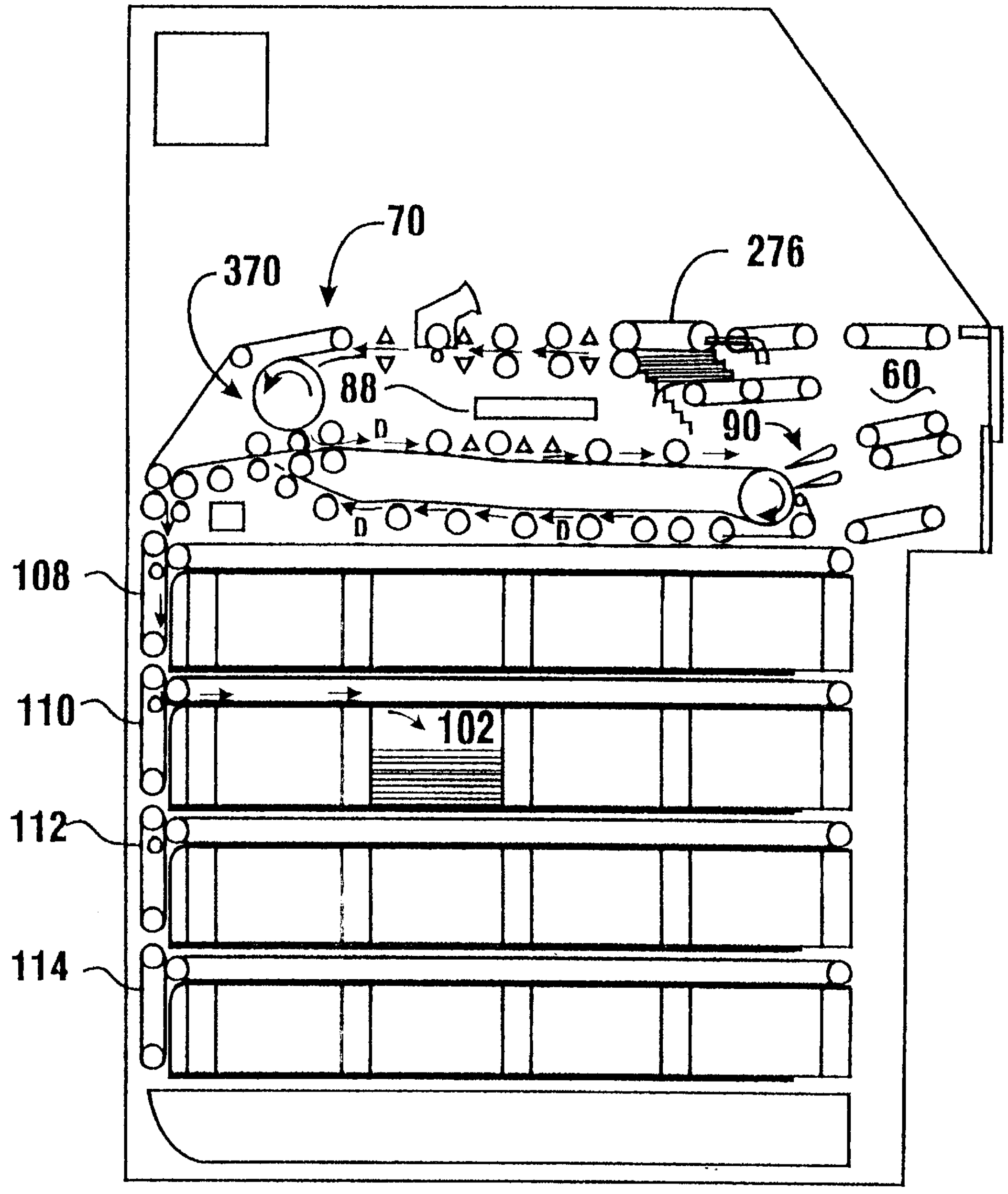
FIG. 35 is a schematic view similar to FIG. 1 showing documents that have been previously held in the escrow area being unstacked and passed through the central transport and into the machine for storage in storage areas of document storage canisters.

As shown schematically in FIG. 35, the escrow stack will now be unstacked in the manner previously discussed. However, now instead of the unstacked bills being routed by the divert gate 90 to the escrow area and delivery/reject area, the bills are selectively routed downward in the machine as shown, to the various storage areas in the recycling canisters. During this operation each of the unstacked bills is again identified by the bill identification apparatus 88. The identification of the bill type is used to selectively route each document to the storage area where documents of that type are stored. It should also be understood that the internal memory of the machine is preferably programmed to record the type of document held in the escrow stack and to compare the document type determination made in the initial pass to the type determination made in the second pass. In the event of an error or inconsistency, the divert gate 90 may be used to route any irregular documents to the delivery/reject area 60 instead of moving them down into a storage location in the machine.

As can be appreciated with the transaction flow beginning at step 358 in FIG. 67, the escrow stack undergoes the unstacking process previously described in connection with steps 184, 196 and 204. Each note is also deskewed and centered with regard to the transport path and then released.

The note undergoes analysis in the manner discussed in connection with step 278 and if the note is properly identified in step 280, the transaction flow moves to a step 262 when the machine is in the deposit mode. In step 262 each note is dispatched to an appropriate storage location. Notes are moved through this central transport in the direction of Arrows "D" shown in FIG. 35. Each note is then routed to an appropriate storage location at a step 264. It should be appreciated that notes are moving concurrently toward different storage locations under the control of the control system. FIG. 35 shows an example of a note being deposited in storage area 102. It should be understood however that notes may be moved into numerous storage areas during the deposit process.

The notes in the stack 276 continue to be unstacked until the stack is determined to be depleted at a step 266. Assuming that no notes have been rejected during the deposit process, the transaction flow may then return to the main ATM transaction sequence at a step 268. The customer may be provided with a receipt for their deposit and may continue with other transactions.

Figure 36:
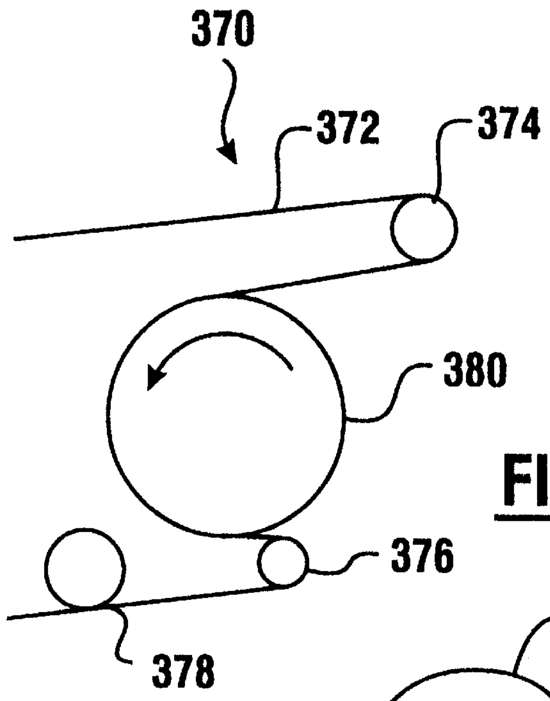
FIG. 36 is a schematic view of a belt and carriage roll arrangement used for transporting documents in the central transport of the machine.
Figure 37:
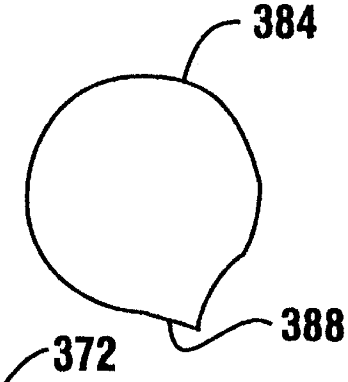
FIG. 37 is a side view of a guide used in connection with the carriage transport rolls.

In the operation of the central transport 70 there are places in which moving notes must undergo generally 180 degree turns. One example of this is indicated by transport section 370 which is shown in FIG. 35. In transport section 370, documents that have been aligned in the transport path have their direction reversed so that they can be passed adjacent to the identification device 88. Transport section 370 requires that the bills be transported accurately and maintain their spaced aligned relation. The documents are also preferably not crumpled or otherwise distorted, as this may adversely impact their ability to be identified in the following section. More details regarding transport section 370 are shown in FIGS. 36–38.

Transport section 370 includes a plurality of belts 372. These belts in the preferred embodiment are V-type belts that engage driving and idling rolls 374, 376 and 378. In the preferred form of the invention the "V" cross section of belts 372 is pointed radially inward as the belt passes rolls 374, 376 and 378.

As belts 372 move between rolls 374 and 376 they are supported on carriage rolls 380. The carriage rolls 380 support the belt in a manner such that the "V" section is pointed away from the carriage rolls. A flat top surface of each belt is positioned adjacent to an annular dimple 382 on the outer circumference of each carriage roll. Carriage rolls 380 are also spaced from one another. Guides 384 which generally have a somewhat lesser diameter than the carriage rolls are positioned in between. An example of a guide 384 is shown in greater detail in FIG. 37.

Figure 38:
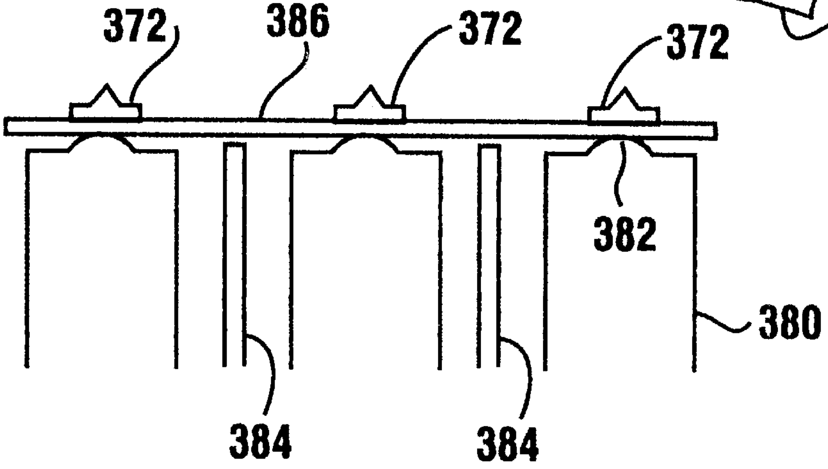
FIG. 38 is a cross sectional side view of the carriage rolls, document belts and guides shown in supporting connection with a document.

When a note 386 passes through transport section 370 it is held between the flat surfaces of belt 372 and dimples 382 of the carriage rolls as shown in FIG. 38. The notes move around the carriage rolls without being skewed or distorted. When the notes are passed to the area adjacent to roll 376 projections 388 on the guides urge the note away from engagement with the carriage rolls and in the desired direction.

This configuration is used in a preferred embodiment of the invention as it has been found that notes may generally be transported through the transport section 370 without adversely impacting their aligned and separated relation. The ability to turn the note path 180 degrees also greatly reduces the overall size of the automated banking machine.

As shown in FIG. 35 notes which are passed through the central transport 70, and which are moved to storage areas within the machine, pass downward through the central transport through remote transport segments 108, 110, 112 and 114. These remote transport segments operate as part of a remote transport. The remote transport segments are vertically aligned in the preferred embodiment so as to enable documents to be selectively transported between the transport segments. The transport segments also enable documents to be selectively directed either through the transport segments or into or out of the adjacent canister transports, one of which is positioned adjacent to each transport segment. The selective directing of documents is achieved through use of a media gate associated with each transport segment which is operated under the control of the control system 30.

Figure 39:
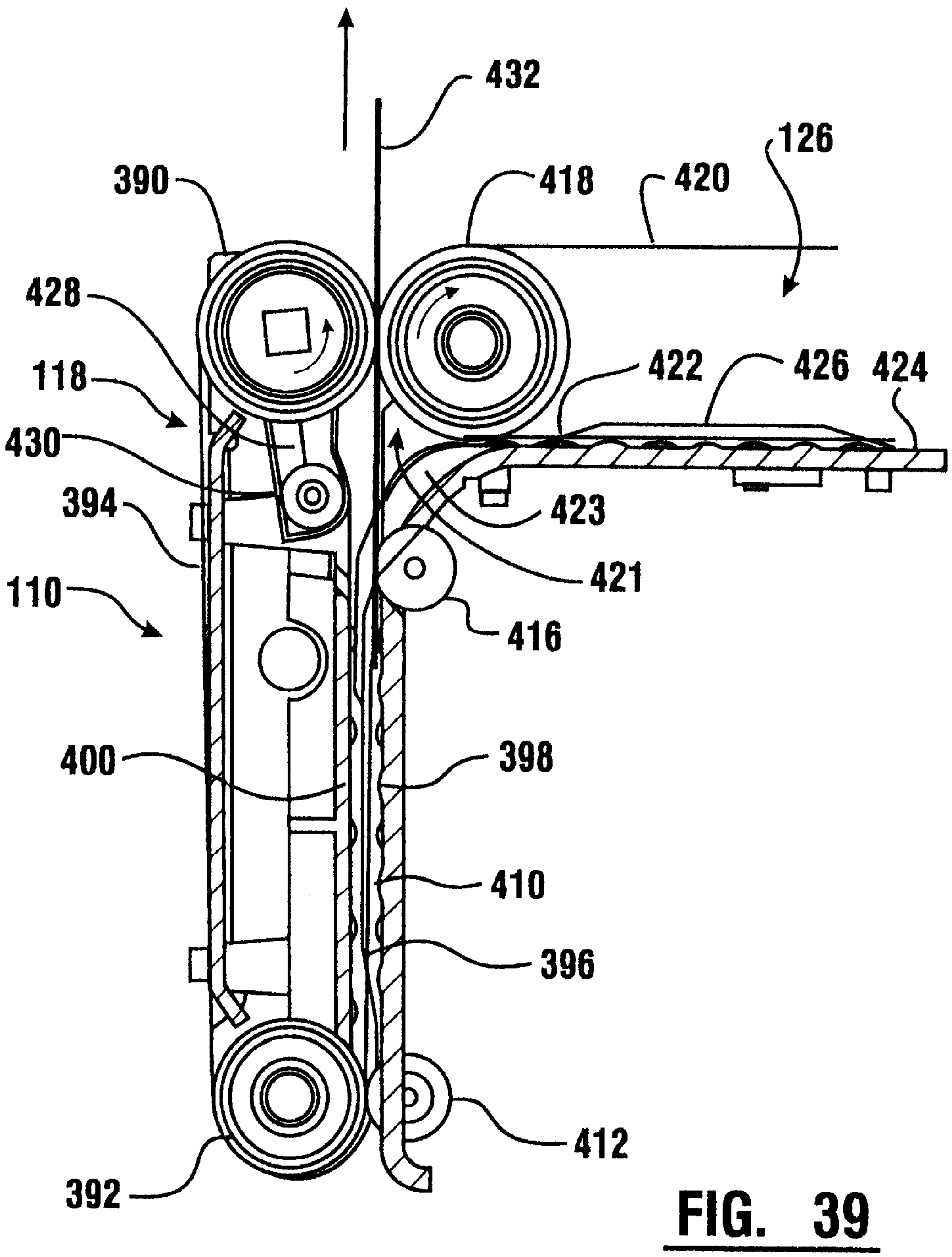
FIG. 39 is a side view of a gate mechanism used for routing documents moving in remote transport segments, with the gate mechanism shown in a position enabling a document to pass directly therethrough.

An example of a transport segment used in a preferred embodiment of the invention is indicated by transport segment 110 shown in FIG. 39. Transport segment 110 includes a plurality of spaced belt supporting rolls 390, 392. Each of the rolls support a belt 394 thereon (see FIG. 44). An inner flight 396 of each belt 394 is positioned adjacent to a first sheet supporting surface 398 and a second sheet supporting surface 400. The sheet supporting surfaces each include a plurality of spaced raised projections or dimples thereon. These raised projections serve to break surface tension and minimize the risk of documents sticking thereon.

Figure 45:
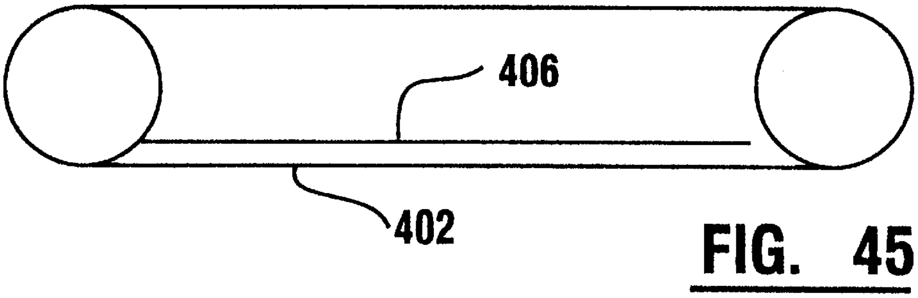
FIG. 45 is a schematic view of a sheet transport exemplifying the principles used for moving documents in the remote transport segments and in the canister transports.
Figure 46:
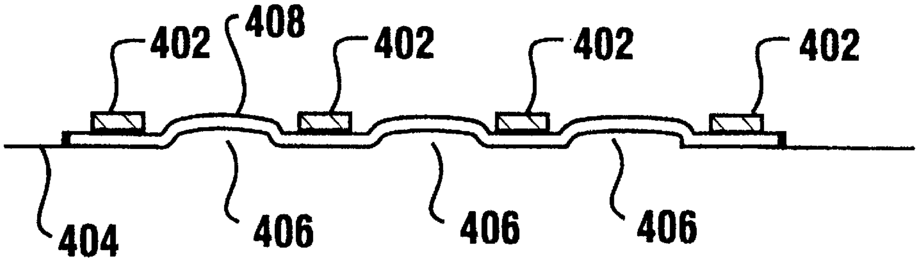
FIG. 46 is a cross sectional schematic view showing a document moving in a transport of the type shown in FIG. 45.

The principles of operation of transport segment 110 as well as the canister transport used in the preferred embodiment, can be appreciated with reference to FIGS. 45 and 46. The transports operate by holding documents in engaged relation between an outer surface of a belt flight and projections which extend toward the belt flight from an adjacent supporting surface. In the example shown in FIG. 45, belt flights 402 extend adjacent to a supporting surface 404. Projections 406 extend transversely between the belt flights from the supporting surface. A document 408 which is engaged between the belt flights and the supporting surface is biased by the projections 406 to remain engaged with the belt flights. This enables movement of the belt flights to accurately move the document 408 in engaged relation therewith.

Returning to FIG. 39, projections 410 extend from first sheet supporting surface 398. Projections 410 are generally segmented projections and include tapered leading and trailing edges to minimize the risk of documents snagging thereon. Idler rolls 412 and 416 are also journaled on and in supporting connection with the member which includes sheet supporting surface 398. Idler rolls 412 and 416 are generally positioned in aligned relation with inner flights 396 and perform a function which is later explained.

Each remote transport segment has a canister transport adjacent thereto. In the case of transport segment 110, canister transport 126 extends adjacent thereto as shown in FIG. 1. Canister transport 126 includes a pair of spaced belt supporting rolls 418, only one of which is shown in FIG. 39. Rolls 418 support belts 420 which include lower flights 422. Lower flights 422 extend adjacent to a supporting surface 424 which includes dimpled projections thereon of the type previously discussed. Projections 426 extend from supporting surface 424 between the belts and are generally parallel thereto. This structure enables documents to be transported in engaged relation between the projections 426 and the belt flights 422 in the manner previously described.

Figure 44:
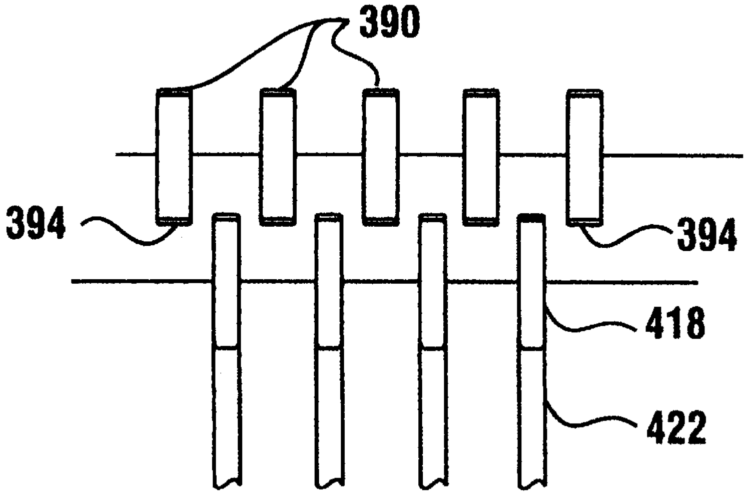
FIG. 44 is a schematic view of an arrangement of belts and pulleys adjacent to the gate mechanism shown in FIG. 39.

As shown in FIG. 44 the rolls 418 of the canister transports and rolls 390 of the remote transport segments are arranged in transversely intermediate relation, similar to the manner in which the projections on the supporting surface are positioned transversely intermediate of the belt flights. This assures that documents can be passed between the transport segments in controlled relation in the manner hereinafter described.

Each of the remote transport segments include a media gate which is selectively operable to direct documents in desired directions. In the case of transport segment 110 the media gate associated therewith is gate 118. Gate 118 includes a plurality of movable arms 428. The arms are engaged to move together and are selectively movable about an axis of rolls 390. Each arm 428 has a roll 430 movably mounted thereon. Each roll 430 which serves as a diverter roll, is positioned in alignment with a corresponding inner belt flight 396.

The operation of the remote transport segment and media gate will now be explained with reference to FIGS. 39–43. As shown in FIG. 39, when the diverter roll 430 of the gate 118 is disposed from the belt flights 396, a document 432 is enabled to pass directly through the remote transport segment. Although the document 432 is shown as moving upward in FIG. 39, it should be understood that documents may be moved downward as well. Likewise documents may be moved downward and then upward in the remote transport segment.

Figure 40:
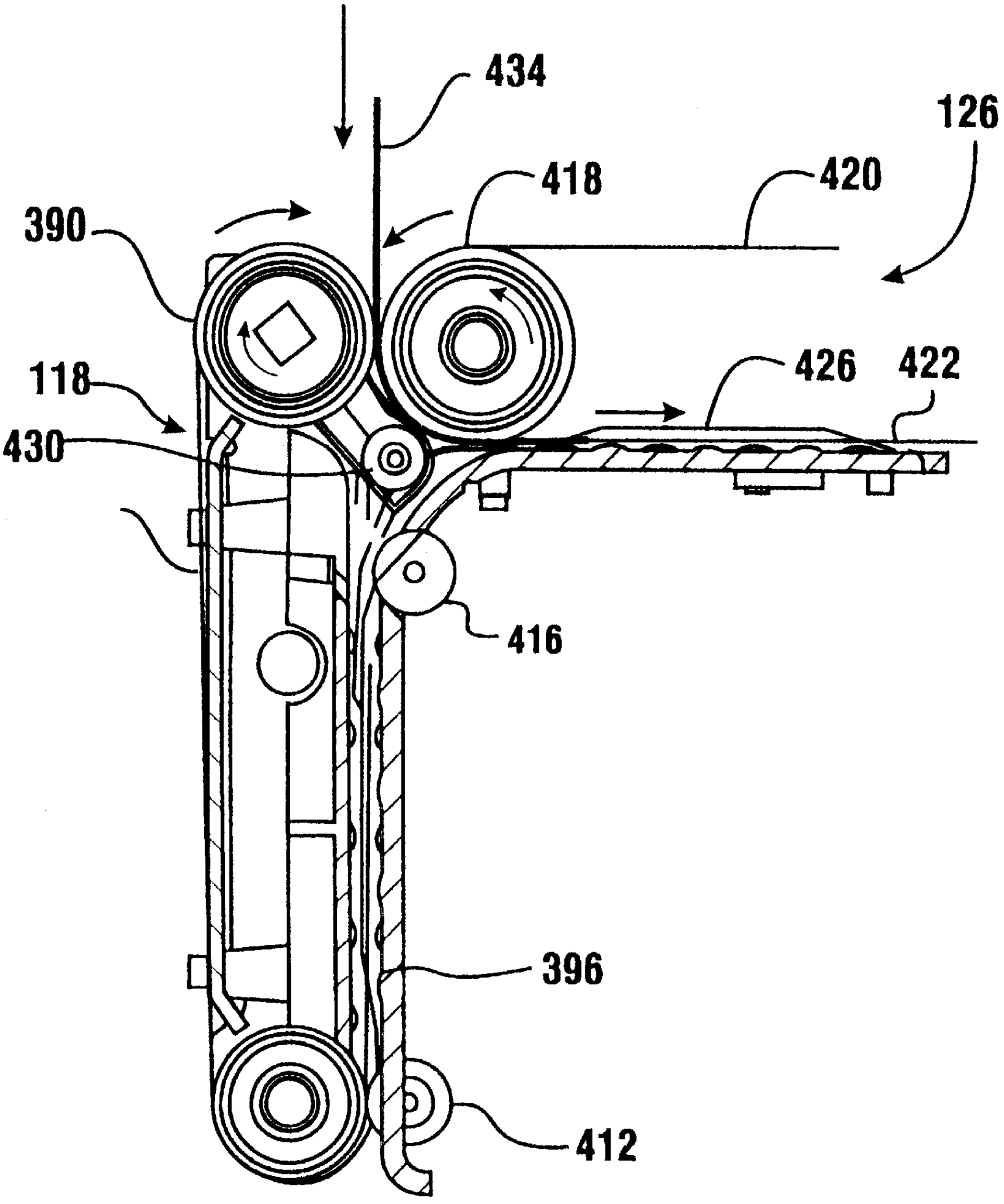
FIG. 40 is a side view of the gate mechanism shown in FIG. 39 in a condition passing a document from the remote transport segment to a canister transport.

FIG. 40 shows a document 434 moving in a downward direction while the diverter roll 430 of the gate 118 is extended. In this condition the document 434 is directed toward the nip created by belt flights 422 and projections 426 of the canister transport 126. As a result, moving the belt flights 420 in the direction shown as the media gate is actuated transfers the document into a canister transport path along which it is carried by the canister transport. As can be appreciated from FIG. 40, when the gate 118 is actuated belt flight 396 is deformed. Idler roll 416 supports the belt flight in the deformed position to prevent excessive wear as a result of friction.

Figure 41:
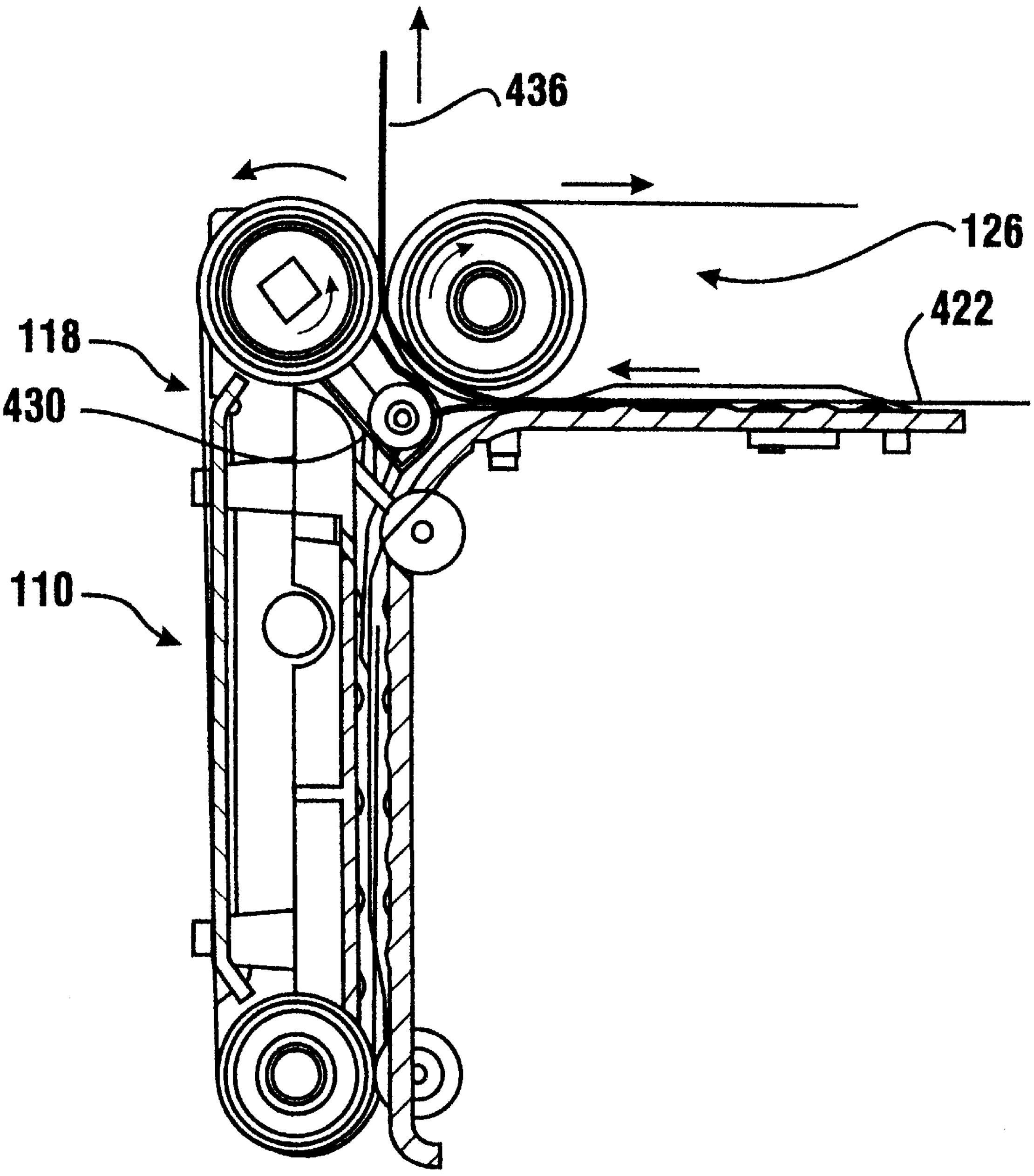
FIG. 41 is a view similar to FIG. 39 with the gate mechanism shown passing a document from a canister transport into the remote transport segment.

FIG. 41 shows a document 436 being moved from the canister transport to the remote transport segment 110. In the position shown the media gate 118 operates to direct document 436 towards the remote transport segment 108 positioned above remote transport section 110 (see FIG. 35) and towards the central transport.

Figure 42:
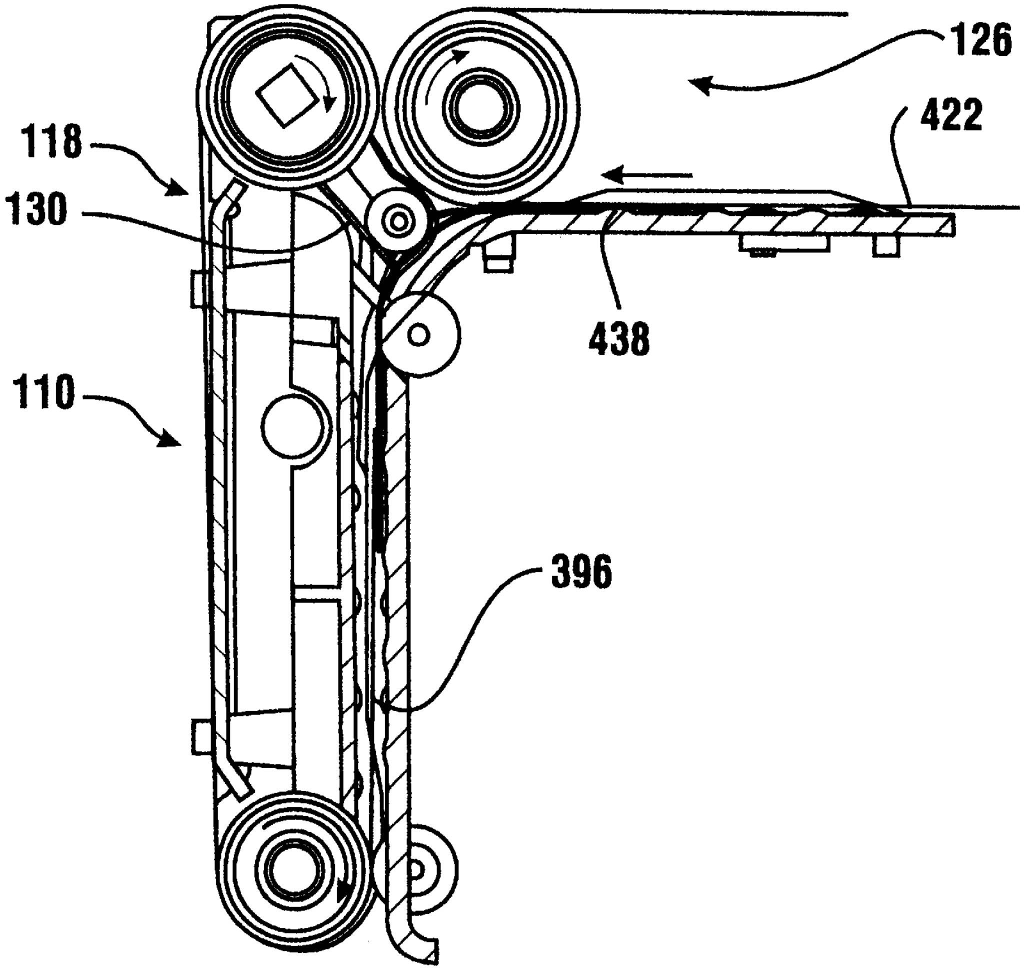
FIG. 42 is a view of the gate mechanism shown in FIG. 39 in a condition that enables a document to pass from the canister transport into the remote transport segment, with the document moving in an opposed direction from that shown in FIG. 41.

FIG. 42 shows the gate 118 in a condition that directs a document 438 from the canister transport 126 downward into the remote transport segment 110. As will be appreciated from the foregoing discussion, the preferred embodiment of the invention enables moving documents from one storage area to another. This function is enabled by the control system of the machine moving documents from storage areas in canisters where they have been stored to storage areas in canisters either above or below the storage canister in the machine.

Figure 43:
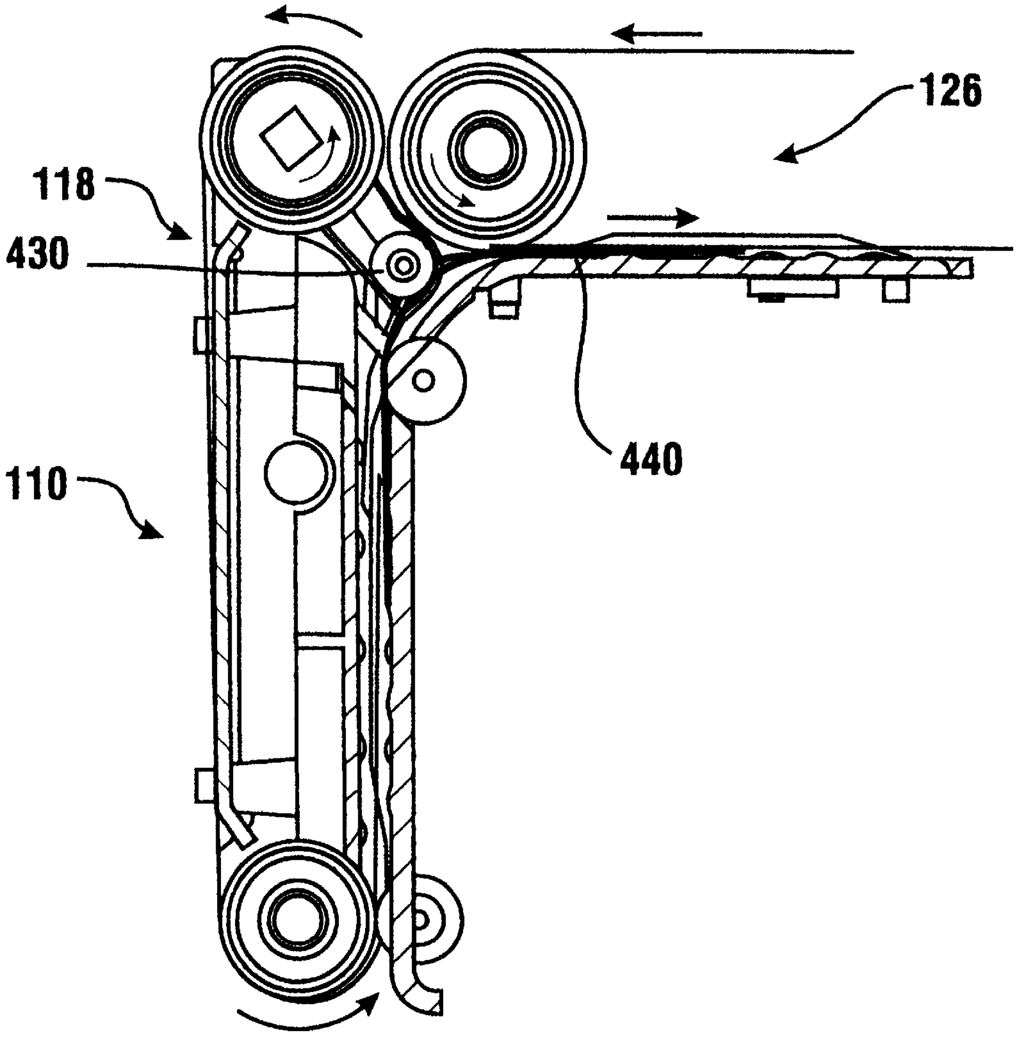
FIG. 43 is a view of the gate mechanism shown in FIG. 39 with a document passing from the remote transport segment into the canister transport with the document moving in an opposed direction from that shown in FIG. 40.

FIG. 43 shows a document 440 moving upward in the remote transport segment 110 and being directed by the gate 118 into the canister transport 126. The ability to move the documents in the manner shown in FIGS. 39–43 greatly facilitates the ability of the preferred embodiment of the present invention to store and recover documents. As will be appreciated from the foregoing Figures, the gate mechanisms may also be used to selectively orient documents. This may be desirable, particularly when it is desired to provide customers with documents uniformly oriented in a stack. This may be accomplished by re-orienting the documents prior to storage based on the orientation of each document as determined by the identification device 88. However as discussed previously, the present invention does not require documents to be oriented in any particular way for satisfactory operation.

The storage of documents in a storage location is now described with reference to FIGS. 47–53. For purposes of this illustration, storage of a document in storage area 102, as shown in FIG. 35, will be discussed. However it should be understood that the following description is generally applicable to the storage of documents in any of the storage areas available in the machine of the preferred embodiment.

Figure 47:
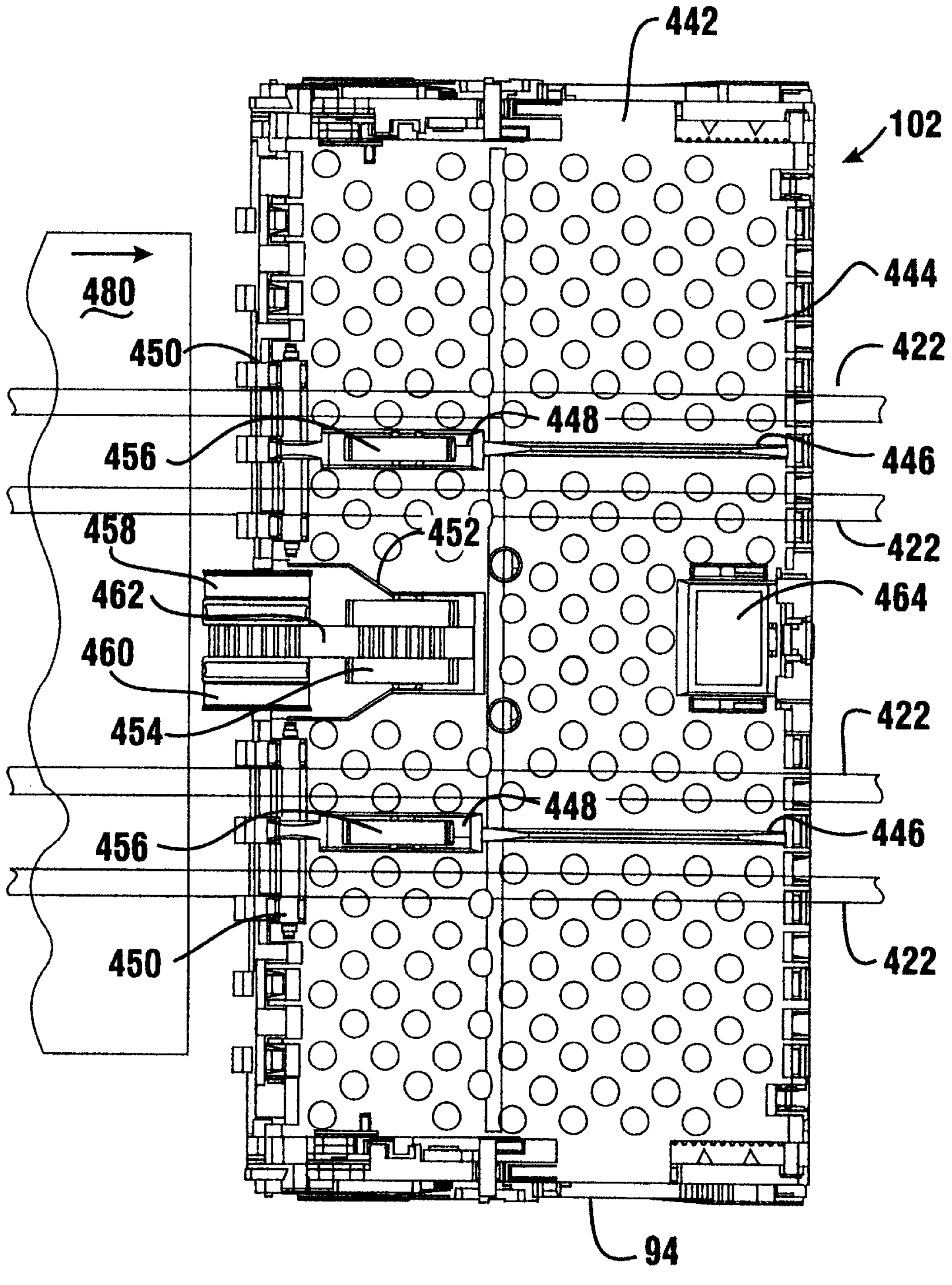
FIG. 47 is a top plan view of a lid covering a storage area within a recycling currency canister.

Referring to FIG. 47, storage area 102 is shown from the top. Belt flights 422 of the canister transport 26 extend above a bin door 442. Bin door 442 is movably mounted above storage area 102. Bin door 442 includes a supporting surface 444 which supports notes or other documents moving thereon to and from adjacent storage areas. Supporting surface 444 includes dimpled projections which serve to reduce surface tension and sticking of documents that move thereon.

Bin door 442 includes projections 446 which engage passing documents and maintain the documents in engagement with belts 422. A pair of openings 448 are in aligned relation with projections 446. Openings 448 provide access for thumper wheels which are later discussed. As can be seen in FIG. 47 projections 446 are tapered adjacent to openings 448 to minimize the risk of documents sticking thereon. Bin door 442 also includes a plurality of rollers 450. Rollers 450 are positioned in aligned relation with belts 422. Rollers 450 engage the belts and facilitate movement of the belts when the bin door 442 is opened to accept a document in a manner that is later described.

Bin door 442 also includes a central opening 452. Opening 452 is sized to accept a pair of closely spaced thumper wheels 454 therein. The central thumper wheels 454 are similar in construction to outboard thumper wheels 456 which extend through openings 448. Central opening 452 is also sized to accept feed wheels 458 and 460 which are positioned adjacent to the front of the bin door 442 covering storage area 102. The feed wheels 458 and 460 are connected to thumper wheels 454 by a feed belt 462.

Is should be understood that thumper wheels 454 and 456, as well as feed wheels 458 and 460, are supported on a surface positioned adjacent to and vertically above bin door 442. The feed wheels and thumper wheels are preferably supported on the housing of the machine, whereas storage area 102 and bin door 442 are supported on recycling canister 94. The recycling canister may be removed from the machine when the feed wheels and the thumper wheels are positioned so they do not extend through opening 452.

Bin door 442 also includes a sensor 464. Sensor 464 is an optical receiver type sensor that receives signals from an opto-emitter device which is positioned in the machine adjacent to and above sensor 454 when the canister 94 is in its operative position. Sensor 464 is in connection with the control circuitry of the machine.

The steps involved in storing a note in storage area 102 is now described with reference to FIGS. 48–53. Storage area 102 holds a stack 466 of documents. Stack 466 is preferably a plurality of horizontally oriented documents which are supported on a push plate 468. Push plate 468 is biased upwards by a spring or similar mechanism. The stack is held at its upper end by a plurality of transversely spaced front fingers 470 and back fingers 472. The front fingers and back fingers are movable in the manner hereinafter discussed.

Bin door 442 includes an inner surface 474 which includes a plurality of downward extending projections with recesses therebetween. In the position of fingers 470 and 472, inward facing projections 476, 478 adjacent the upper ends of the fingers 470 and 472 respectively, extend above the stack and are movable in the recesses of the inner surface of the bin door. These inward extending projections 476 and 478 of fingers 470 and 472 hold the top of the stack in captured relation in the positions shown in FIG. 48.

Figure 48:
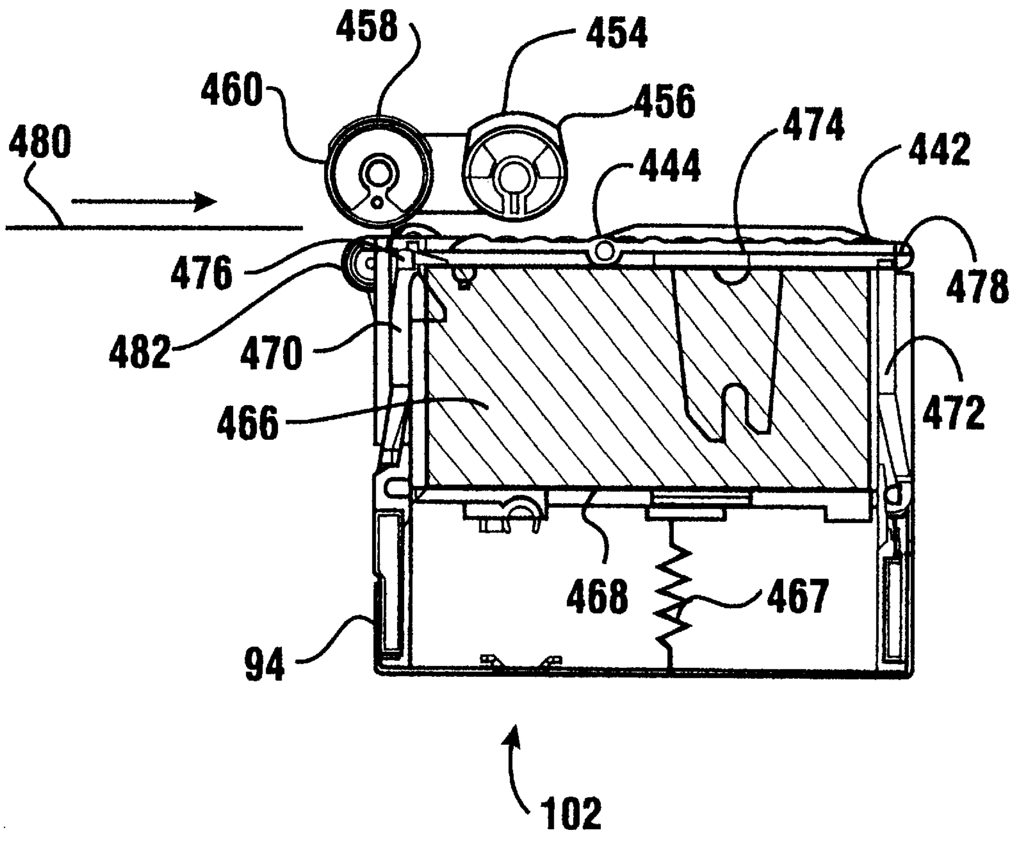
FIG. 48 is a side cross sectional view of a storage area in a currency canister shown with a sheet moving towards the storage area.
Figure 49:
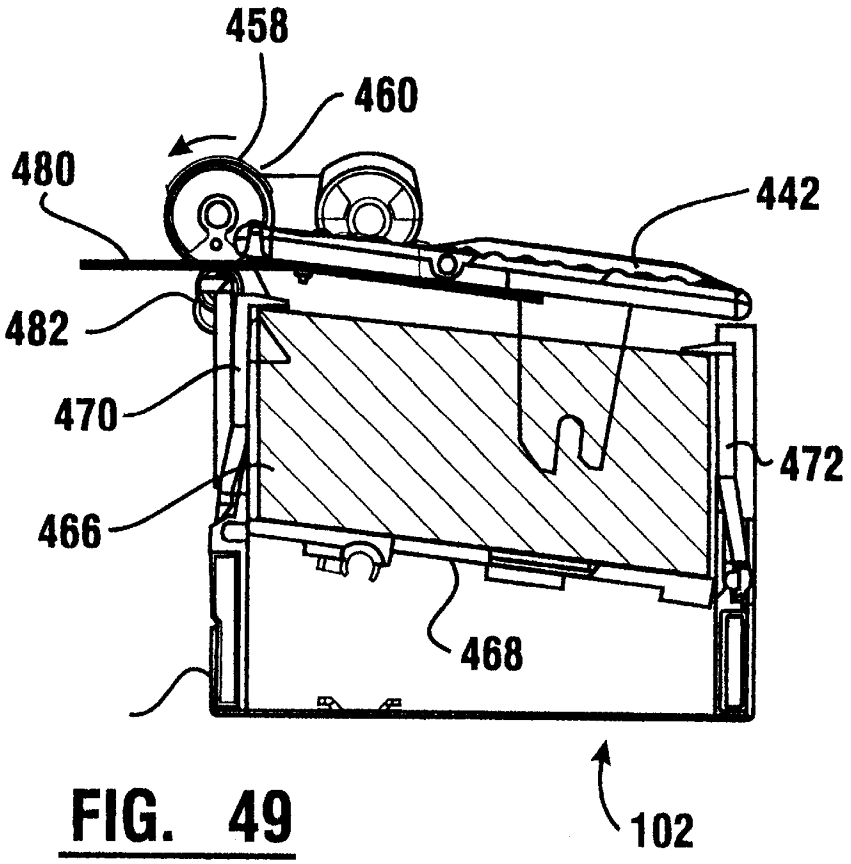
FIG. 49 is a view similar to FIG. 48 showing the sheet partially accepted into the storage area.

In FIG. 48 a document 480 is shown as it moves toward the storage area 402. In this position prior to arrival of the document, the feed wheels and thumper wheels are positioned above the supporting surface 444 of the bin door. Take away wheels 482 which are movably mounted on the canister 94 which includes storage area 102, are moved to a position disposed away from the feed wheels 458 and 460.

Upon arrival of the document 480 at the storage area 102 the bin door 442 rises upward in a front area adjacent to a front surface thereof. The take away rolls 482 move upward while the feed wheels 458 and 460 engage and move the document into the storage area 102. Fingers 470 and 472 also move the upper surface of the stack downward against the biasing force which is applied upward by the push plate 468. This enables document 480 to move into the storage area above the inward projections of the fingers.

Figure 50:
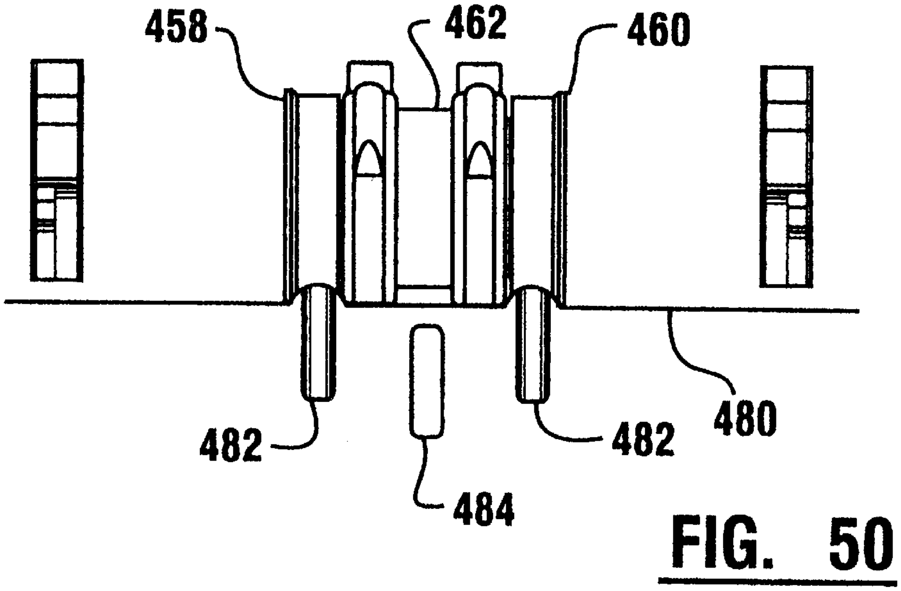
FIG. 50 is a front plan view of the feed wheels, take away wheels and thumper wheels adjacent to the storage area, with the sheet shown moving into the storage area as shown in FIG. 49.

FIG. 50 shows the configuration of the feed wheels and take away wheels as document 480 is moved into the storage area. In this condition the feed wheels 458 and 460 engage document 480 as do the take away wheels 482, so that the document may be driven into the storage area. As shown in FIG. 50 a stripper roll 484, the operation of which is later discussed in detail, remains disposed away from the feed belt 462 as the document 480 enters the storage area.

Figure 51:
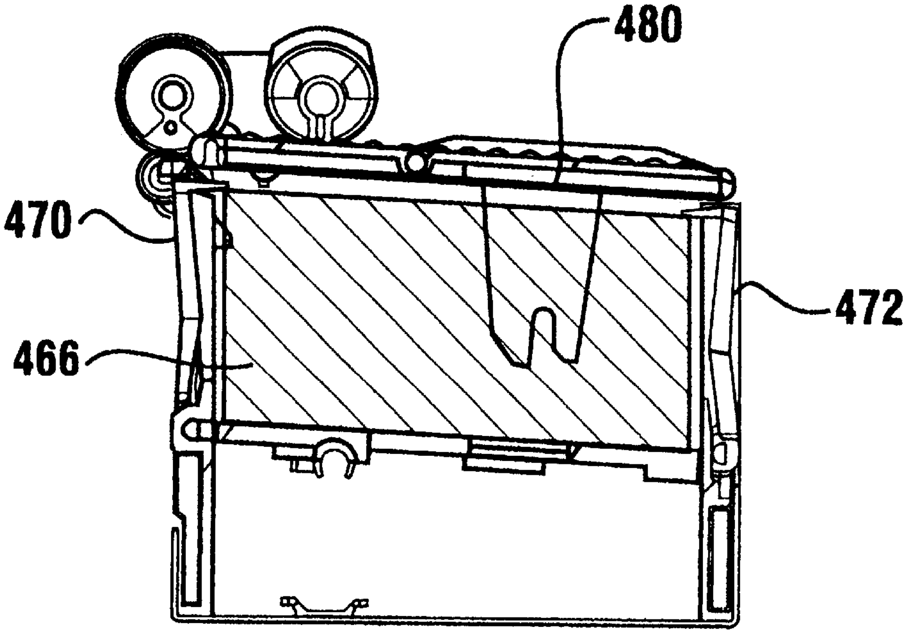
FIG. 51 is a view similar to FIG. 49 with the sheet moved into the storage area but positioned above the stack of documents held therein.

As shown in FIG. 51 document 480 enters the storage area 102 above the stack 466. Fingers 470 and 472 are then moved outwardly as shown in FIG. 51.

Figure 52:
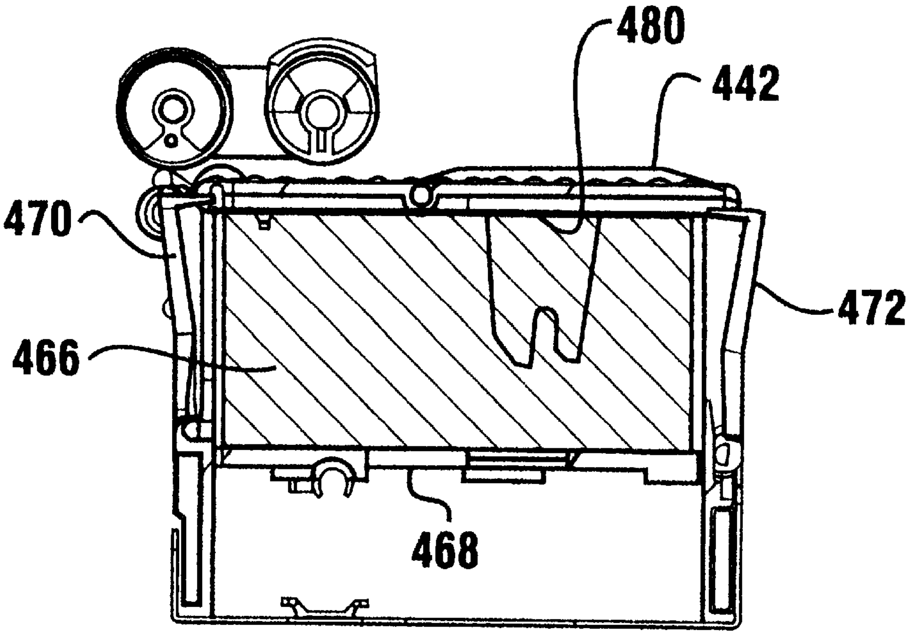
FIG. 52 is a view similar to FIG. 50 with the accepted sheet integrated into the stack.
Figure 53:
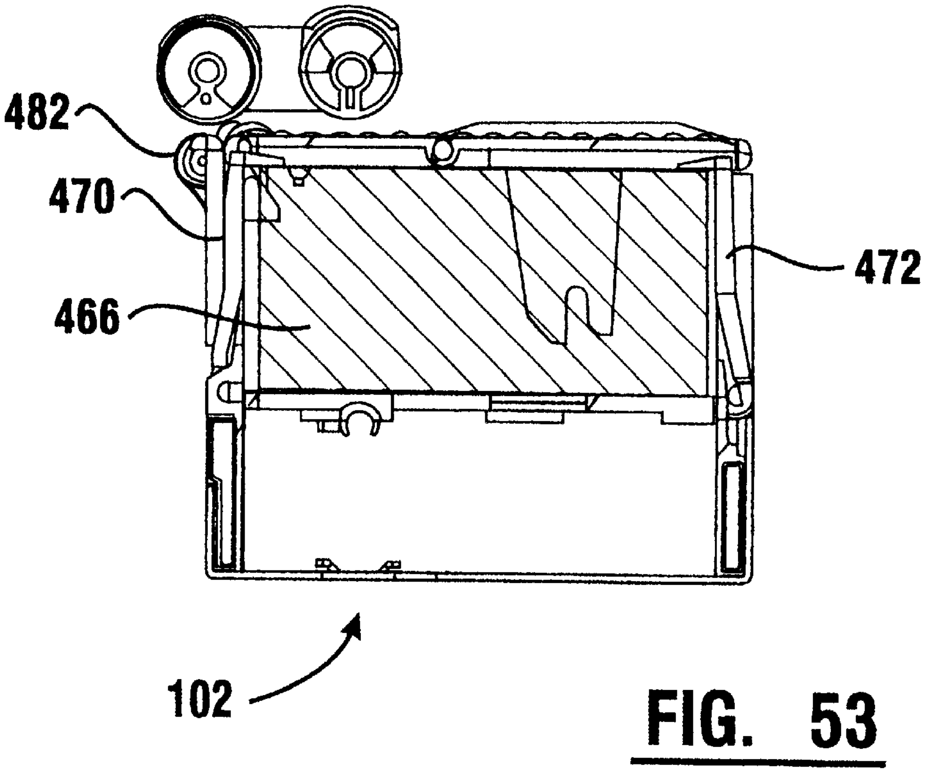
FIG. 53 is a view similar to FIG. 52 with the newly accepted sheet held as part of the stack by fingers positioned adjacent to the storage area.

As shown in FIG. 52, eventually fingers 470 and 472 are moved outwardly a sufficient distance to release the stack 466 so it moves upwardly in response to the biasing force on the push plate 468. As a result, document 480 is integrated into the stack as the bin door 442 moves downward to its original position. When the bin door is moved downwardly the inward extending projections on the fingers 472 and 470 are in aligned relation with the recesses on the inside surface of the bin door.

From the positions shown in FIG. 52, fingers 470 and 472 move inwardly to again capture the top surface of the stack which now includes document 480. The take away wheels 482 are again retracted downward and storage area 102 is again ready to receive further documents for storage therein.

As will be appreciated from the foregoing discussion, mechanisms in addition to those shown are used to move the bin door fingers and wheels of the invention. These mechanisms may include conventional motors and other mechanisms and linkages suitable for use in moving the components in the manner described. Such conventional components are not shown herein to promote clarity and facilitate understanding of the operation of the invention.

It should be understood that when one or more documents are routed into a storage location in the machine, the storage location where the particular document(s) are to be stored undergoes the described series of steps. While the series of operations for the storage location has been described as receiving documents and then integrating them into the stack in the storage location one document at a time, it should be understood that the mechanisms in the storage areas may optimally be configured so that a plurality of documents may be collected in the storage area above the fingers and then the fingers and bin door moved to integrate the plurality of documents into the stack. Such a configuration may be used to optimize the speed of operation of the automated banking machine. It should be further understood that while the mechanism for storing documents in the storage areas is exemplary, other mechanisms which store such documents may be used in alternative embodiments of the invention.

Figure 54:
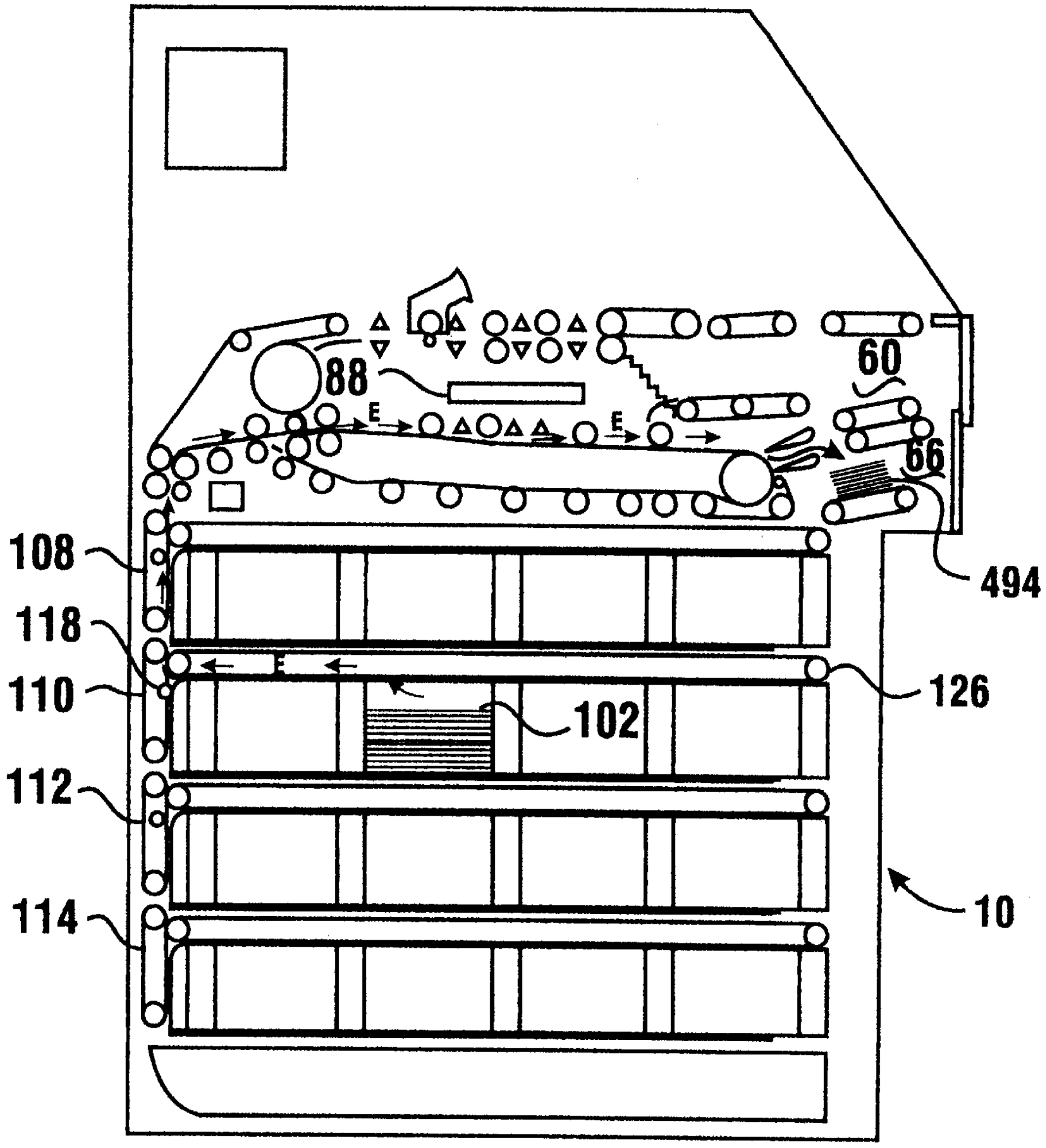
FIG. 54 is a schematic view similar to FIG. 1 showing the flow of sheets from a storage area to an escrow area in response to a document dispense request input by a user.

The operation of machine 10 is now described with regard to a transaction in which documents are retrieved from storage areas in the machine and dispensed to a customer. This is represented schematically in FIG. 54. In a dispensing operation, documents will generally be removed from a plurality of storage locations and moved concurrently under the control of control system 30 to the escrow area 66. As shown schematically in FIG. 54, each of the documents removed from a storage area is moved from the respective canister transport to the adjacent remote transport segment and directed upward by the gate to the central transport. In the central transport the documents each pass the identification device 88. The type and character of the document is again determined prior to being dispensed to the customer. The flow of documents during this dispensing (document recovery) operation is represented by Arrows "E" in FIG. 54. Of course as can be appreciated from the foregoing discussion, if at any time in the processing of documents which are to be provided to a customer, an improper or unidentifiable document is found, it may be routed to the delivery/reject area 60 for reprocessing or return into the machine.

The recovery of documents from a storage area is represented by the sequence of operations shown in FIGS. 55–61 in connection with storage area 102. For purposes of clarity and simplicity document 480, which was previously deposited at the top of the stack 466, will be dispensed in this exemplary sequence of events.

Figure 55:
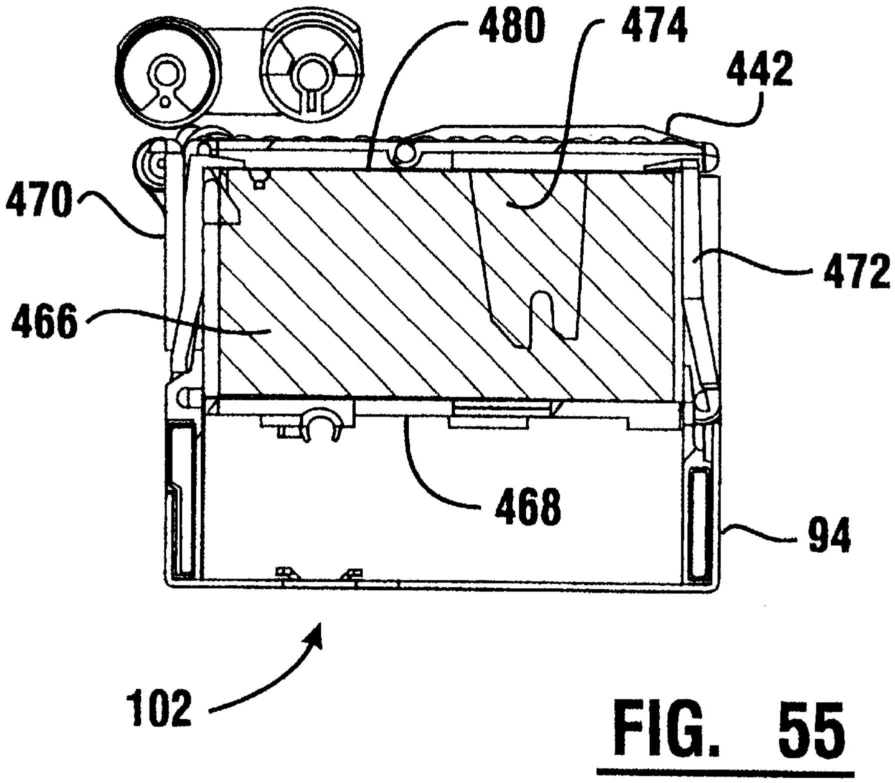
FIG. 55 is a cross sectional view of a storage area including a stack of sheets therein from which one sheet is to be removed as part of a dispensing operation.
Figure 56:
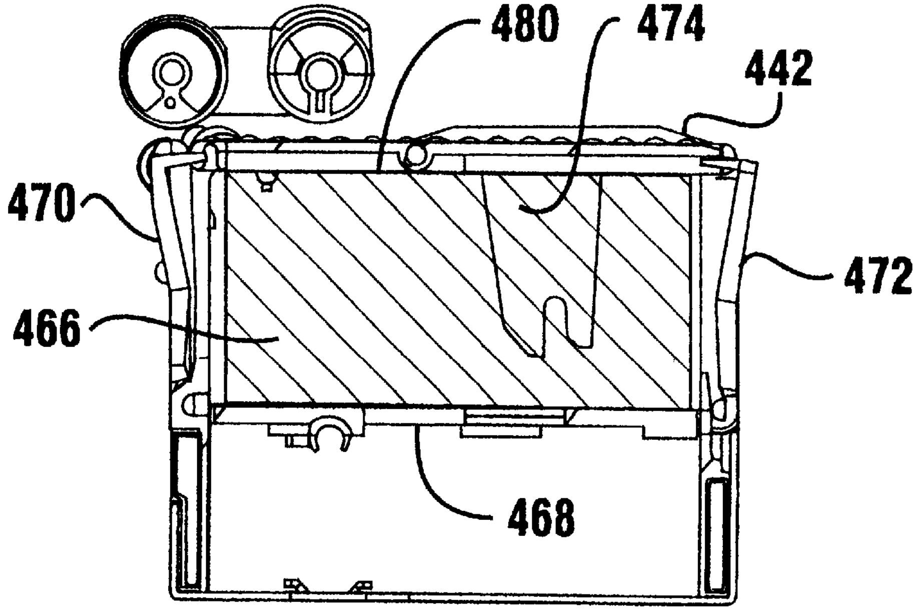
FIG. 56 is a view similar to FIG. 55 in which the fingers holding the stack of sheets in the storage area have been retracted to enable the sheets to engage the inner surface of the bin door.

As shown in FIG. 55 in the initial position of storage area 102, bin door 442 is disposed downward. The inward projections of the fingers 470 and 472 extend in the recesses in the inner surface 474 of the bin door. The fingers along with the inner surface of the bin door retain the top of the stack which is bounded by document 480. The stack 466 is biased upwardly by spring action of push plate 468.

In the next step in dispensing the document, the fingers 470 and 472 are moved outward relative to the stack. This enables document 480 at the upper surface of the stack 466 to be fully engaged with the inner surface 474 of the bin door 422.

Figure 57:
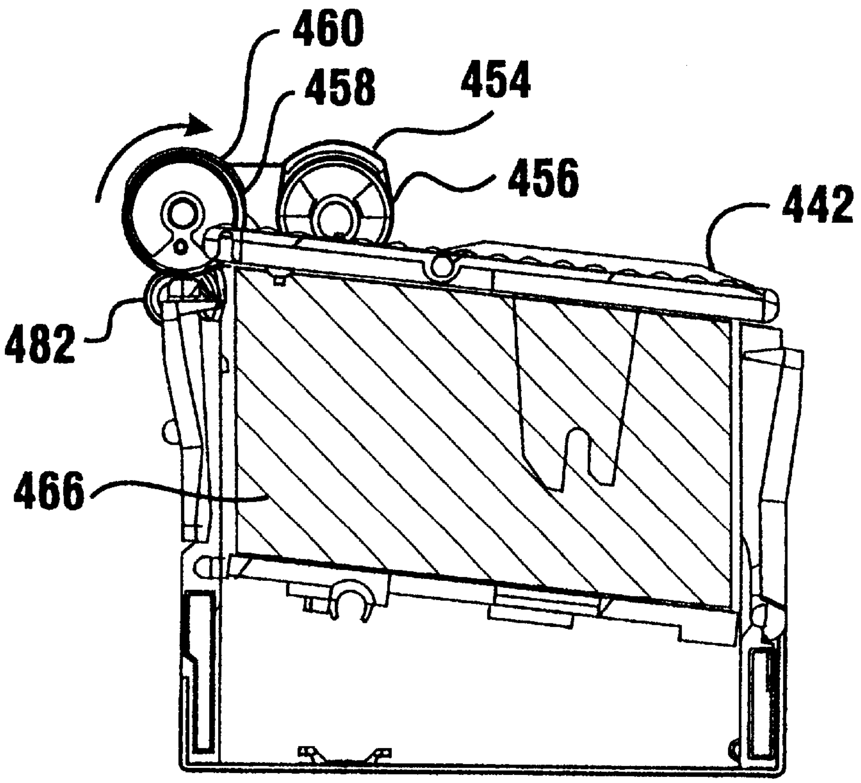
FIG. 57 is a view similar to FIG. 56 in which the bin door is raised with the feed wheels and thumper wheels shown beginning to move so as to pick a sheet from the stack.

As next shown in FIG. 57 the front of the bin door 422 is moved upward. The take away wheels 482 are moved upward to engage the feed wheels 458 and 460 (see FIG. 59). Likewise stripper roll 484 is moved upward to engage feed belt 462.

Figure 59:
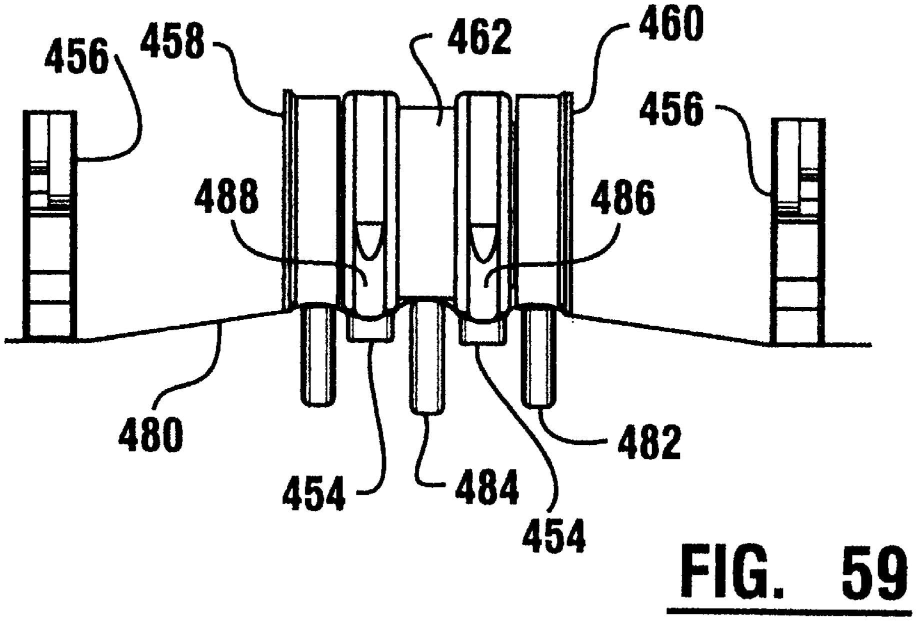
FIG. 59 is a front view of the feed wheels, thumper wheels, stripper wheel and take away wheels in engagement with a sheet as it is being removed from the stack in the manner shown in FIG. 58.
Figure 60:
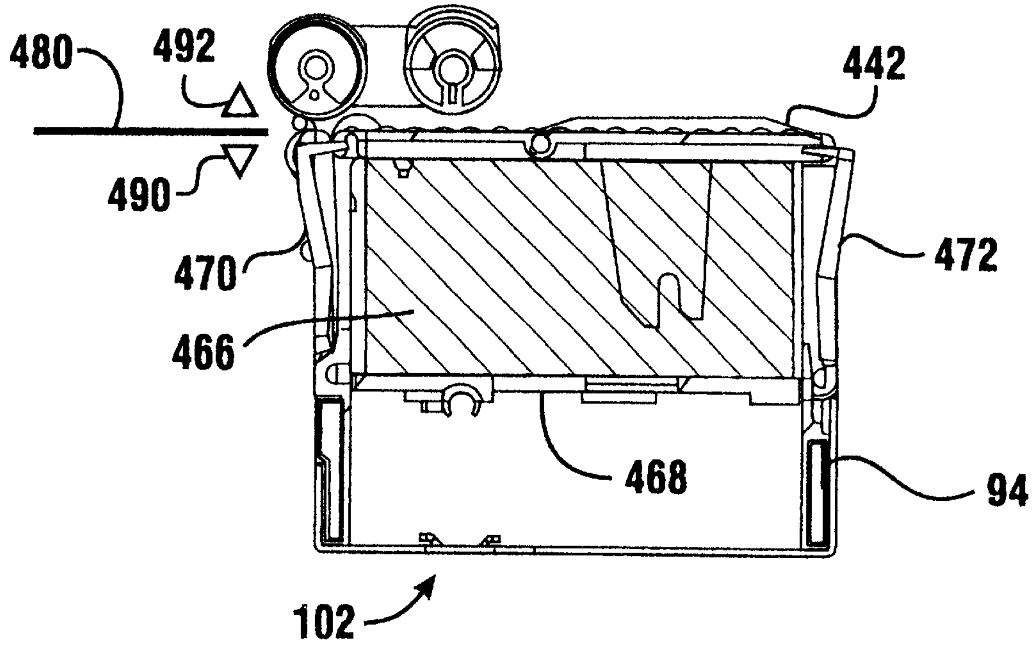
FIG. 60 is a view similar to FIG. 58 with the sheet shown having been removed from the storage area and being sensed by a doubles detector.
Figure 61:
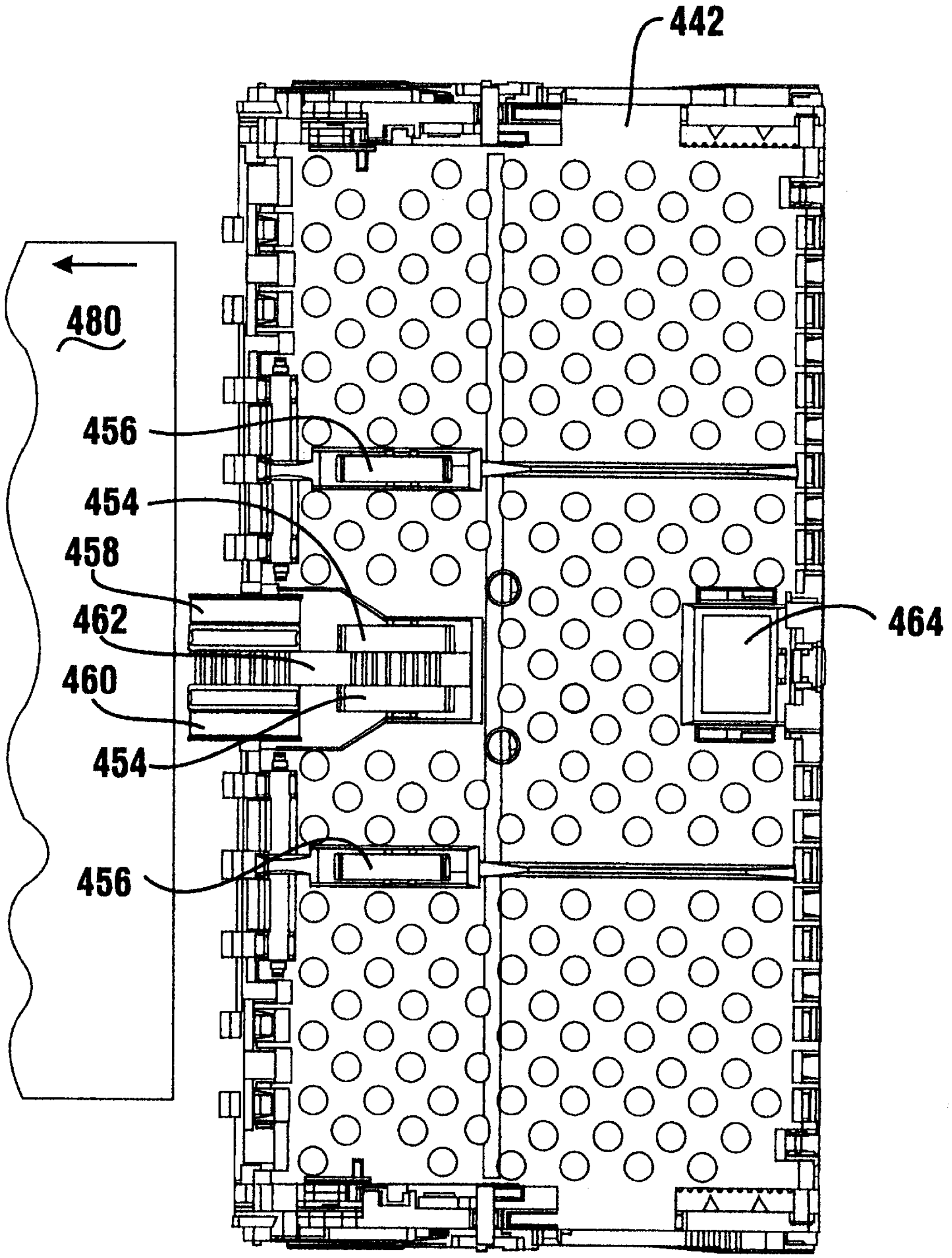
FIG. 61 is a top plan view of the bin door overlying a storage area showing a sheet having been removed therefrom and moving towards a gate mechanism adjacent to the remote transport.

It should be noted with regard to FIG. 59 that feed wheel 460 includes an inner portion which has a high friction segment 486 thereon. High friction segment 486 comprises a band of resilient material that extends part way circumferentially about the inner portion of the wheel. Feed wheel 458 has a similar high friction segment 488 thereon. The high friction segments provide gripping engagement with a top document in the stack when the feed wheels are positioned to place the high friction segments in engagement with the top document.

It should further be understood that stripper roll 484 includes a one way clutch type mechanism. This one way clutch mechanism enables the stripper roll to rotate in a manner which allows a document to readily move into the storage area 102. The clutch associated with stripper roll 484 is oriented to resist movement of documents out of the storage area. In this manner the stripper roll 484 generally strips all but the document at the very top of the stack and prevents other documents from leaving the storage area. This is achieved because the high friction segments provide greater force moving the single document outward than the resistance applied by the stripper roll.

As is also shown in FIGS. 57 and 59, thumper wheels 454 and 456 include an outward extending portion. These outward extending portions are aligned so that all of the extending portions extend through the respective openings in the bin door simultaneously. As is shown in FIG. 59 these extending portions are generally in arcuate alignment with the high friction segments on the feed wheels.

Figure 58:
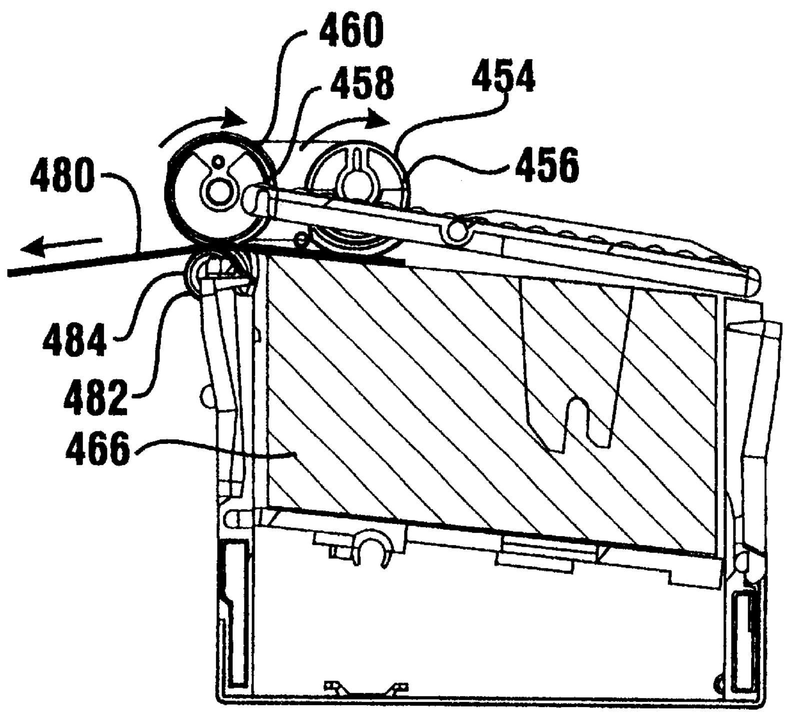
FIG. 58 is a view similar to FIG. 57 showing the feed and thumper wheels moved to a position in which a top sheet in the stack is being removed therefrom.

As shown in FIG. 58 to pick a document the feed wheels and thumper wheels are rotated so that the extending portions of the thumper wheels and the high friction segments of the feed wheels engage document 480 at the top of stack 466. The action of the thumper wheels, feed wheels, take away wheels and stripper roll, operate to separate document 480 from the stack and move it outwardly from the storage area as shown in FIG. 58. The preferred embodiment of the apparatus is generally sized so that a single rotation of the feed wheels and thumper wheels is sufficient to remove a document from the storage area. Once the document is removed from the storage area the bin door 442 is again closed and the take away wheels and stripper roll moved so as to be retracted from the canister. The fingers 470 and 472 are moved upward and then inward to again engage the top of the stack.

As document 480 is removed from storage area 102 the transmissivity of light through the document is sensed. The transmission of light through the document is sensed by a sensor 490 which is similar to sensor 464 and is positioned on the bin door or other structure covering the storage area or otherwise in front of storage area 102. Emitter 492 mounted on the machine emits sufficient light so that it can be determined if a double note has been removed from the stack.

Emitter 492 and sensor 490 are connected to the control system which is programmed to recognize when a double document has been picked from the storage area. The machine may operate in a number of ways to deal with this occurrence. If the document has been removed entirely from the stack, the document may be reversed in direction and deposited back into the stack. Then an attempt made to again remove it. Alternatively, in an attempted second picking operation the feed wheels may be oscillated back and forth as the note is being picked to minimize the possibility that two notes will be removed together. This may be done automatically in some conditions where documents are known to have a particularly high affinity or surface tension which makes them difficult to separate.

Finally, in the event that repeated attempts to pick a single note from the storage area are unsuccessful, the machine may operate to route the picked document(s) to another storage area or to the dump area 132. The machine may then proceed to pick a next note from the stack. The programming of the machine 10 is preferably established to minimize the delay associated when a picking problem is encountered.

Figure 62:
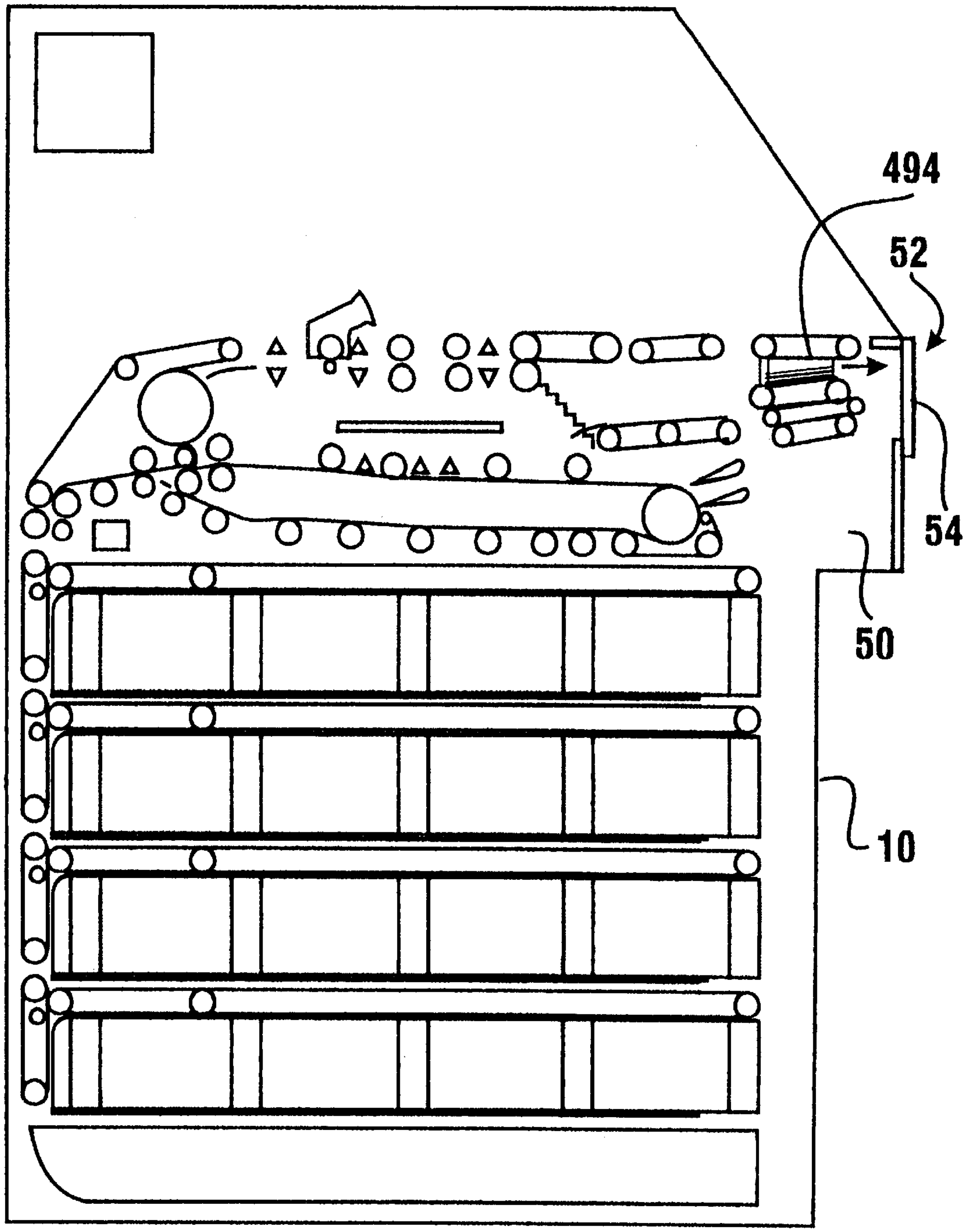
FIG. 62 is a schematic view similar to FIG. 1 showing a stack of sheets that have been dispensed from storage locations being delivered to a user of the machine.

After the document 480 has been successfully removed from the storage area 102 it is transported to the remote transport segment 110 and is routed by the gate 118 toward the central transport. Document 480 along with other documents passes the identification device 88 which confirms the identity of each document. The documents are deposited in the escrow area 66 where an escrow stack 494 is accumulated. Thereafter as schematically represented in FIG. 62, escrow stack 494 is moved upwardly in the input/output area 50 of the machine. Gate 54 is opened and the stack is delivered to the customer through opening 52.

Figure 69:
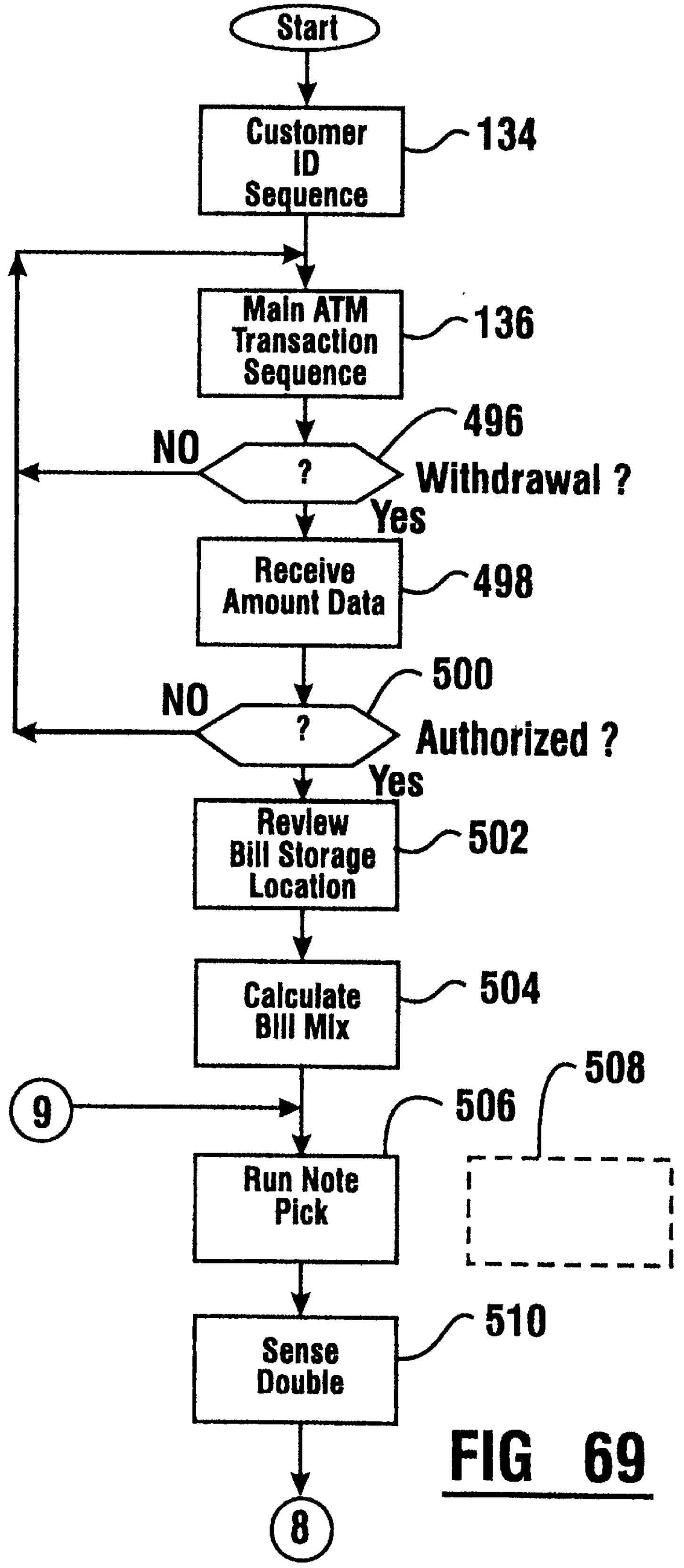
FIGS. 69 and 70 are a simplified flow chart showing the transaction flow of a withdrawal transaction conducted at the machine.
Figure 70:
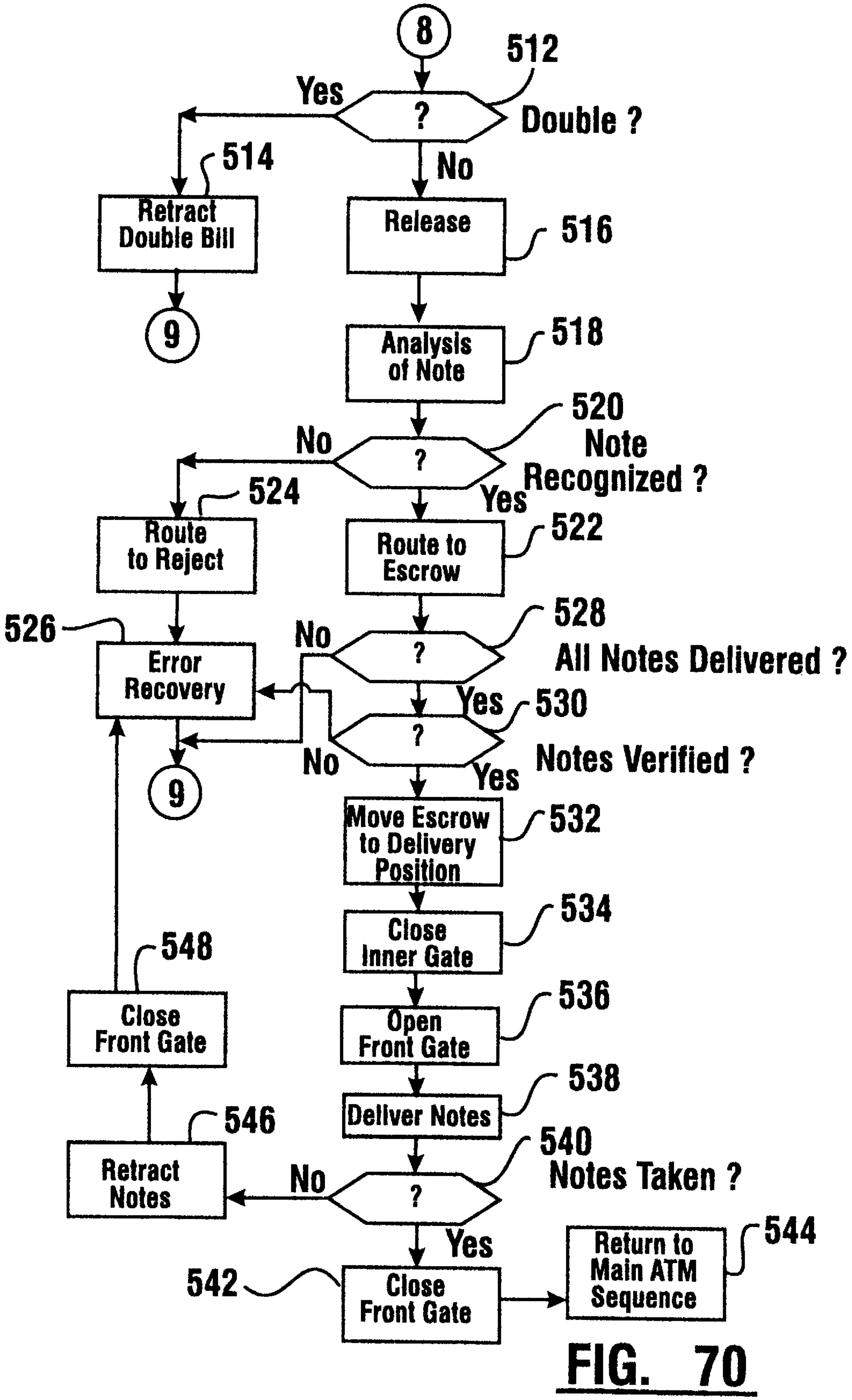

The transaction flow executed by the control system for carrying out the operations of the machine in a withdrawal transaction is represented in FIG. 69 and 70. As is the case with the deposit transaction, the machine first goes through a customer identification sequence represented by a step 134 in which the customer operating the machine is identified. This customer ID sequence is not executed when the customer has operated the machine to conduct a prior transaction. After the customer has identified themselves, the machine goes through the main ATM transaction sequence 136, as previously described.

The customer next indicates at a step 496 through the customer interface that they wish to conduct a withdrawal transaction. The amount of the withdrawal is then received by the machine based on customer inputs at a step 498. At a step 500 the machine operates to determine if the amount of the withdrawal that the customer has requested is authorized by the programming of the machine and/or the programming of a computer which is in communication with the machine. If not, the machine returns to the main sequence and provides instructions to the customer.

If the amount of the withdrawal is authorized, the control system of the machine looks up the storage locations of the various bill denominations at a step 502, and calculates a bill mix to be provided to the customer at a step 504. It should be noted that in some embodiments of the invention, which are intended to be used primarily by commercial customers, the customer may be allowed to select the mix of denominations of bills that the customer will receive. This is done by the control system using programmed prompts displayed on the customer interface. The customer inputs through the customer interface the quantity of each bill type they desire. If however the machine does not provide that option or the customer does not provide a specific denomination selection, the machine will operate to determine the number of various types of bills that it has available and will provide bills to the customer in denominations which will minimize the probability that the machine will run out of bills of any particular type.

The machine next proceeds to a step 506 in which the control system operates to pick notes from the various storage areas. As indicated by phantom step 508, the picking operations are executed concurrently in the preferred embodiment of the invention. Multiple bills may be picked from the various storage locations and moved as a stream of separated notes through the remote transport segments and into the central transport of the machine.

For each picking operation, after the note is picked a step 510 is executed to sense for double notes having been picked from a storage location. If a double is sensed at a step 512 the note is retracted at a step 514 and an effort is again made to pick a single note. If however 13 in step 512 a single bill is sensed the bill is released in a step 516. In step 516 the note is released in coordinated relation with the other notes by the control system to assure that each note reaches the central transport of the machine in spaced relation with the other notes. However the spacing is such that the notes move concurrently and are delivered into the escrow location at high speed.

An analysis of each passing note is done by the identification device 88 which is indicated at a step 518. If the note is recognized as proper at a step 520, the note is routed to the escrow area 66 at a step 522. If the note is not recognized in step 520 or is improper, it is routed to delivery/reject area 60 in a step 524. The failure to identify a note which has come from a storage location is an unusual event. This is because each stored note has usually been twice previously identified. Problems may arise when the note was loaded into the canister outside the machine. If a note is rejected, the transaction flow proceeds to an error recovery step 526. This error recovery program may include routing the note back through the central transport to a designated storage location for later analysis.

Notes are delivered into the escrow area until all the notes which respond to the withdrawal request by the customer have been delivered. The completion of the delivery is checked at a step 528. A check is then made at a step 530 to determine if all the notes that have been delivered have been properly identified. If not and there are notes in the reject area, the error recovery step 526 is executed.

If however the notes have all been properly identified the escrow stack corresponding to stack 494 in FIG. 62 is moved to the delivery position in a step 532. The inner gate is then closed at a step 534. The front gate is opened at a step 536 and the transport belts move to deliver the notes to the customer at a step 538.

At a step 540 a determination is made based on reading from sensors 148 and 150 as to whether the stack of notes has been taken by the customer. If so, the front gate is closed at a step 542. The transaction flow then returns to the main ATM sequence at a step 544.

If however the notes are not taken by the customer routines may be executed to prompt the customer through the customer interface to remove the notes. However if the customer does not take the notes, then step 546 is executed to retract the notes into the machine. The front gate is closed at a step 548 and the machine then proceeds to the error recovery routine. This may include for example, storing the notes in a particular storage location. Alternatively it may involve reversing the withdrawal transaction requested by the customer and placing the notes again back in the various storage areas by running them through the central transport.

Figure 63:
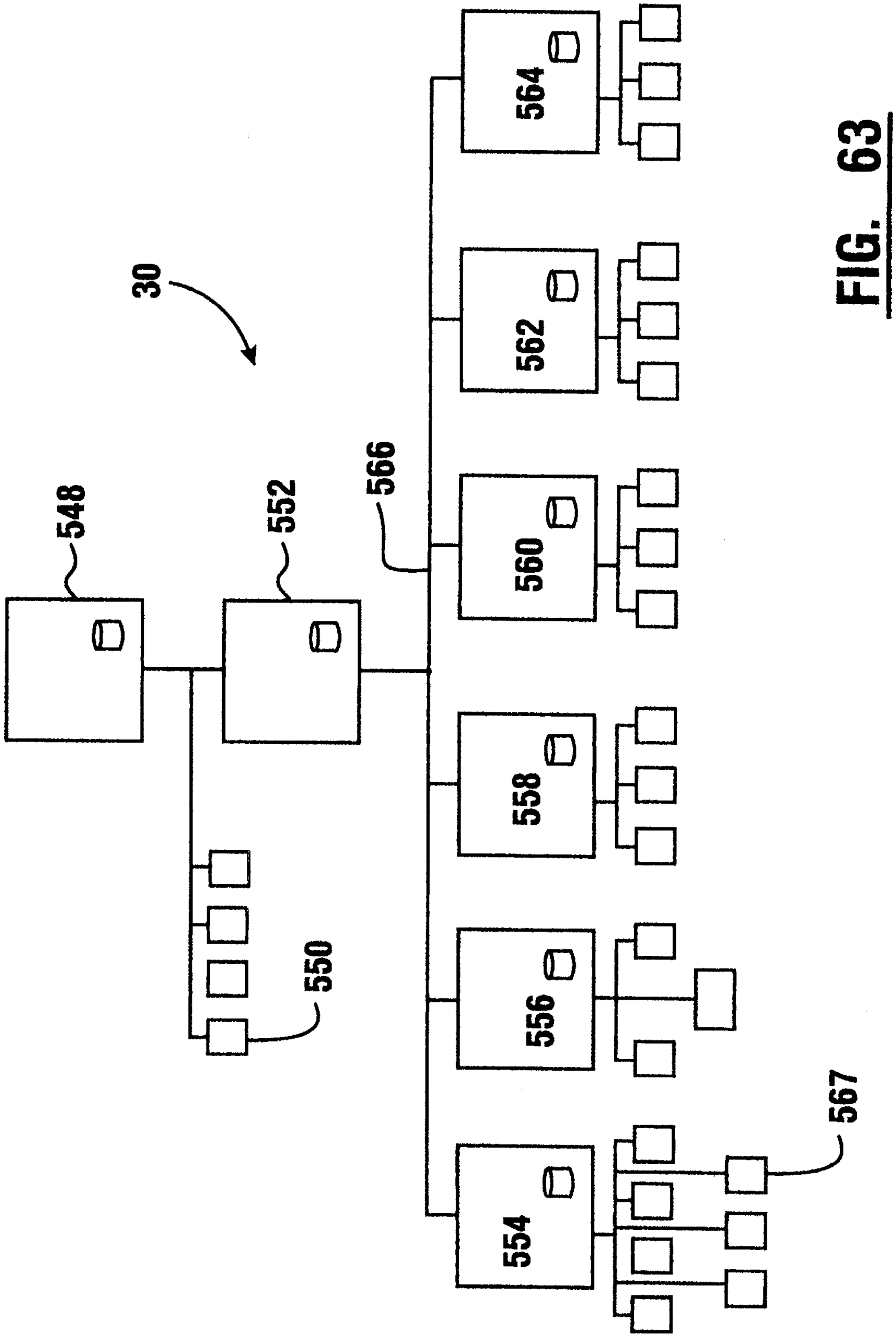
FIG. 63 is a schematic view of the architecture of the control system of a preferred embodiment of the machine.

An advantage of the preferred embodiment of the present invention is its ability to operate at high speeds. This is achieved through the architecture of the control system 30 which is schematically represented in FIG. 63. The preferred embodiment of the system uses a control system which includes a terminal processor 548. The terminal processor contains the general programming of the machine as well as the programs necessary for operation of the communication and other functions that the machine carries out. As indicated in FIG. 63, terminal processor 548 is in operative connection with a data store which includes program data. Terminal processor 548 is in communication through appropriate interfaces with various hardware devices 550.

Terminal processor 548 is also in operative communication with a module processor 552. Module processor 552 orchestrates the operations carried out by the plurality of module controllers 554, 556, 558, 560, 562 and 564. As indicated, module processor 552 is also in operative connection with its own respective data store which holds its programming. Likewise each of the module controllers preferably include data storage for executing various programmed operations. The module processor 552 is operatively connected to each of the module controllers through a data bus 566. The module controllers each communicate through the data bus only with the module processor 552, and the module processor communicates directly with each module controller. Each module controller has associated therewith hardware devices indicated 567. Each module controller has associated therewith its own respective types of hardware devices which it is responsible for operating and controlling.

In operation of the system each module controller operates programs to execute particular tasks associated with each hardware device that is connected to it. This may be for example, a particular function associated with moving a mechanism or a document. These tasks are coordinated with other tasks executed through the module controller concerning related hardware. The movement of documents concurrently however is coordinated by the module processor 552 operating to send the control signals to the various module controllers, so that document handling functions are carried out in a timed and coordinated relation. The terminal processor 548 controls the operation of the module processor to carry out the particular transactions which are indicated by the terminal programming. As a result of this configuration, documents are enabled to be handled concurrently, yet independently throughout the machine which greatly speeds the operation of storing and retrieving documents.

The sheet thickness detectors used in the preferred embodiment of the machine 10 enable reliably sensing when instances of double or overlapped documents have entered the sheet path. As previously discussed, in the case of doubles which are dispensed from the unstack area 72, doubles sensors 80 enable double notes to be sensed so that they may be retracted back into the document stack. Likewise when documents are dispensed from storage areas a sheet thickness sensor which includes emitter 492 and sensor 490 detect if a single or double sheet is being moved from the storage area. This enables double sheets to be retracted.

In the preferred form of the invention optical type sheet thickness sensors are used. Optical sensors have an advantage in that they do not require physical contact between components of the detector. This is advantageous when a component of the detector must be supported on a removable component, such as a recycling canister. The use of optical detectors is also an advantage when components of the detector must be positioned on a movable component such as bin door 442 upon which sensor 490 is supported.

Optical type sheet thickness detectors generally detect the thickness of passing sheets by sensing the amount of light which is enabled to pass through the sheet. Because a double or triple sheet passes significantly less radiation therethrough than a single sheet, double or overlapped sheets can often be detected.

A problem which arises in using optical sensors for currency and similar documents is that the patterns printed on currency notes are not uniform. Conventional optical doubles detectors generally pass light through only a small area on the note. If an optical sensor encounters an area that has printing or other markings it passes less light, and an erroneous indication of a double note may result. Further, currency notes can become soiled and are sometimes marked by persons in ink or pencil. When the area sensed by the doubles detector includes such markings erroneous doubles indications may result. Different currencies also have different properties which may cause the transmissivity of a currency sheet to vary from location to location. Generally those who have attempted to use optical type sheet thickness sensors in automated banking machines have tried to position the sensors in an area where the transmissivity through a sheet is unlikely to result in a false doubles indication.

The present invention is configured to handle a wide variety of different types of sheets. It also handles sheets in a variety of orientations. As a result there is no single location where a conventional optical sheet thickness detector may be positioned relative to the sheet path that will always be a "good spot" in terms of not encountering areas of low transmissivity.

Figure 71:
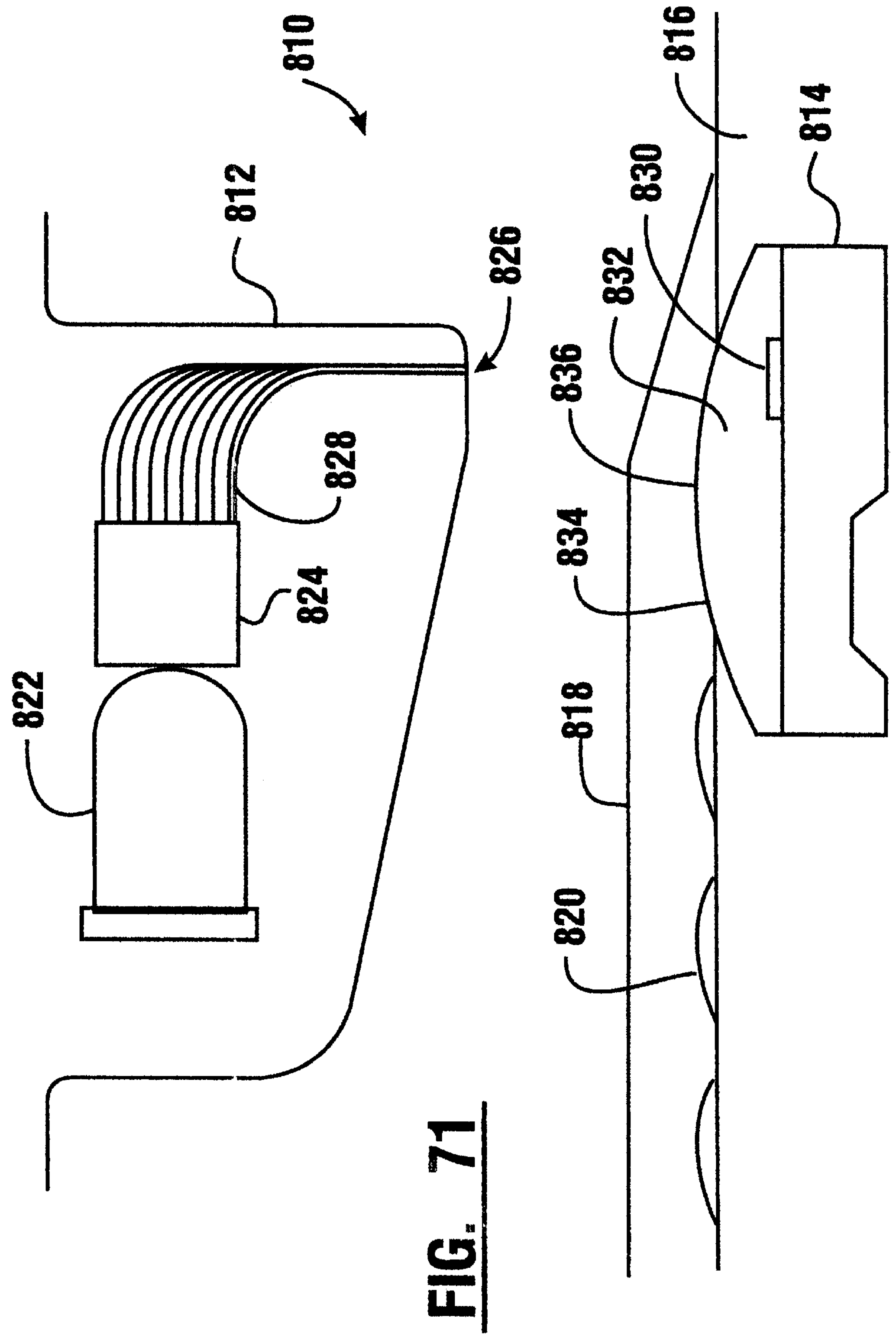
FIG. 71 is a side cross-sectional schematic view of the emitter and receiver of a sheet thickness detector used in the machine.

To overcome this limitation the preferred embodiment of the present invention employs a novel sheet thickness detector which can be used to detect the thickness of sheets moving in a sheet path. A first embodiment of the sheet thickness detector is shown schematically in FIG. 71 and is indicated 810. Detector 810 includes an emitter 812 and a receiver 814. Emitter 812 and receiver 814 are similar to emitter 492 and sensor 490 which were previously discussed. Receiver 814 is shown in supporting relation on a bin door 816 which overlies a document storage area (not shown). Bin door 816 includes projections 818 that extend on the bin door in the direction of sheet travel so as to hold the sheets in engagement with an adjacent belt. Surface tension breaking projections 820 are also shown on the surface of the bin door 816.

Emitter 812 includes a radiation source 822. Radiation source in the preferred embodiment comprises an infrared light emitting diode (LED). In other embodiments other radiation sources may be used. When radiation source 822 is energized the radiation therefrom passes into a radiation guide 824. Radiation guide 824 passes the radiation from the source to a radiation outlet 826.

Figure 76:
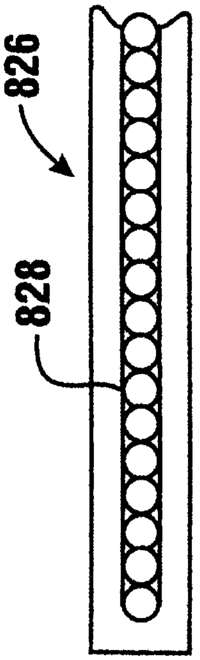
FIG. 76 is an enlarged view of the radiation outlet and the fiber optic strands used in the radiation guide of the preferred embodiment.

In the preferred embodiment of the invention the radiation guide 824 is a fiberoptic bundle which is comprised of a plurality of strands 828 of fiberoptic materials. The strands 828 extend from a first end of the bundle where they receive light from the source 822 to a second end at the radiation outlet. As indicated in FIG. 76 the strands 828 are linearly aligned in a direction transverse to the direction of sheet travel at the radiation outlet 826. As will be appreciated, this configuration provides a relatively wide linear strip from which radiation is emitted at the radiation outlet.

Figure 78:
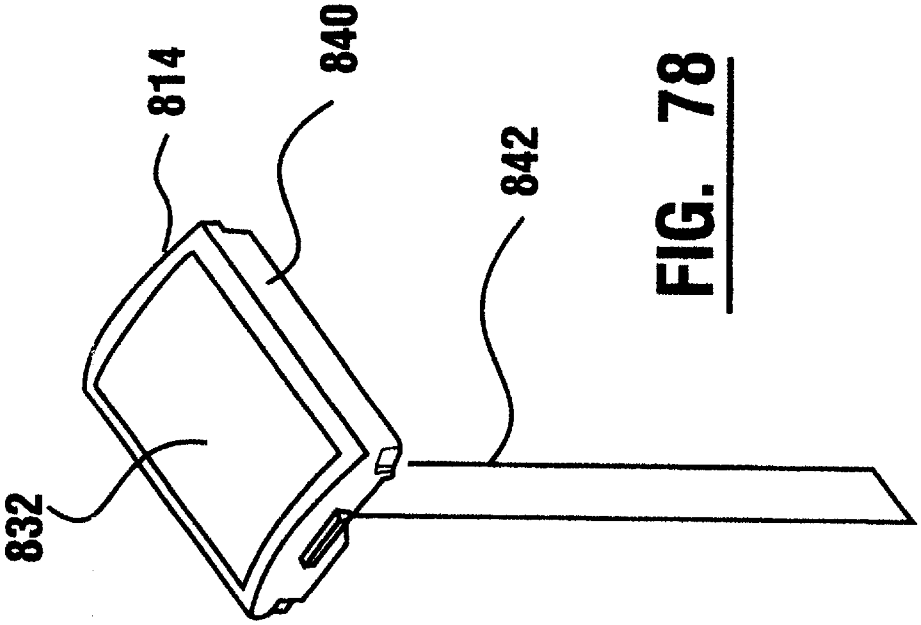
FIG. 78 is an isometric view of the receiver shown in FIG. 77.
Figure 77:
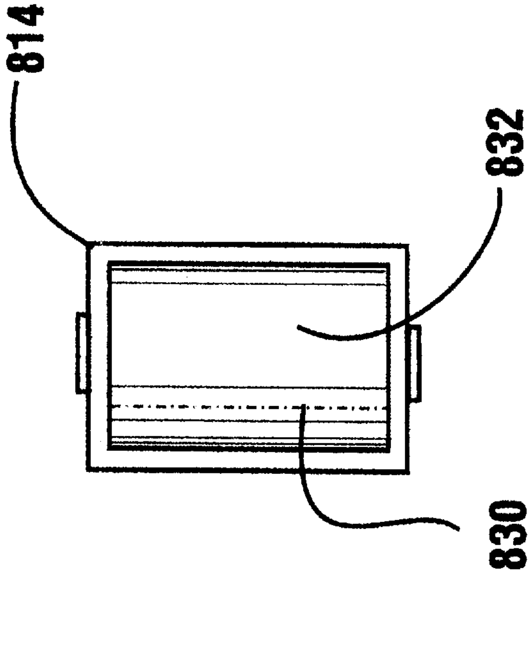
FIG. 77 is a top plan view of the receiver of the sheet thickness detector.

As shown in FIGS. 77 and 78, receiver 814 has a body 840 which extends in a recess in the surface of the bin door. An electrical connector 842 extends from the receiver. Electrical connector 842 passes the signals from the receiver to the canister circuitry, and which is in operative connection with the control circuitry of the machine.

The receiver 814 includes a radiation sensitive element 830. Radiation sensitive element 830 is aligned with radiation outlet 826 and is comparable in transverse width thereto. In the preferred embodiment of the invention radiation sensitive element 830 is a photo diode. Element 830 produces signals which correspond to the amount of radiation from radiation outlet 826 which reaches element 830.

Receiver 814 further includes a lens 832 which overlies the radiation sensitive element 830. Lens 832 passes the radiation from the emitter therethrough. Lens 832 is bounded by an arcuate surface 834 in cross section. The arcuate surface 834 includes an apex area 836 which is a high point of the arcuate surface. It should be noted that the apex area 836 generally corresponds in height to the height of projections 820. Radiation sensitive element 830 is positioned in the sheet path away from the apex 836. This reduces the risk that the lens in the area overlying element 830 will become worn or scratched due to contact with sheets passing thereon.

Radiation source 822 and radiation sensitive element 830 are in operative connection with the control system 30 of the machine. This enables the radiation source to be controlled so as to provide sufficient radiation for purposes of detecting doubles which pass between the emitter and the receiver. Signals from the receiver 830 are used by the control system in the manner hereinafter discussed to sense when single and double documents are present in the sheet path. When double documents are detected they may be retracted back into the storage area from which they were dispensed or otherwise handled appropriately. In the preferred embodiment the sheet thickness detector 810 is also used for sensing the leading and trailing edges of sheets. This enables the control system to detect the position of sheets passing through the system which is important to carrying out the concurrent transport of sheets.

Figure 72:
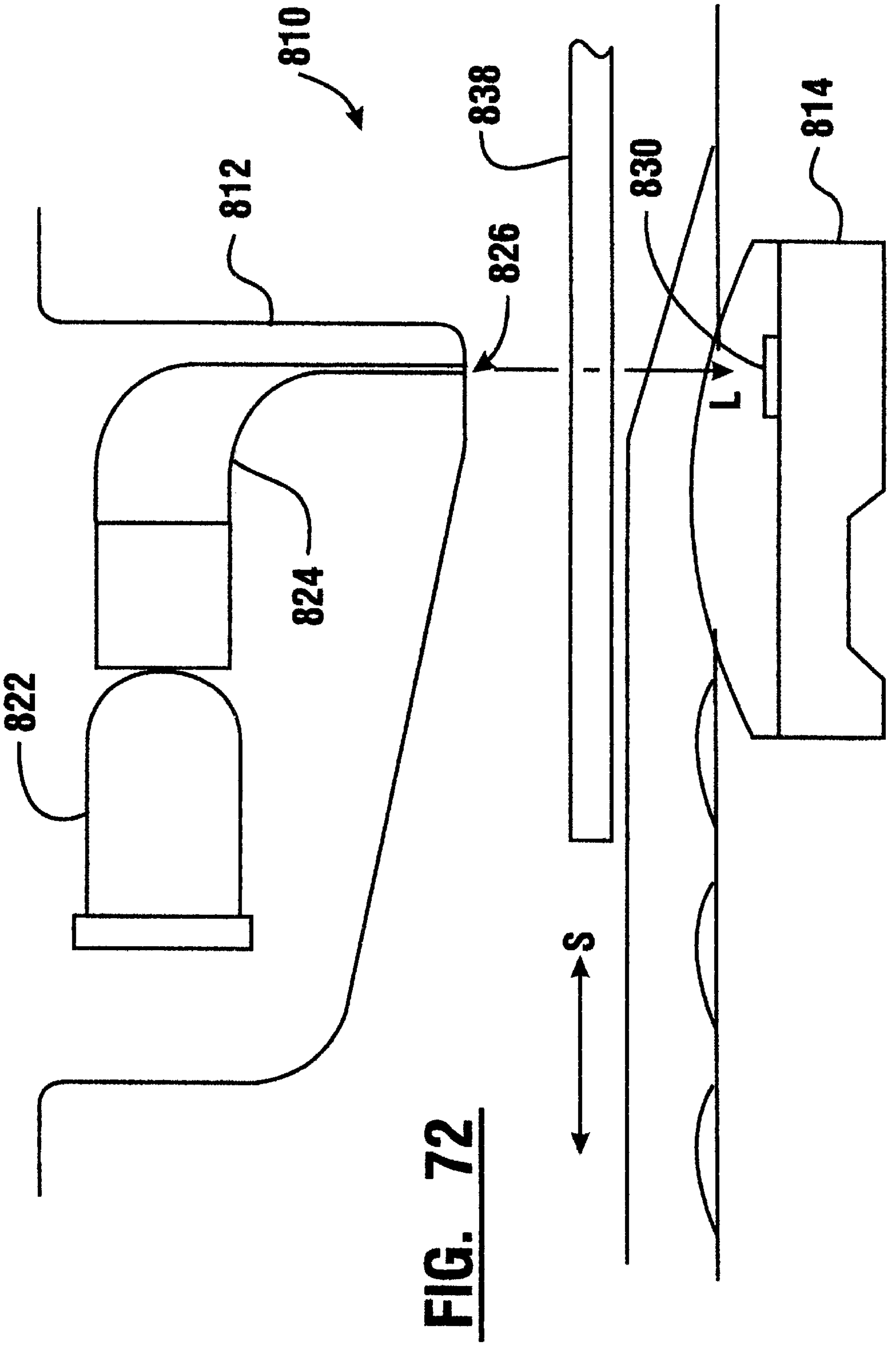
FIG. 72 is a view similar to FIG. 71 with a sheet shown positioned between the emitter and detector.

As shown in FIG. 72 a document sheet 838 passes along a sheet path between the emitter 812 and the receiver 814. Sheet 838 moves along the sheet path in a sheet direction generally indicated by arrow S. Sheets may move along the sheet direction either to the left or to the right as shown in FIG. 72.

Radiation from radiation source 822 is directed by the radiation guide 824 and passes through radiation outlet 826. This radiation as indicated by arrow L passes through the sheet 838 to the element 830 on receiver 814. As a result of the radiation striking the radiation sensitive element receiver 814 produces a signal which varies in response to the amount of radiation which passes through the sheet.

Figure 79:
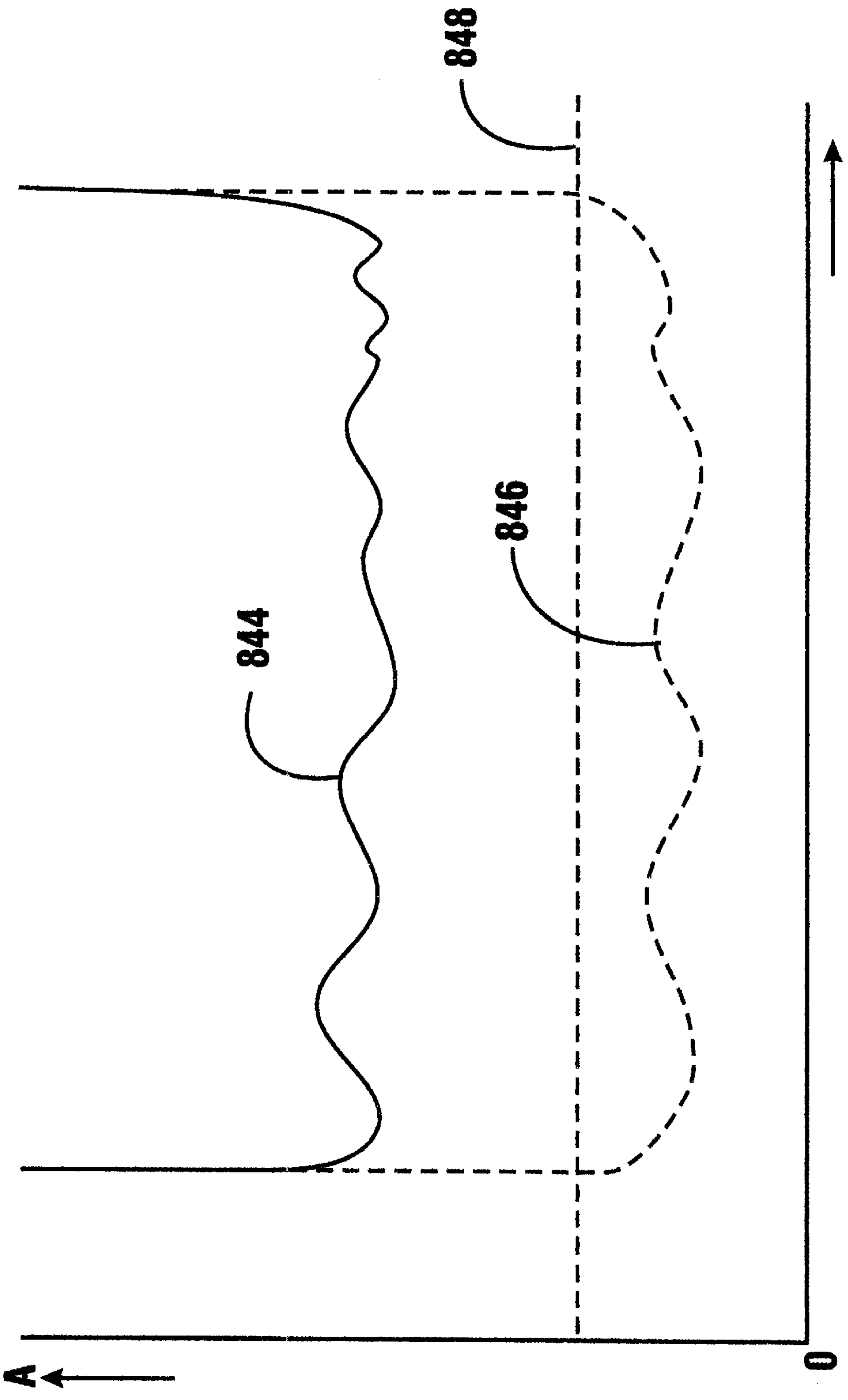
FIG. 79 is a graph showing signals generated by the receiver in response to the passage of single and double sheets.

An example of the signals generated in response to single and double notes is indicated in FIG. 79. Signal output line 844 corresponds to a single note passing between emitter 812 and receiver 814. As can be appreciated, when a sheet passes between the emitter and the receiver the amplitude of the signal from the receiver falls with the leading edge of the sheet and rises again when the trailing edge of the sheet passes. Signal line 844 oscillates as the sheet passes between the emitter and the receiver due to the variations in transmissivity of various portions of the bill.

Signal output line 846 represents passage of a double bill. As can be appreciated much less radiation can pass through two overlying bills than through one bill. As a result the amplitude of the signal from the receiver is much lower when a double bill passes. The control system associated with the canister has stored therein a threshold schematically indicated 848 which corresponds to a signal amplitude below which double bills are deemed to be detected. Threshold 848 is determined based on experimentation with the particular type of sheets that the sheet thickness detector is used to detect. The preferred form of the invention generally provides the capability of designating thresholds which will accurately predict the sensing of double documents as opposed to marked or soiled single documents.

It is a fundamental feature of the preferred embodiment of the present invention that the emitter and receiver sense the transmission of radiation through the sheet across a distance which is relatively wide compared to conventional optical thickness detectors. By sensing transmissivity over such a wide area localized areas of low transmissivity due to indicia on single bills such as marked areas or areas in printed patterns where printing is placed, tend to be averaged with other areas, and do not result in a false indication of a double note.

In the preferred form of the invention the radiation outlet and radiation sensitive element are centered transversely in the sheet path and extend a distance of approximately 20 millimeters. In the case of U.S. currency notes the emitter and receiver sense transmissivity through a distance which is approximately 13 percent of the total note width. It should be understood that while this relationship is used in the preferred embodiment, in other embodiments greater or lesser percentages of the note width may be sensed. In general sensing five percent of the note width for most types of sheets provides a significant advantage compared to other optical sheet thickness detectors which sense less than one percent of the note width. Sensing ten percent of the note width also generally provides very satisfactory results. Of course greater percentages than those used in the preferred embodiment may also be used in other embodiments, provided that the percentage of the note sensed is not so great that misalignment or skewing will cause false readings due to unobstructed transmission between the emitter and the sensor.

In the preferred embodiment of the invention the area in which the emitter and receiver sense the area of the note is at or near the center. This provides for sensing the area of the note between the belts which move the notes along the canister transports. The configuration enables accurate sensing of doubles despite skewing of the notes. Doubles are enabled to be accurately detected despite localized marking of the notes or changes of the notes due to staining or aging.

In the preferred embodiment of the invention the LED which serves as the radiation source is positioned in an aperture in the housing of the emitter from which it may be readily removed. This enables replacement of the LED in the event that it should fail. Likewise the receiver 814 is enabled to be readily removed from the pocket in which it is positioned on the bin door.

The control system of the machine in the preferred embodiment operates the radiation source at a sufficient level to achieve the accurate detection of double sheets. This is accomplished by adjusting the intensity of the radiation source when no sheet is present to achieve a desired output from the receiver. Achieving such a desired output enables having sufficient differentiation in the amplitude of the signals when sheets pass so as to accurately distinguish single and double sheets.

In the preferred embodiment the recycling canisters include an onboard memory. The onboard memory stores data representative of the intensity of the radiation source required for accurately detecting doubles in some systems. Different emitter and detector types may be used. Alternatively, or in addition the onboard memory may include data representative of the thresholds representative of doubles. Storing the information in the onboard canister memory enables the control system of the machine to more readily control the emitter and to accurately read and interpret the signals generated by the receiver.

Figure 73:
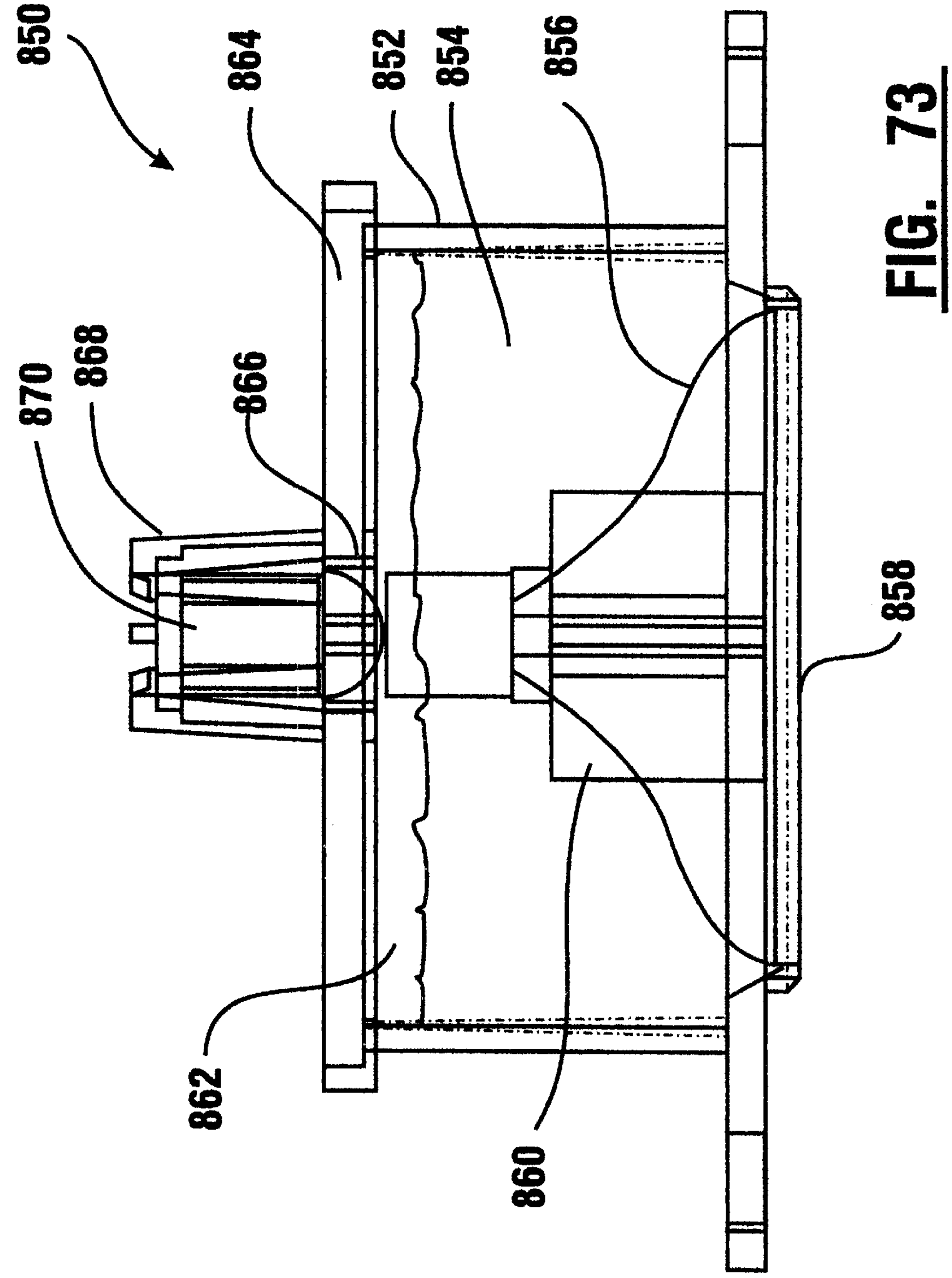
FIG. 73 is a partially sectioned side schematic view of an alternative form of the emitter shown in FIG. 71.
Figure 74:
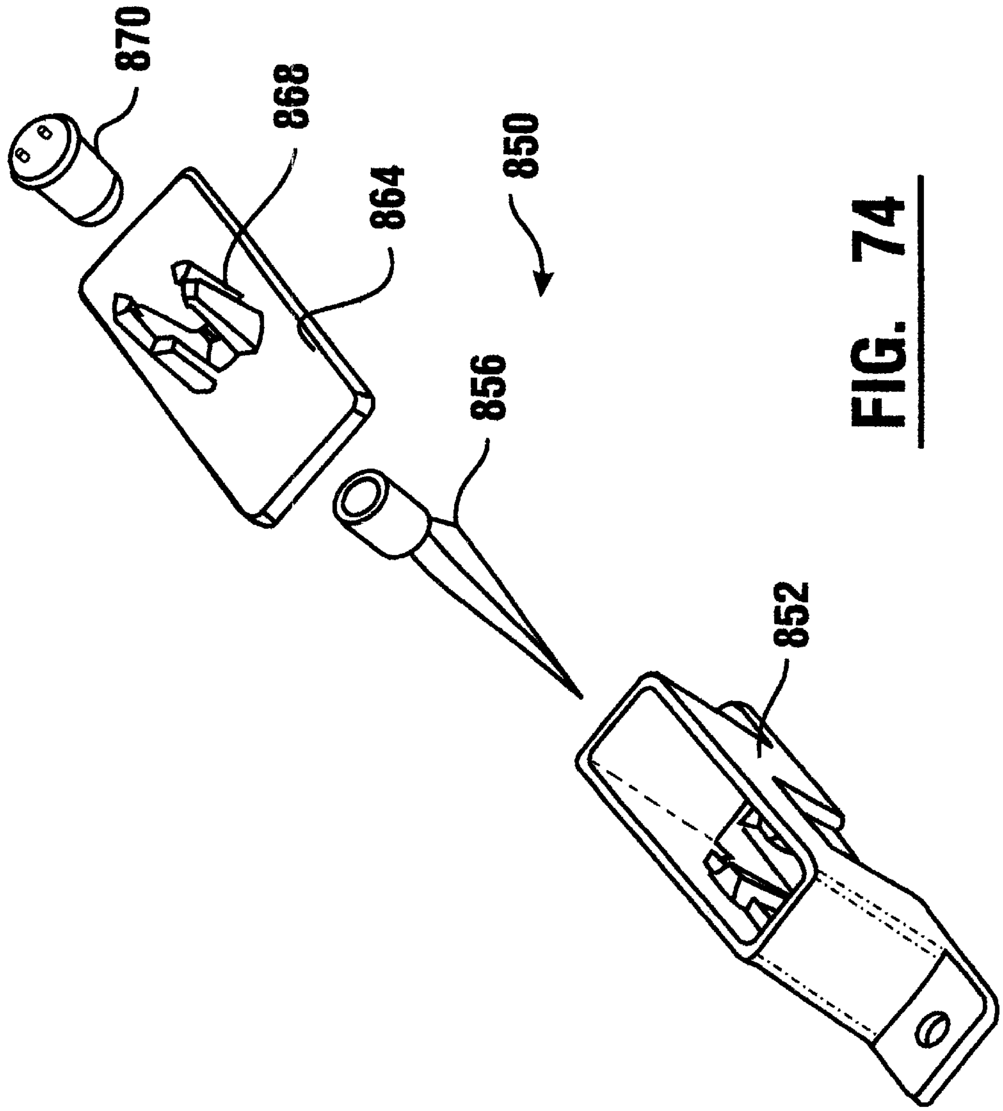
FIG. 74 is an exploded view of the emitter shown in FIG. 73.
Figure 75:
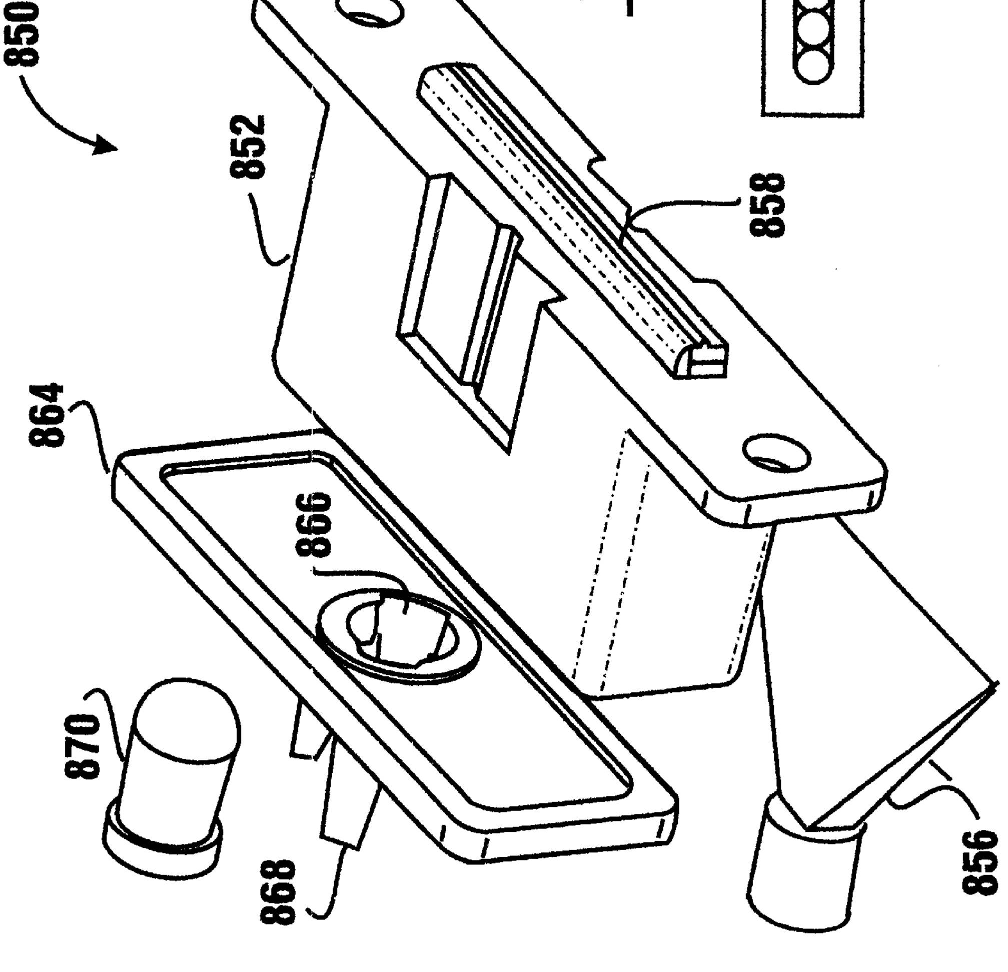
FIG. 75 is a further exploded view of the emitter shown in FIG. 74.

An alternative embodiment of an emitter generally indicated 850 is shown in FIGS. 73–75. The alternative emitter is of a type used in the machine in connection with doubles sensors 80 of the central transport of the automated banking machine. The receiver used in connection with emitter 850 is similar to receiver 814.

Emitter 850 includes a body 852. Body 852 includes a central cavity 854. Cavity 854 houses a radiation guide 856. Radiation guide 856 in the embodiment shown comprises a fiber optic bundle as in the prior embodiment. However radiation guide 856 extends generally straight as it fans outward toward a radiation outlet 858. Radiation guide 856 is held in position in the cavity 854 by projections 860 and is secured in position with potting compound, generally indicated 862.

Body 852 includes a rear wall 864. Read wall 846 has an aperture 866 therein. A rear wall plurality of projections 868 extend in surrounding relation of aperture 866 on the outside of wall 864. Projections 868 serve to releasibly hold a radiation source 870 which in this embodiment is also an infrared LED. Projections 868 serve to releasibly hold the LED in the aperture 866. The projections 868 are deformable to release the LED to enable ready replacement.

Emitter 850 functions in combination with a receiver similar to receiver 814 to enable the accurate detection of double sheets. The transverse length of radiation outlet 858 relative to the width of the sheets enables accurately distinguishing single sheets from double sheets despite localized areas of low transmissivity on the sheets. While fiber optics bundles are employed as the radiation guide in the embodiment shown, other embodiments may employ other devices for providing a relatively wide distributed radiation source. Further while infrared radiation sources are used in the preferred embodiment alternative forms of the invention may use other sources and frequencies of radiation. This may be particularly true in situations where the particular type of sheet being handled has properties which provide greater differences in transmitter radiation between singles and doubles when exposed to radiation at other frequencies.

Thus the preferred embodiment of the present invention achieves the above stated objectives, eliminates difficulties encountered in the use of prior devices, systems and methods, and attains the desirable results described herein.

In the foregoing description certain terms have been used for brevity, clarity and understanding. However, no unnecessary limitations are to be implied therefrom because such terms are used for descriptive purposes and are intended to be broadly construed. Moreover the foregoing descriptions and illustrations are by way of examples and the invention is not limited to the details shown or described.

In the following claims any feature described as a means for performing a function shall be construed as encompassing any means capable of performing the recited function and shall not be limited to the means shown and described in the foregoing description as performing the recited function, or mere equivalents thereof.

Having described the features, discoveries and principles of the invention, the manner in which it is constructed and operated and the new and useful results attained; the new and useful structures, devices, elements, arrangements, parts, combinations, systems, operations, methods and relationships are set forth in the appended claims.

I claim:

1. A method comprising:

moving at least one sheet generally along a sheet moving direction in a sheet path in an automated banking machine between an emitter and a receiver;

wherein the at least one sheet has patterns of indicia thereon, wherein the indicia affect transmissivity of radiation through the at least one sheet, wherein the at least one sheet has a width in a direction generally transverse to the sheet moving direction, wherein the emitter and the receiver are positioned on opposed sides of the sheet path, wherein the receiver includes an apex area and a radiation sensitive element, wherein the radiation sensitive element is positioned away from the apex area in the sheet moving direction, wherein the receiver is operative to receive radiation from the emitter, wherein the emitter and the receive are generally transversely to the sheet extend a substantially equal elongated distance generally transversely to the sheet moving direction, and wherein the emitter and the receiver extend at least five percent of the width of the at least one sheet, passing radiation from the emitter through the at least one moving sheet generally transversely to the sheet moving direction;

receiving with the receiver radiation passed through the at least one moving sheet;

producing a signal with the receiver responsive to an amount of radiation passed through the at least one moving sheet that the receiver received from the emitter;

comparing the produced signal to a threshold, wherein the threshold corresponds to overlapped sheets;

determining whether the at least one sheet comprises overlapped sheets responsive to the comparison.

2. The method according to claim 1 wherein the passing step includes generally simultaneously passing the radiation through the at least one moving sheet at a plurality of adjacent linearly aligned locations along the transverse direction.

3. The method according to claim 1 wherein the patterns are generally nonuniform on the at least one sheet, wherein the moving step includes positioning both cite emitter and the receiver in a generally aligned relation generally transverse to the sheet moving direction, wherein both the emitter and the receiver are elongated to an extent that indicia in the nonuniform patterns do not generally cause a signal to cross a threshold when a single sheet extends between the emitter and the receiver, wherein the threshold corresponds to overlapped sheets.

4. The method according to claim 1 wherein the moving step includes positioning an emitter having an elongated radiation emitting outlet.

5. The method according to claim 4 wherein the moving step includes positioning an emitter having a fiber optic bundle.

6. The method according to claim 1 and further comprising sensing the amount of radiation received by a receiver, and adjusting intensity of the radiation emitted by the emitter to a level responsive to an amount of radiation received by the receiver.

7. The method according to claim 1 wherein the emitter includes a fiber optic bundle, wherein the passing step includes passing radiation through the fiber optic bundle.

8. A method comprising:

moving at least one sheet generally along a sheet moving direction in a sheet path in an automated banking machine between an emitter and a receiver;

wherein the at least one sheet has patterns of indicia thereon, wherein the indicia affect transmissivity of radiation through the at least one sheet, wherein the at least one sheet has a width in a direction generally transverse to the sheet moving wherein the emitter and the receiver are positioned on opposed sides of the sheet path, wherein the receiver is in supporting relation with a bin door overlying a document storage area in the automated banking machine, wherein the receiver is operative to receive radiation from the emitter, wherein the emitter and the receiver are generally aligned and extend a substantially equal elongated distance generally transversely to the sheet moving direction, and wherein the emitter and the receiver extend at least five percent of the width of the at least one sheet, passing radiation from the emitter through the at least one moving sheet generally transversely to the sheet moving direction;

receiving with the receiver radiation passed through the at least one moving sheet;

producing a signal with the receiver responsive to an amount of radiation passed through the at least one moving sheet that the receiver received from the emitter;

comparing the produced signal to a threshold, wherein the threshold corresponds to overlapped sheets;

determining whether the at least one sheet comprises overlapped sheets responsive to the comparison.

9. The method according to claim 8 wherein the emitter includes a fiber optic bundle, wherein the passing step includes passing radiation through the fiber optic bundle.

* * * * *